US006266441B1

(12) United States Patent
Hashimoto et al.

(10) Patent No.: US 6,266,441 B1
(45) Date of Patent: *Jul. 24, 2001

(54) IMAGE FORMING APPARATUS CAPABLE OF RECOGNIZING TOP AND BOTTOM OF DOCUMENT IMAGE

(75) Inventors: Hideyuki Hashimoto, Toyokawa; Shoji Imaizumi, Shinshiro; Takayuki Nabeshima, Toyokawa; Kazuomi Sakatani, Toyohashi, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/276,750

(22) Filed: Mar. 26, 1999

Related U.S. Application Data

(62) Division of application No. 08/652,180, filed on May 23, 1996, now Pat. No. 5,889,884.

(30) Foreign Application Priority Data

| May 23, 1995 | (JP) | .................................................... 7-146952 |
| Oct. 30, 1995 | (JP) | .................................................... 7-303341 |
| Dec. 18, 1995 | (JP) | .................................................... 7-347500 |
| Feb. 14, 1996 | (JP) | .................................................... 8-049585 |

(51) Int. Cl.[7] ............................. G06K 9/00; G06K 9/36; H04N 1/04
(52) U.S. Cl. .......................... 382/170; 382/151; 382/286; 382/289; 382/291; 358/488
(58) Field of Search ................................. 382/170, 168, 382/289, 290, 291, 151; 358/486, 487, 522, 488

(56) References Cited

U.S. PATENT DOCUMENTS

| 4,567,610 | * | 1/1986 | McConnell | 382/170 |
| 5,077,811 | * | 12/1991 | Onda | 382/290 |
| 5,293,431 | * | 3/1994 | Hayduchok et al. | 382/101 |
| 5,311,607 | * | 5/1994 | Crosby | 382/174 |
| 5,506,918 | * | 4/1996 | Ishitani | 382/289 |
| 5,557,689 | * | 9/1996 | Huttenlocher et al. | 382/177 |
| 5,594,807 | * | 1/1997 | Liu | 382/168 |
| 5,668,898 | * | 9/1997 | Tatsuta | 382/168 |

* cited by examiner

Primary Examiner—Leo Boudreau
Assistant Examiner—Daniel G. Mariam
(74) Attorney, Agent, or Firm—McDermott, Will & Emery

(57) ABSTRACT

An image forming apparatus automatically identifying top and bottom of document image based on characteristics with regard to shapes or positions of data, etc. recorded on document. Distribution states of pixel cumulative values in main scanning direction and sub scanning direction of image signals provided by scanning the document, are analyzed and top and bottom of the document image is identified from the result of analysis. Further, it is possible to identify the top and bottom of the document image by analyzing the distribution states the pixel cumulative values in the main scanning direction and the sub scanning direction of the image signals and identifying letter series regions and line segment regions displaced therefrom. In addition thereto, it is possible to automatically identify the top and bottom of the document image based on distribution states in the main scanning direction and the sub scanning direction of specific signs included in the image signals provided by scanning the document or distribution states of pixel cumulative values of specific image regions including the specific signs.

7 Claims, 44 Drawing Sheets

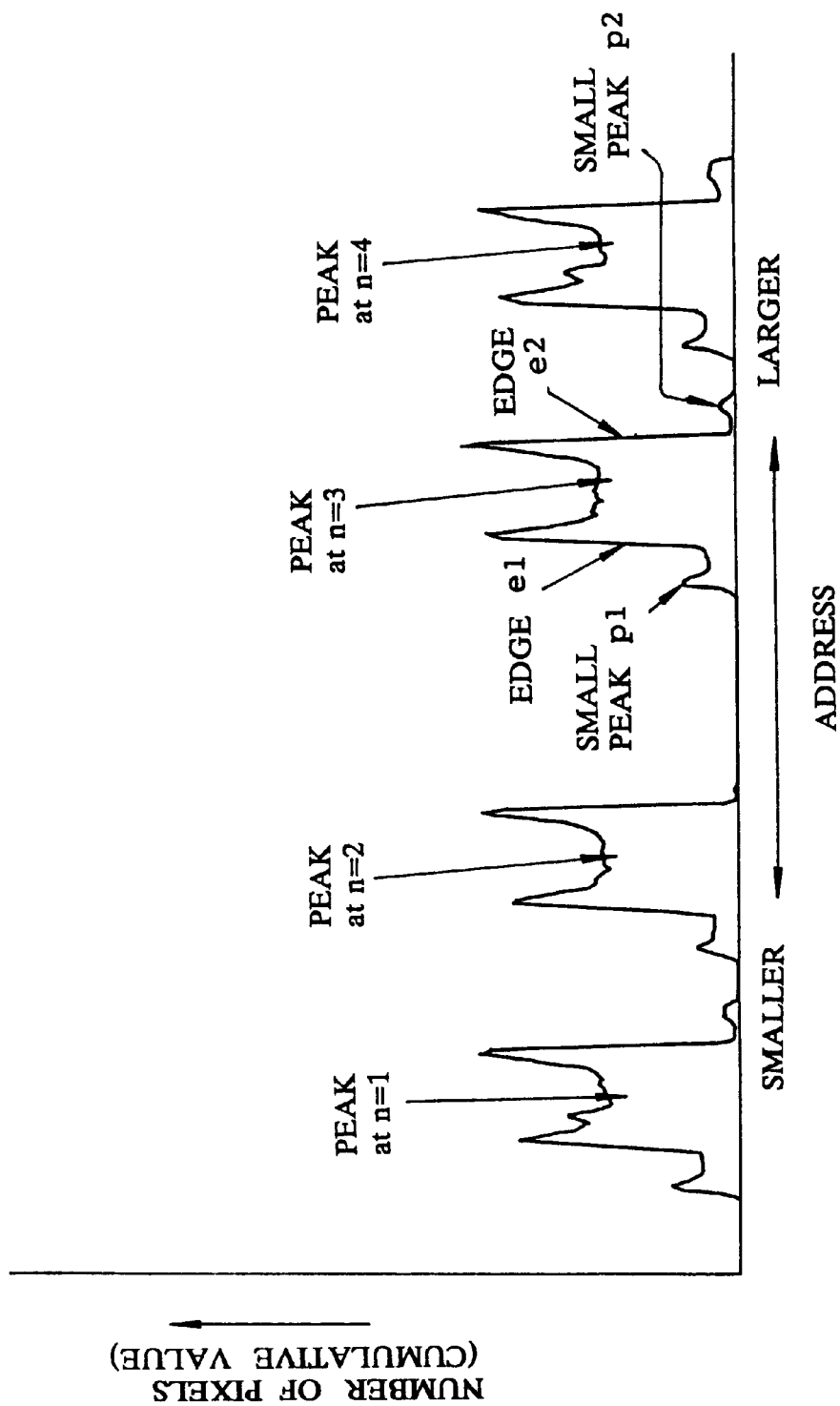

Fig. 12

TEST CHART

\* <u>ABC</u>

\* <u>abc</u>

\* <u>123</u> abcdefghijk<u>lmnop</u>qrstu

THRESHOLD LEVEL (I)

THRESHOLD LEVEL (I)

| DISTRIBUTION OF HISTOGRAM IN x-AXIS | DISTRIBUTION OF HISTOGRAM IN y-AXIS | DIRECTION OF IMAGE |
|---|---|---|
| FIG.34(a) | FIG.34(c) | FIG.36 |
| FIG.34(b) | FIG.34(c) | FIG.37 |
| FIG.34(c) | FIG.34(b) | FIG.38 |
| FIG.34(c) | FIG.34(a) | FIG.39 |

TOP
LEFT — RIGHT
BOTTOM

BOTTOM
RIGHT — LEFT
TOP

RIGHT
TOP ┼ BOTTOM
LEFT

LEFT
BOTTOM ┼ TOP
RIGHT

IMAGE FORMING APPARATUS CAPABLE OF RECOGNIZING TOP AND BOTTOM OF DOCUMENT IMAGE

This is a divisional application of Ser. No. 08/652,180, filed May 23, 1996 now U.S. Pat. No. 5,889,884.

BACKGROUND OF THE INVENTION

1. Field of the Invention

The present invention relates to an image forming apparatus, particularly to an image forming apparatus capable of automatically recognizing top and bottom of document image.

2. Description of the Prior Art

In recent times, there have been proposed image forming apparatuses having a variety of automatic processing functions such as an apparatus recording two sheets or four sheets of document fed from an automatic document feeding device on one sheet of record paper, an apparatus having book binding function collating record paper on which image is formed and binding it by staplers, and the like.

It is important for effectively using an image forming apparatus having such an automatic processing function to arrange in order top and bottom of plural sheets of document fed by an automatic document feeding device. In case where copies are formed without noticing mixing of document of which top and bottom is reversed which is noticed later, even if one sheet thereof is mixed, the formed copies have to be abandoned. Accordingly, enormous time and expense are dissipated in the case of a large number of copies.

Therefore, there has been proposed an image forming apparatus which automatically determines top and bottom or sideway arrangement of document image and rotates the document image in the normal direction when it discovers document of which top and bottom is reversed, or which is arranged sideways. For example, in an image forming apparatus disclosed in U. S. Pat. No. 5,077,811, samples of data image are selected from image data obtained by scanning document, the samples are compared with separately prepared reference letters whereby top and bottom or a rotational angle of document image is determined and the document image is rotated in the normal direction if modification thereof is necessary.

Also, there has been disclosed a mark recognition apparatus which although not automatically determining top and bottom or sideway arrangement of document image, designates desired region (closed loop) and command in document image by a marker pen and conducts image processing in compliance with the command designating the region, for example, image processing eliminating the designated region, moving image of the designated region to another designated location, etc. (refer to Japanese Laid-Open Patent Application No. 04-170864).

In addition thereto, there has been proposed a technology in which, when a previously designated specific pattern is identified in document image, the specific pattern is converted into white image or eliminated (refer to Japanese Laid-Open Patent Application No. 04-343570 and Japanese Laid-Open Patent Application No. 04-245860).

However, according to the means for selecting samples of letter image from image data obtained by scanning document and determining top and bottom or a rotational angle by comparing the samples with separately prepared reference letters, even in the case of processing by extracting the samples of letter image, a high level image processing of reading letters and comparing them with reference letters is necessary. Therefore, the cost of the apparatus is significantly increased by adding the means for automatically determining top and bottom or sideway arrangement of document image to the image forming apparatus.

SUMMARY OF THE INVENTION

It is a main object of the present invention to provide a novel image processing apparatus automatically identifying top and bottom of document image based on characteristics concerning shape or location of letter, sign, etc. recorded on document.

It is another object of the present invention to provide a novel image processing apparatus automatically identifying top and bottom of document image based on distribution states of pixel cumulative values in main scanning direction and in sub scanning direction of pixel signal obtained by scanning document.

It is another object of the present invention to provide a novel image processing apparatus automatically identifying top and bottom of document image based on letter series regions and line segment regions displaced therefrom by pixel cumulative values in main scanning direction and sub scanning direction of image signal obtained by scanning document.

It is still another object of the present invention to provide a novel image processing apparatus automatically identifying top and bottom of document image based on distribution states of specific signs included in image signal obtained by scanning document in main scanning direction and sub scanning direction.

It is still another object of the present invention to provide a novel image processing apparatus automatically identifying top and bottom of document image based on distribution states of pixel cumulative values in specific pixel regions which are set by noticing specific signs present on the document.

The other objects of the present invention will be revealed by a detailed explanation in reference to attached drawings.

BRIEF DESCRIPTION OF THE DRAWINGS

FIG. 1 to FIG. 11 are drawings of a first embodiment of the present invention.

FIG. 1 is a diagram explaining a method of automatically determining top and bottom of document image;

FIG. 2 is a sectional view showing the outline constitution of a digital copier to which the present invention is applied;

FIG. 3 is a block diagram showing the constitution of an image processing circuit;

FIG. 4 illustrates sample document for explaining determination of top and bottom of document image;

FIG. 7 is an enlarged view of the histograms in the scanning directions (main scanning direction or sub scanning direction);

FIG. 8 is a flowchart of a main routine showing the outline of a total flow of image data processing;

FIG. 9 is a flowchart of a letter series direction detecting subroutine;

FIG. 10 is a flowchart of a histogram shape pattern determining subroutine;

FIG. 11 is a flowchart of a subroutine recognizing top and bottom of document image;

FIG. 12 through FIG. 32 are drawings of a second embodiment of the present invention.

FIG. 12 is a diagram for explaining a form of document;

FIG. 13 is a block diagram of an image processing circuit;

FIG. 14 is a flowchart of a main routine showing a total flow of data processing;

FIG. 15 is a flowchart of a letter series direction detecting subroutine;

FIG. 16 is a flowchart of a subroutine for determining a shape of histogram;

FIG. 17 is a diagram for explaining a histogram in main scanning direction and a histogram in sub scanning direction;

FIG. 19 is a flowchart of a line segment detecting subroutine;

FIG. 20 is a diagram for explaining an example of dividing document image in plural regions in main scanning direction;

FIG. 22 is a diagram for explaining an example of histograms formed based on the document image of FIG. 20;

FIG. 23 is a diagram for explaining relationship between histograms and a threshold level (2);

FIG. 24 is a flowchart of a region combining subroutine;

FIG. 25 is a flowchart of a subroutine for detecting distances between line segments and letter regions;

FIG. 26 is a diagram for explaining document image in which a region (2) and a region (3) are combined;

FIG. 27 is a flowchart of a subroutine for determining top and bottom of document image;

FIG. 28 is a flowchart of a weighting subroutine;

FIG. 29 is a diagram for explaining an example of weighting information provided to document image regions;

FIG. 30 is a diagram for explaining another example of weighting information provided to document image regions;

FIG. 31 is a flowchart of a subroutine for final determination of top and bottom of document image;

FIG. 32 is a diagram for explaining an example of document image;

FIG. 33 through FIG. 41 are drawings of a third embodiment of the present invention.

FIG. 33 is a diagram showing an example of document for explaining determination of top and bottom of image;

FIGS. 34(a), 34(b) and 34(c) are diagrams showing an example of histograms of cumulative values of numbers of occurrence with respect to coordinate positions of a specific pattern;

FIG. 35 is a diagram for explaining a determination table determining top and bottom of image from distribution shapes of histograms;

FIG. 36 is a diagram (1) showing an example of document explaining determination of top and bottom of image;

FIG. 37 is a diagram (2) showing an example of document explaining determination of top and bottom of image;

FIG. 38 is a diagram (3) showing an example of document explaining determination of top and bottom of image;

FIG. 39 is a diagram (4) showing an example of document explaining determination of top and bottom of image;

FIG. 40 is a block diagram of an image processing circuit of a digital copier;

FIG. 41 is a flowchart for explaining determination processing of top and bottom and leftwise and rightwise rotational positions of image;

FIG. 42 is a diagram for explaining method of determining top and bottom of document image;

FIG. 43 is a diagram (1) for explaining a result of determination of the top and bottom of document image;

FIG. 44 is a diagram (2) for explaining a result of determination of the top and bottom of document image;

FIG. 45 is a diagram (3) for explaining a result of determination of the top and bottom of document image;

FIG. 46 is a diagram (4) for explaining a result of determination of the top and bottom of document image;

FIG. 47 is a block diagram of an image processing circuit of a digital copier;

FIG. 48 is a flowchart for explaining top and bottom of document image;

FIG. 49 is a flowchart showing details of distribution counting processing of image data in regions passing through a coordinate position (X, Y) of the center of a specific pattern;

FIG. 50 is a flowchart showing details of determination processing of top and bottom of document image based on distribution states of image data.

DETAILED DESCRIPTION OF THE PREFERRED EMBODIMENTS

An explanation will be given of embodiments of the present invention as follows.

Embodiment 1

In Embodiment 1, top and bottom of document image is recognized based on a pixel cumulative value in the main scanning direction and a pixel cumulative value in the sub scanning direction of image signal of letter document.

First, an explanation will be given of a method of automatically determining top and bottom of document image. As shown in a portion (a) of FIG. 1 by a sample, in type document in English letters, the front capital letter is protruded to the upper side compared with small letters and small letters "b, d, f, h, i, j, k, l, t" have portions protruded to the upper side compared with the other small letters and only "g, j, p, q, y" have portions protruded to the lower side compared with the other letters. Also, there is a characteristic in these letters in which letters having portions protruded to the upper side, (for example, b) are generally more in number than letters having portions protruded to the lower side (for example, p) even if frequency of use of respective letters is considered. According to the present invention the "top" and "bottom" of a letter series is determined by paying attention to the above-mentioned characteristic of English letter type document.

Figure 1:
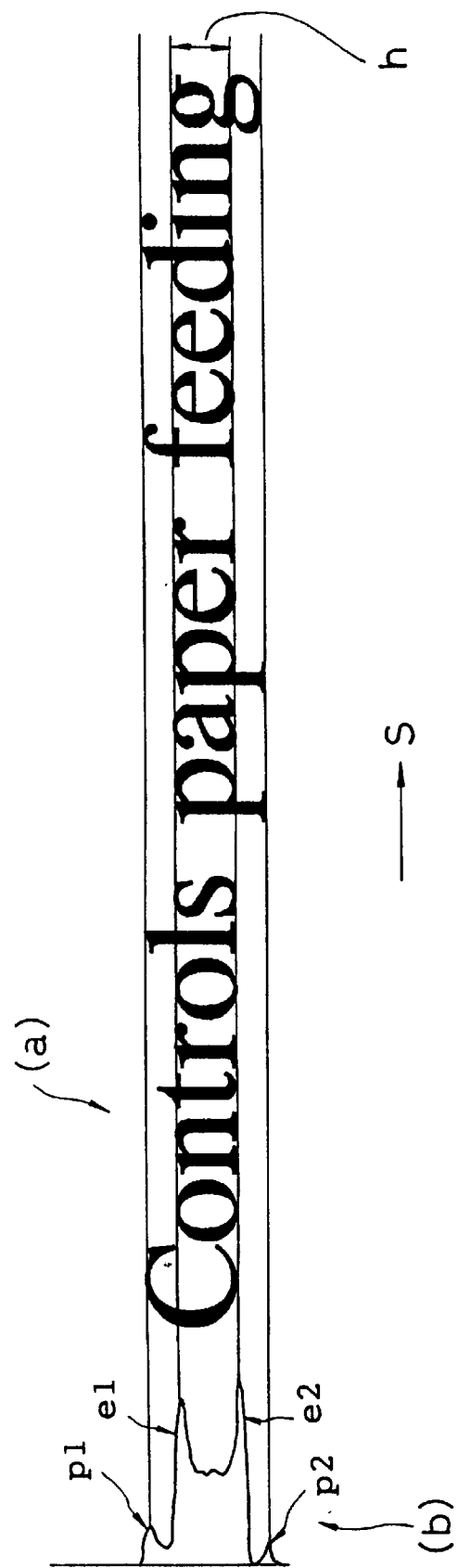

First, when a number of pixels in the arrangement direction (arrow mark s direction) of letters in document image is accumulated, for example, at every scanning line, a histogram having a shape as illustrated in a portion (b) of FIG. 1 can be obtained. Observing the histogram, peaks are present at top and bottom edge portions corresponding to a height h of a standard letter. These are defined as edges e1 and e2. There is a small peak pl on the upper side of the edge e1 where the number of pixels of letters (in this example, capital letter C and small letters t, l, f, d and i), having portions protruded to the upper side compared with the height h of a standard letter are accumulated and there is a small peak p2 on the lower side of the edge e2 where the number of pixels of letters (in this example, two of p and g) having portions protruded to the lower side compared with the height h of a standard letter are accumulated.

As mentioned above, letters having portions protruded to the upper side are generally more in number even if the frequency of use of these letters is considered and therefore, the side where the above-mentioned small peak p1 is present can be determined as the "top" of the letter series.

An explanation will be given of embodiments of the present invention as follows.

Figure 2:
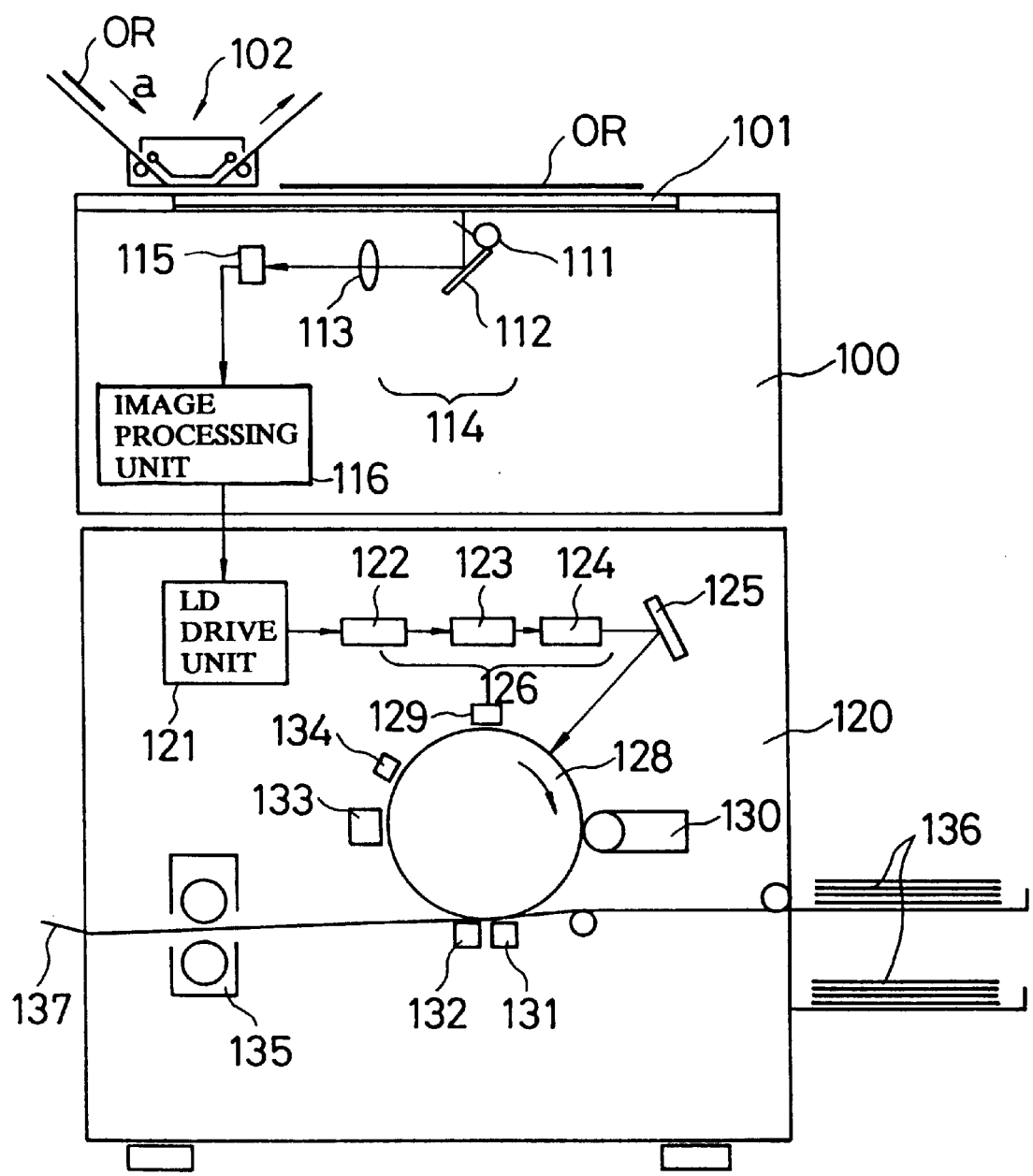

FIG. 2 is a sectional view showing the outline constitution of a digital copier to which the present invention is applied. An image reading unit 100 reads document and outputs image data in correspondence to respective pixels of the document. The image reading unit 100 is constituted by a document base 101, a document feeding unit 102 arranged on the top face of the image reading unit 100, a scanning optical system 114 comprising a light source 111, a mirror 112 and a project lens 113 which are arranged below the document base 101, a line sensor 115 comprising CCDs arranged in one row in the main scanning direction and an image processing unit 116.

Image of document OR mounted on the document base 101 is projected on the line sensor 115 by the scanning optical system 114 and image signal of one line in the main scanning direction is outputted from the line sensor 115. The total face of the document OR mounted on the document base 101 is scanned by moving the scanning optical system 114 in the sub scanning direction and image signal of one page of document is successively outputted from the line sensor 115 to the image processing unit 116.

Further, in the case of using the moving document feeding unit 102, the light source 111 and the mirror 112 of the scanning optical system 114 are fixed at predetermined positions above which the document feeding unit 102 is arranged. When the document OR is fed from an insertion port of the document feeding unit 102 in an arrow mark a direction, the document is read by the line sensor 115 while it is being transferred in the sub scanning direction. The total face of the document is scanned and image signal of one page of the document is successively outputted from the line sensor 115 to the image processing unit 116.

The image signal outputted from the line sensor 115 is converted into digital signal at the image processing unit 116, subjected to predetermined image processing such as change of magnification, image quality modification, etc. and is outputted to an image recording unit 120, mentioned below.

The image recording unit 120 records image on recording paper based on image data and is a recording device of a well-known electrophotography system. That is, the image recording unit 120 is constituted by an LD (laser diode) drive unit 121, a laser optical system 126 comprising a laser oscillator 122, a polygonal mirror 123, a f/θ lens 124 and a reflection mirror 125, a photosensitive drum 128, a main charger 129, a developer 130, a transfer charger 131, a separation charger 132, a cleaner 133 and an eraser 134 which are arranged at the surrounding of the photosensitive drum 128, a fixing device 135, a paper feed cassette 136, etc.

The LD drive unit 121 modulates laser beam irradiated from the laser oscillator 122 by image signal. The laser beam modulated by the image signal is projected on the photosensitive drum 128 via the laser optical system 126 comprising the polygonal mirror 123, the f/θ lens 124 and the reflection mirror 125 to thereby form a latent image. The latent image on the photosensitive drum 128 is developed by the developer 130 and toner image is transferred on the recording paper fed from the paper feeding cassette 136 by the transfer charger 131 at a transferring position. The recording paper on which the toner image has been transferred is separated from the photosensitive drum 128 by the separation charger 132, subjected to fixing by the fixing device 135 and is discharged to a paper discharge tray 137.

Figure 3:
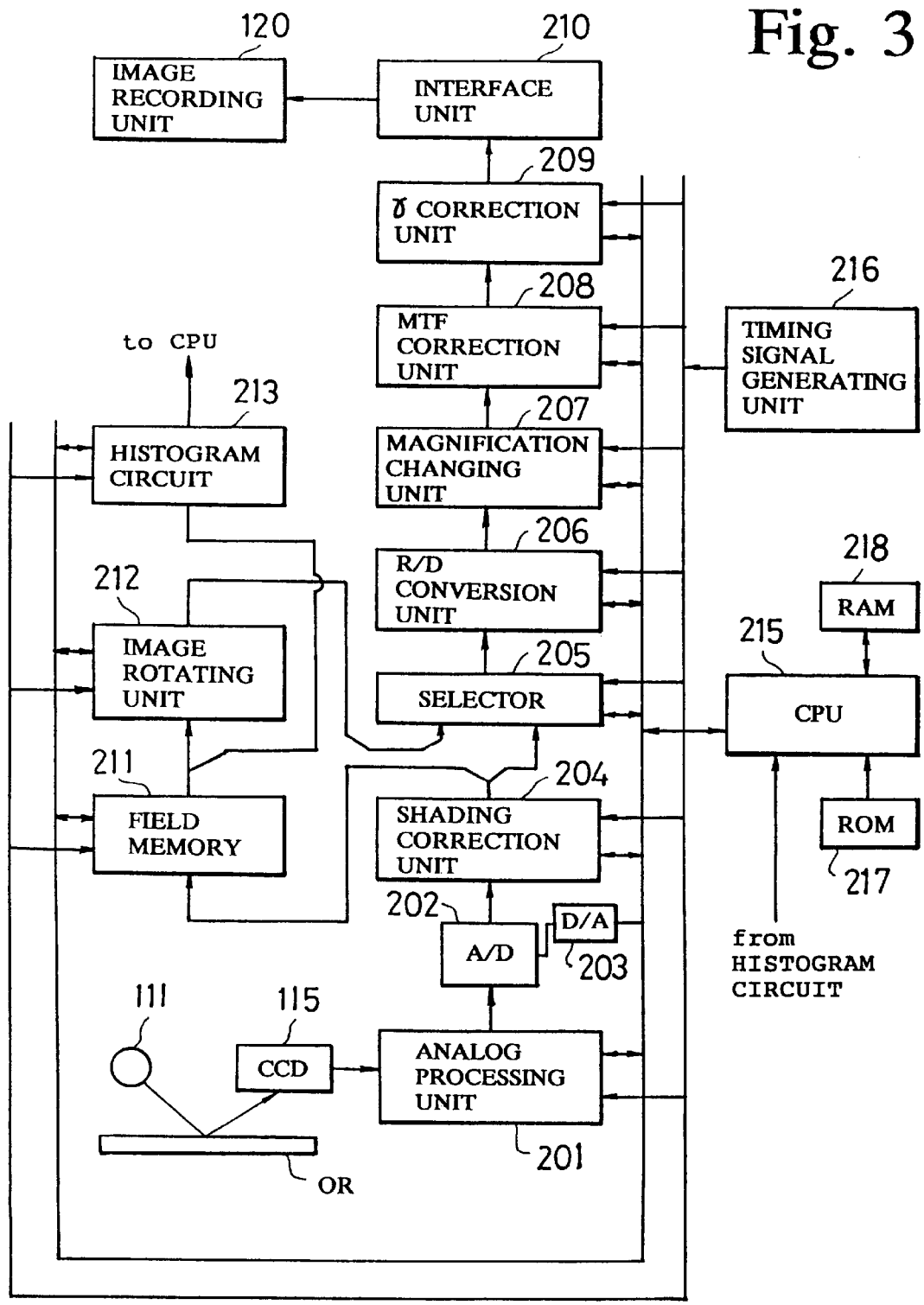

FIG. 3 is a block diagram showing the constitution of an image processing circuit of the image processing unit 116. Reflection light from the document OR irradiated by the light source 111 is detected by the line sensor 115 and outputted image signal is subjected to a predetermined processing by an analog processing unit 201 and converted into digital signal by a A/D conversion unit 202. Reference level data at the A/D conversion unit 202 is supplied from a D/A conversion unit 203.

With respect to the image signal converted into digital signal, correction of nonuniformity of light distribution, nonuniformity of sensitivity among CCD pixels is performed by a shading correction unit 204 and thereafter, the image signal is converted from reflectivity data to density data at a R/D conversion unit 206 via a selector 205. Thereafter, the image signal is subjected to a predetermined processing at a magnification changing unit 207, an MTF correction unit 208 and a γ correction unit 209 and is outputted to the image recording unit 120 via an interface unit 210 as image data to be recorded.

Also, the image data outputted from the shading correction unit 204 is temporarily stored at a field memory 211 and a histogram, mentioned later, is formed by a histogram circuit 213 from the temporarily stored image data for using in determination of top and bottom recognition of image.

When rotation of image becomes necessary as a result of determination in top and bottom recognition of image, mentioned later, the image data temporarily stored in the field memory 211 is rotated by an image rotating unit 212 and is outputted to the selector 205.

The selector 205 outputs image data of which image has been rotated by the image rotating unit 212 to the R/D conversion unit 206 if the rotation of image is determined to be necessary as a result of determination in top and bottom recognition of image. When the rotation of image is determined to be not necessary, the selector 205 outputs the image data outputted from the shading correction unit 204 directly to the R/D conversion unit 206.

The respective elements of the image processing circuit, described above, are controlled by a CPU 215 and timing signal from a timing signal generating unit 216. Further, a ROM 217 is used for storing data for controlling and a RAM 218 is used for temporarily storing processing data.

Figure 4:
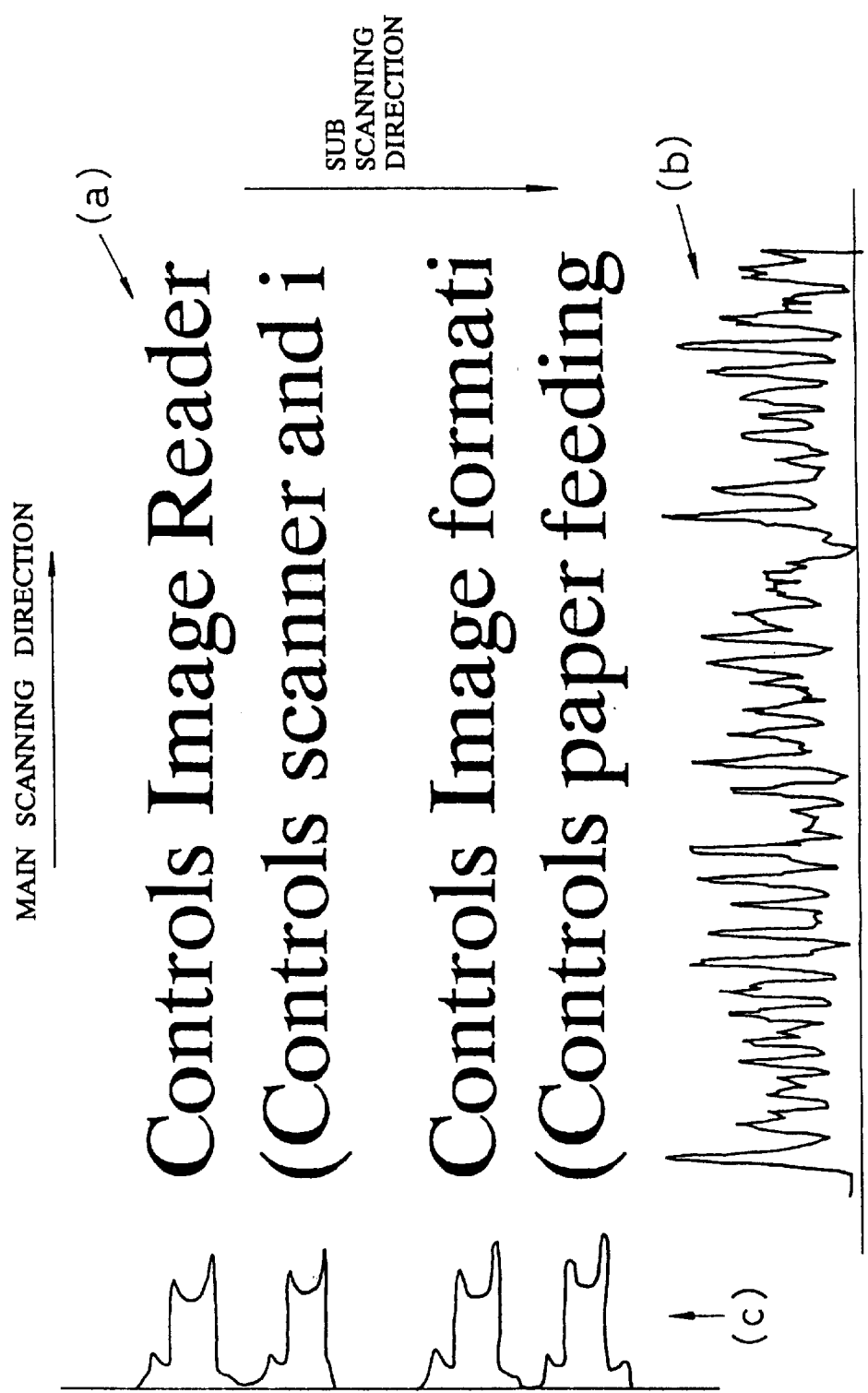

FIG. 4 shows sample document comprising English type letter series (hereinafter, English letter series or letter series) used in explaining a processing of determining top and bottom of document image, explained later. In the following explanation the letter series direction is the main scanning direction.

A portion (a) of FIG. 4 indicates a sample of English type letter series, a portion (b) of FIG. 4 indicates a histogram of pixel cumulative values (image density) in the main scanning direction of English letter series and a portion (c) of FIG. 4 indicates histograms of pixel cumulative values (image density) in the sub scanning direction of English letter series.

Figure 5A:
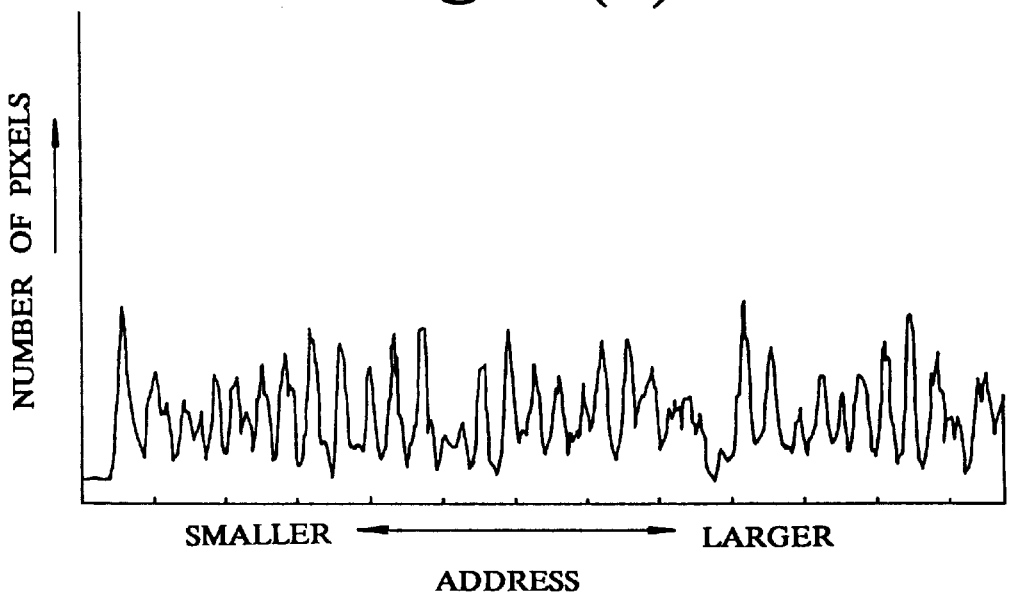
FIGS. 5(a) and 5(b) are histograms of pixel cumulative values in the main scanning direction of the sample document.
Figure 5B:
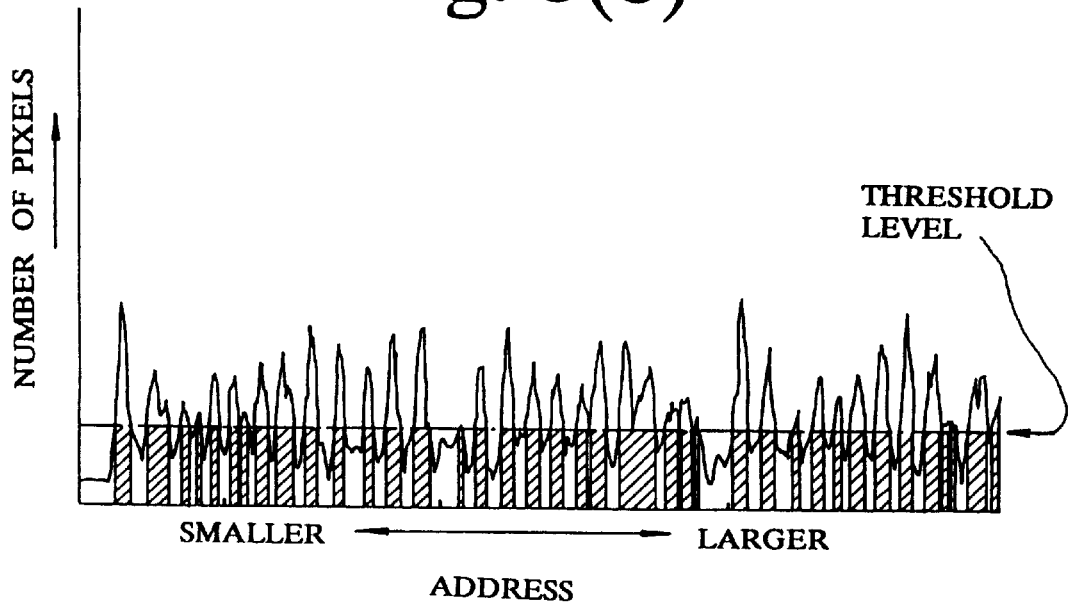

FIG. 5(a) indicates the histogram of pixel cumulative values of English letter series in the main scanning direction that is illustrated in the portion (b) of FIG. 4 and FIG. 5(b) indicates a result of sampling the histogram by a predetermined threshold level whereby a histogram that is painted out by oblique lines can be provided.

Figure 6A:
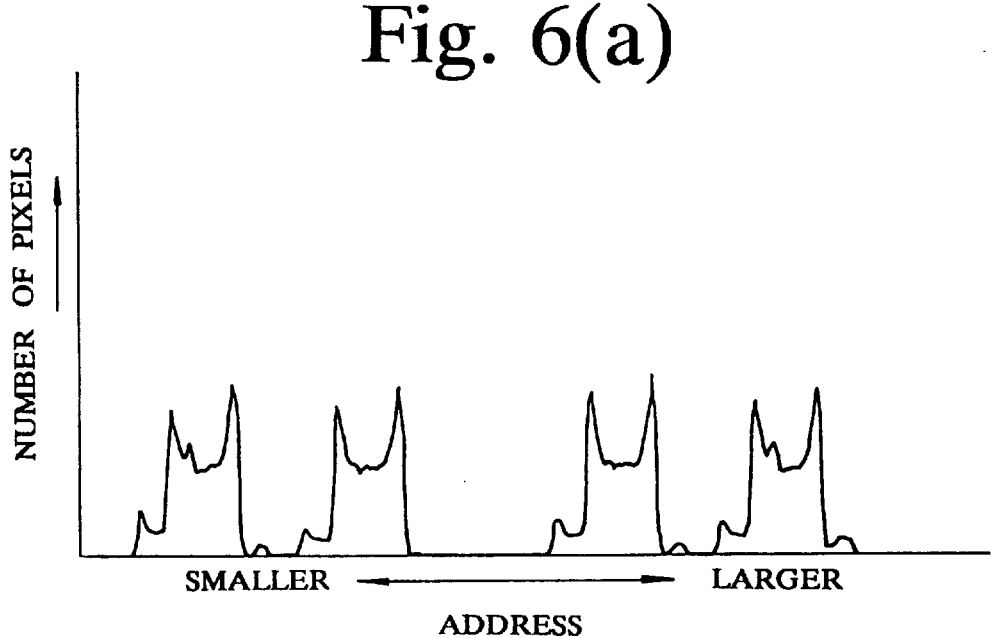
FIGS. 6(a) and 6(b) are histograms of pixel cumulative values in the sub scanning direction of the sample document.
Figure 6B:
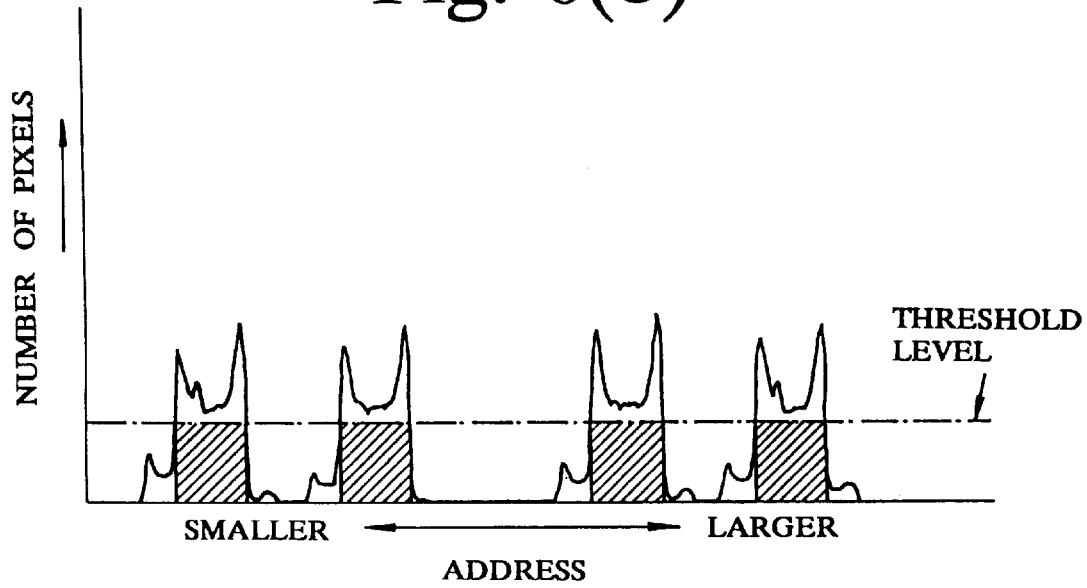

Also, FIG. 6(a) indicates the histograms of pixel cumulative values of English letter series in the sub scanning direction of the sample document illustrated by the portion (c) of FIG. 4 and FIG. 6(b) indicates a result of sampling the histograms by a predetermined threshold level whereby histograms that are painted out by oblique lines can be provided. When the above-mentioned histograms in the main scanning direction and the histograms in the sub scanning direction are processed by a routine of detecting a letter series direction illustrated by a flowchart, mentioned later, the letter series direction can be determined.

FIG. 7 is a diagram magnifying the histograms of the English letter series in the scanning directions (main scanning direction or sub scanning direction) which are illustrated by FIG. 5(a) or FIG. 6(a). As explained above by FIG. 1, top and bottom of document image can be determined by the levels of the small peaks p1 and p2 on both sides of the edges e1 and e2. An explanation will be given of determining top and bottom of document image as follows.

Incidentally, addresses of the histograms in FIGS. 5(a), 5(b), 6(a), 6(b) and 7 signify addresses of a memory in which the histograms are temporarily stored, which are used in determining top and bottom of image. The addresses may be attached such that increasing or decreasing relationship the same as that of addresses of image data stored in the field memory is maintained.

Figure 8:
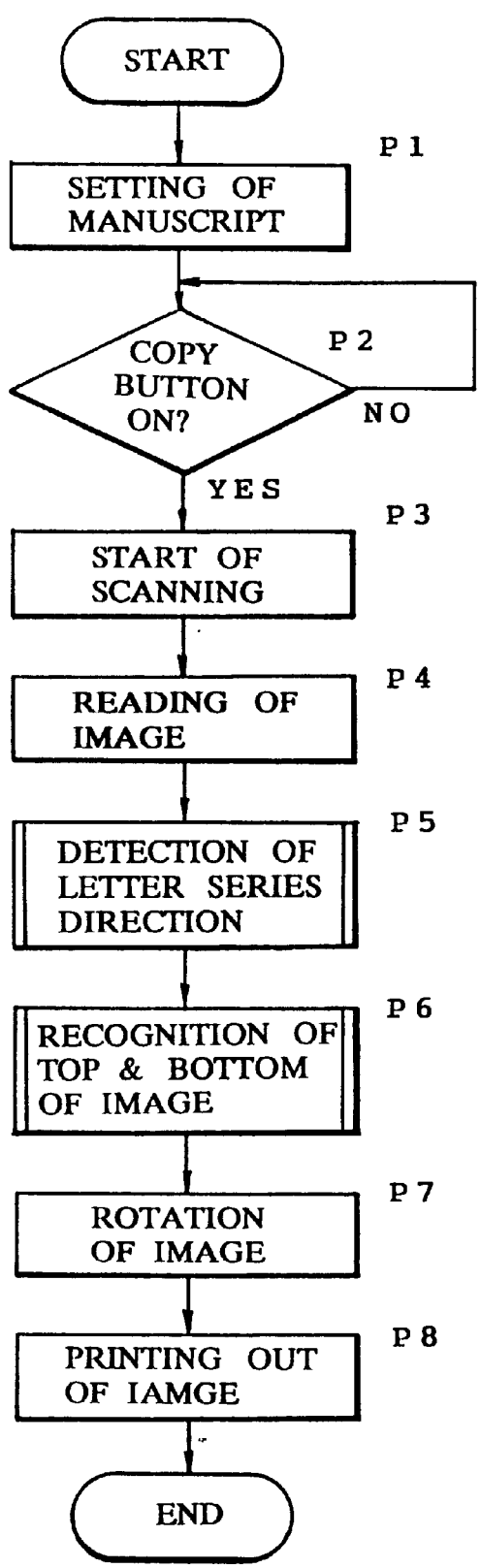

FIG. 8 is a flowchart of a main routine showing the total outline of image data processing that is carried out by the CPU 215 of the image processing circuit in the image processing unit 116. The document is set on the document base (step P1), depressing of a copy button is awaited (step P2) and scanning of document is started (step P3). Manuscript image is read (step P4) and the letter series direction is detected from image data (step P5). Top and bottom of document image is recognized (step P6), rotation of image is carried out as necessary (step P7) and image printing is performed (step P8).

Figure 9:
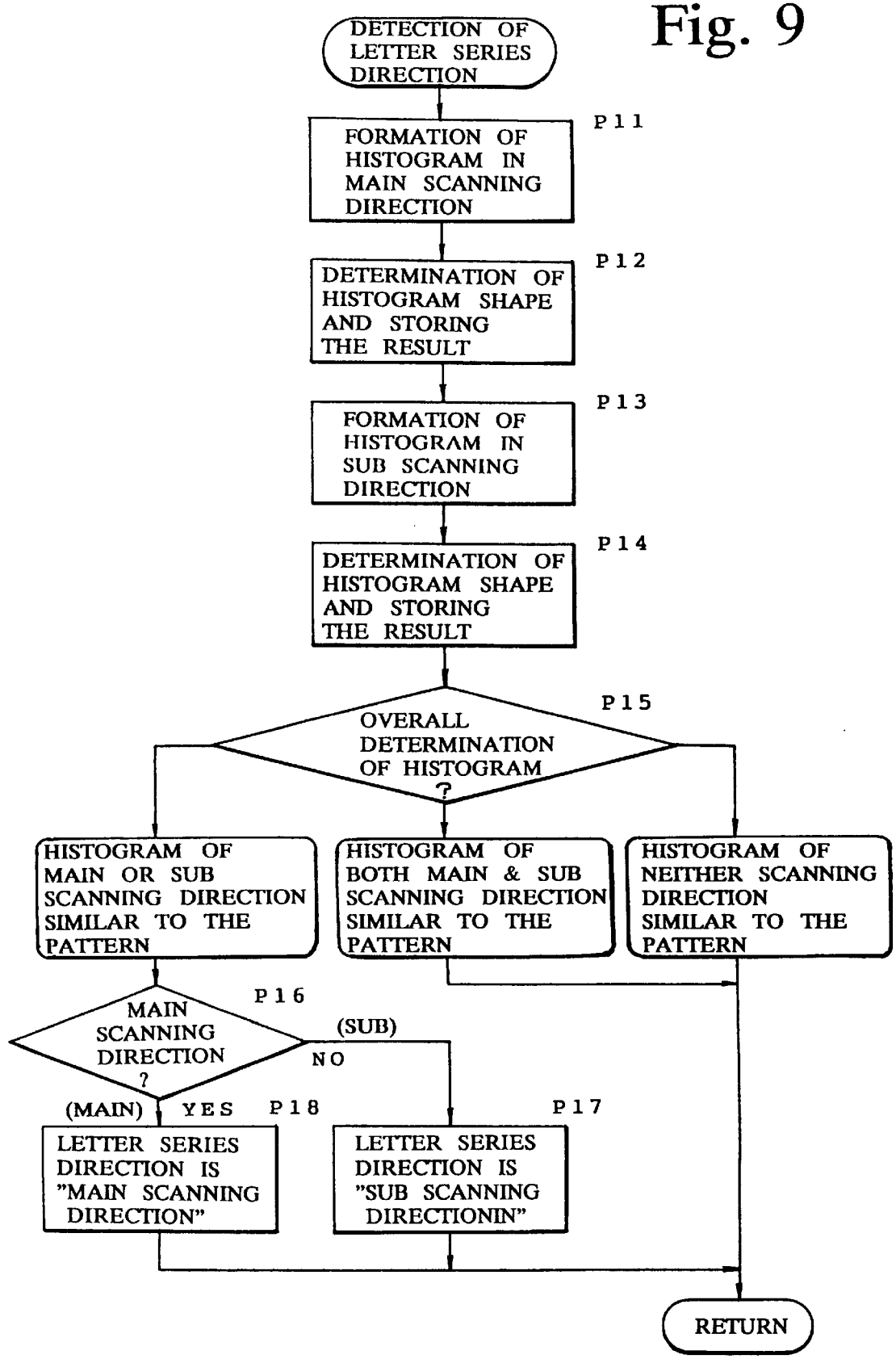

FIG. 9 is a flowchart of a subroutine of detecting the letter series direction that is indicated in the flowchart of FIG. 8 as step P5. First, pixel cumulative values of image data in the main scanning direction are calculated and histograms are formed (step P11), whether the shapes of the formed histograms are similar to the predetermined patterns is determined and a result of determination is temporarily stored (step P12).

Similarly, pixel cumulative values of image data with respect to the sub scanning direction are also calculated and histograms are formed (step P13), whether the shapes of the formed histograms are similar to the predetermined patterns is determined and a result of determination is temporarily stored (step P14).

Overall determination of the histogram shapes is conducted based on the above-mentioned result of determination in the main scanning direction and the result of determination in the sub scanning direction which have been temporarily stored (step P15). When either of the shapes of histograms in the main scanning direction and the shapes of histograms in the sub scanning direction is similar to the predetermined pattern, the operation proceeds to step P16.

Further, whether the shapes of histograms in the main scanning direction are similar to the predetermined patterns is determined and the letter series direction is determined to be the main scanning direction when the shapes in the main scanning direction are similar to the patterns (step P18), or when the shapes in the main scanning direction are not similar to the patterns according to the determination in step P16, the series direction is determined to be the sub scanning direction (step P17) and the operation returns to the main routine.

In the determination of step P15, there is a case where both of the shapes of histograms in the main scanning direction and the sub scanning direction are similar to the predetermined patterns and there is a case where neither of the shapes of histograms in the main scanning direction and the shapes of histograms in the sub scanning direction is not similar to the predetermined patterns. In these cases the direction of the arrangement of letters cannot be identified and accordingly, the identification of top and bottom of document image is not performed and the operation immediately returns to the main routine.

Figure 10:
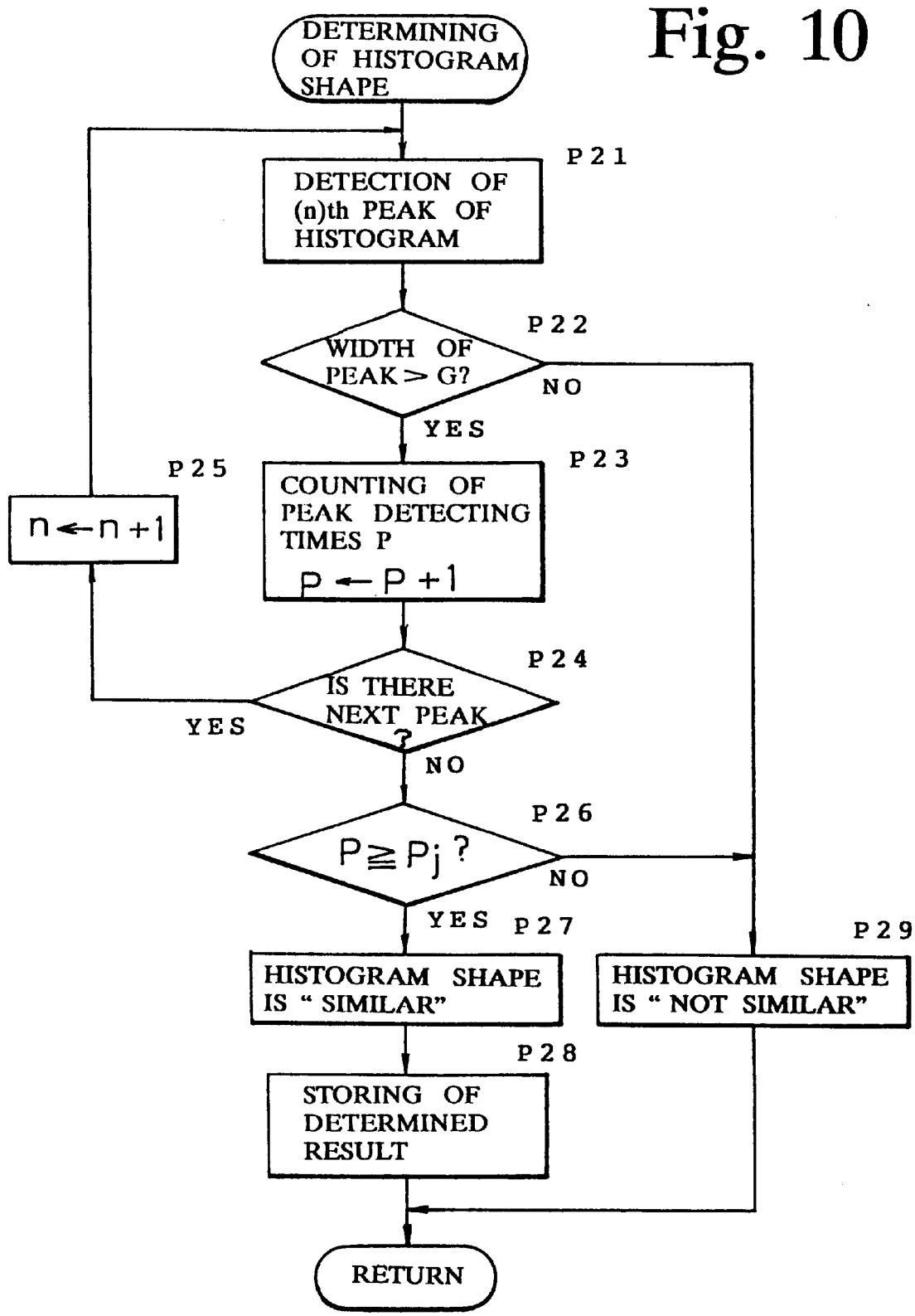

FIG. 10 is a flowchart of a subroutine for determining shapes of histograms determining whether the shapes of histograms are similar to the predetermined patterns, which is indicated in the flowchart of FIG. 9 as steps P12 and P14, in which determining processing in the main scanning direction and that in the sub scanning direction are the same except that values of parameters Pn showing a number of peaks are different. In the following an explanation will be given of the determination processing in the main scanning direction.

First, it is assumed that the histograms as illustrated in FIG. 7 are provided by accumulating image data in the main scanning direction (or image data in the sub scanning direction) of document image.

First, peaks (nth) of histograms in the main scanning direction (sub scanning direction) exceeding a predetermined threshold level are detected (step P21) and whether the widths of the peaks exceed a predetermined value G is determined (step P22). Here, the predetermined value G may be a width corresponding to a height (h in FIG. 1) of English letter series.

When the widths of the peaks exceed the predetermined value G, a number P of detecting peaks exceeding it is counted (step P23), presence or absence of the next peak is determined (step P24). When there is the next peak, the number "n" is incremented for detecting the next peak (step P25) and the operation returns to step P21.

When there is no next peak in the determination of step P24, whether the number P of detected peaks is equal to or more than a predetermined number of times Pj (for example, 2 times) is determined (step P26), it is determined in the case of P≧Pj that the shapes of histograms are similar to the predetermined patterns, the result of determination is temporarily stored in a memory (steps P27 and P28) and the operation returns to the main routine. Further, in the case of P<Pj in the determination of step P26, it is determined that the shapes of histograms are not similar to the predetermined patterns and the operation immediately returns to the main routine.

Figure 11:
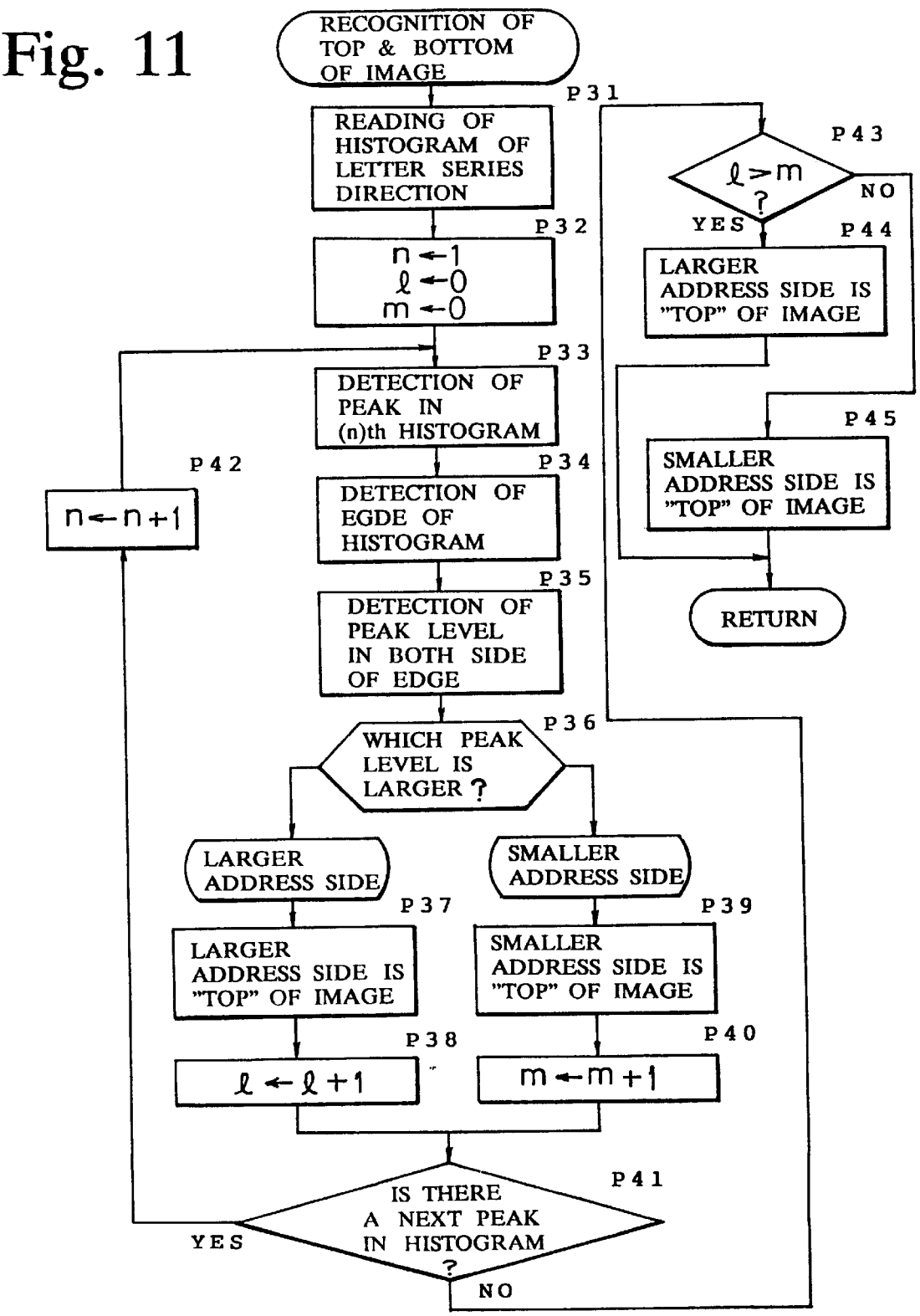

FIG. 11 is a flowchart of a subroutine of recognizing top and bottom of document image which is indicated in the flowchart of FIG. 8 as step P6.

First, the histogram which has been determined as the letter series direction in step P17 or step P18 in the flowchart from FIG. 9 is read (step P31). The read histogram is one of the histograms shown by FIG. 7 which is the histogram in the main scanning direction or the histogram in the sub scanning direction.

The content (value n) of a counter N is reset to 1, the content (value 1) of a counter L is reset to 0 and the content (value m) of a counter M is reset to 0 (step P32) and a peak of nth (n starts from 1) histogram is detected (step P33). Edges (e1 and e2 of FIG. 7) of the histogram of which peak has been detected, are detected (step P34) and further, levels of small peaks (p1 and p2 of FIG. 7) from the both sides of the edges are detected (step P35).

Which of the levels of the detected small two peaks p1 and p2 is larger, is determined (step P36). When an address of a peak having a larger peak level is larger than that of the other peak, the peak side having a larger address is determined as the "top" side of the document image and the counter L is incremented (steps P37 and P38). Further, when the address of the peak having a larger peak level is smaller than that of the other peak, the side of peak having the smaller address is determined as the "top" side of the document image and the counter M is incremented (steps P39 and P40).

The presence or absence of the peaks in the next histogram is determined (step P41), when it has a peak, the counter N is incremented (step P42) and the operation returns to step P33. When there is no remaining peaks, that is, when the processing of all the peaks has been finished, large or small of the counted values 1 and m of the counters M and L is determined (step P43). When 1>m, the peak having a larger address is finally determined as the "top" side of document image (step P44) and when not 1>m, the peak having a smaller address is finally determined as the "top" side of document image (step P45) and the operation returns to the main routine.

Although in the above-explained embodiment, the explanation has been given to the example where top and bottom of document image is determined with regard to English type document, the present invention is not restricted to English type document, but, for example, with regard to types of documents of French type letters or the like, it is possible to determine top and bottom of document image by applying the determination method similar to that of this invention based on frequency of use of letters having portions protruded upwardly and downwardly from the standard height of the letter series.

As explained above, in the first embodiment, digital image signal is generated by scanning document, histograms of pixel cumulative values are formed by calculating pixel cumulative values of image signal in the main scanning direction and pixel cumulative values in the sub scanning direction thereof, the letter series direction is identified by analyzing the formed histograms and the main region and the sub regions before and after the main region in the histogram of which letter series direction has been identified, are identified. When the two sub regions are identified before and after the above-mentioned main region, large or small of cumulative values of two sub regions is determined thereby determining top and bottom of document image. Therefore, high degree of image processing is not necessary as in the method of determining top and bottom of document image by comparing sample letters extracted from document image with separately prepared reference letters and the top and bottom of the document image can be determined simply, easily and accurately.

Embodiment 2

Embodiment 2 is an embodiment recognizing top and bottom of document image by using underlines with regard to document in which underlines, that is, line segments drawn proximate to letter series as well as letter series as illustrated in FIG. 12.

The constitution of the digital copier in Embodiment 2 is the same as that in Embodiment 1 and therefore, the explanation will be omitted.

Figure 13:
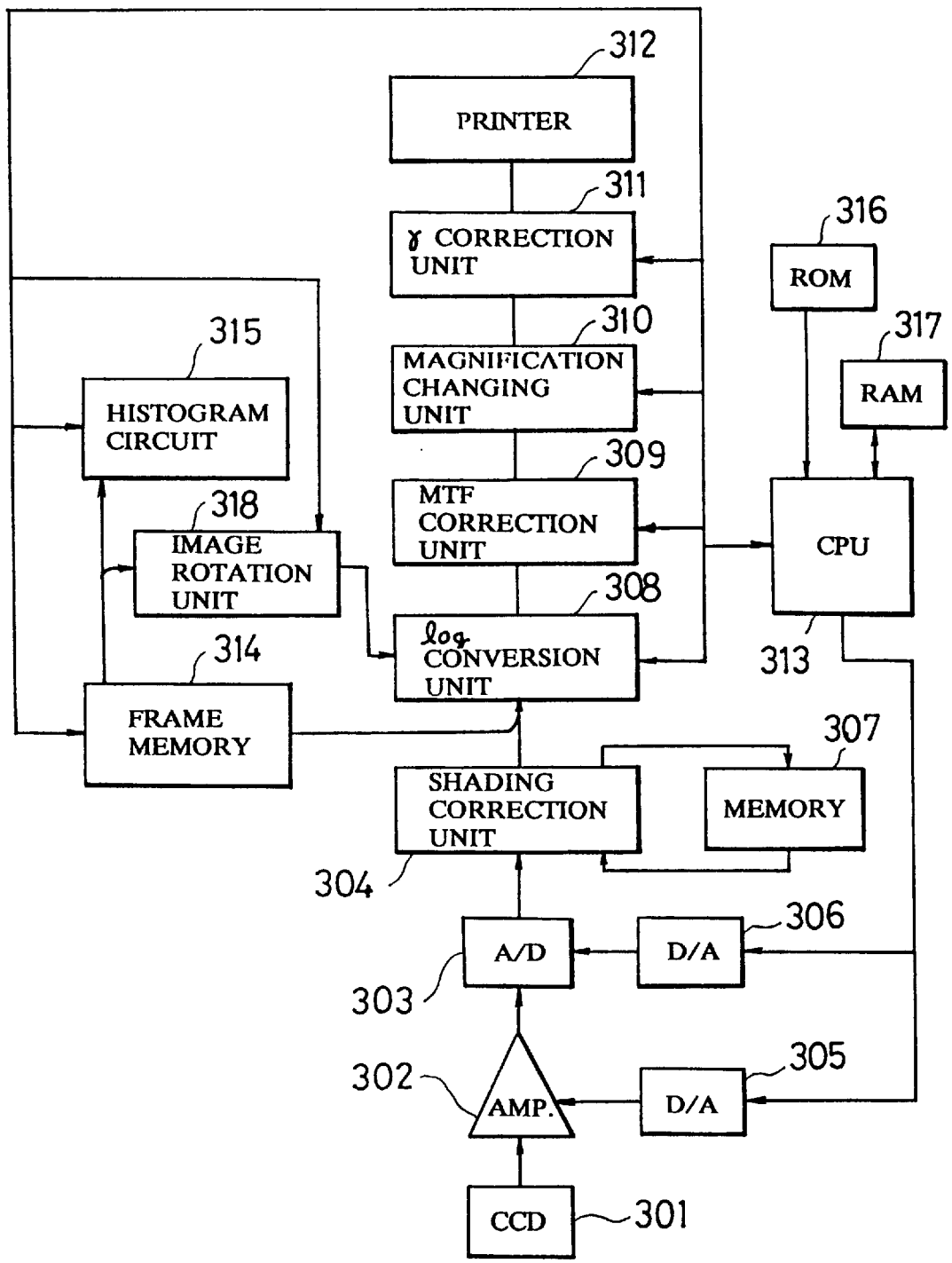

FIG. 13 is a block diagram of an image processing circuit of Embodiment 2. Manuscript irradiated by a light source, not shown, is scanned by a scanner and a reflection light thereof is incident on a CCD line sensor 301 and is converted into electric signal. The output electric signal is amplified by an amplifier 302 and further converted into digital image signal by an A/D converter 303. The image signal is subjected to correction of nonuniformity of light distribution of the light source, variation in sensitivities of CCD pixels, etc. in a shading correction unit 304 and is outputted as proper image data.

A D/A converter 305 connected to the amplifier 302 sets the gain of the amplifier 302 by converting a digital signal indicating to set the gain that is outputted from a CPU 313 into an analog signal. A D/A converter 306 connected to the A/D converter 303 converts a digital signal indicating a reference voltage outputted from the CPU 313 into an analog signal and sets it to the A/D converter 303. Further, a memory 307 is a memory for holding initial data for correcting the shading in which initial data is stored in initial adjustment.

The proper image data which has been corrected by the shading correction unit 304 and which has been reflectivity data, is converted into concentration data in a log conversion unit 308. Thereafter, the data is subjected to MTF correction by a MTF correction unit 309, the magnification thereof is changed to a magnification designated by a magnification changing unit 310, the data is subjected to γ correction by a γ correction unit 311 and is outputted to a printer 312.

Although the image data which has been subjected to the shading correction by the shading correction unit 304 is once stored in a frame memory 314 and based on the instruction by the CPU 313 outputted to a histogram circuit 315 where histogram calculation is conducted. An explanation will be given later of processing of the calculated histogram. The image data stored in the frame memory 314 is outputted to the log conversion unit 308 after rotating it by an image rotation unit 318 as necessary.

Constants such as predetermined weighting data, a number of division in dividing image region etc. are stored in a ROM 316 connected to the CPU 313 and a RAM 317 is used for temporarily storing image data in the midst of processing or data of a result of determination in top and bottom of document and the like.

Figure 14:
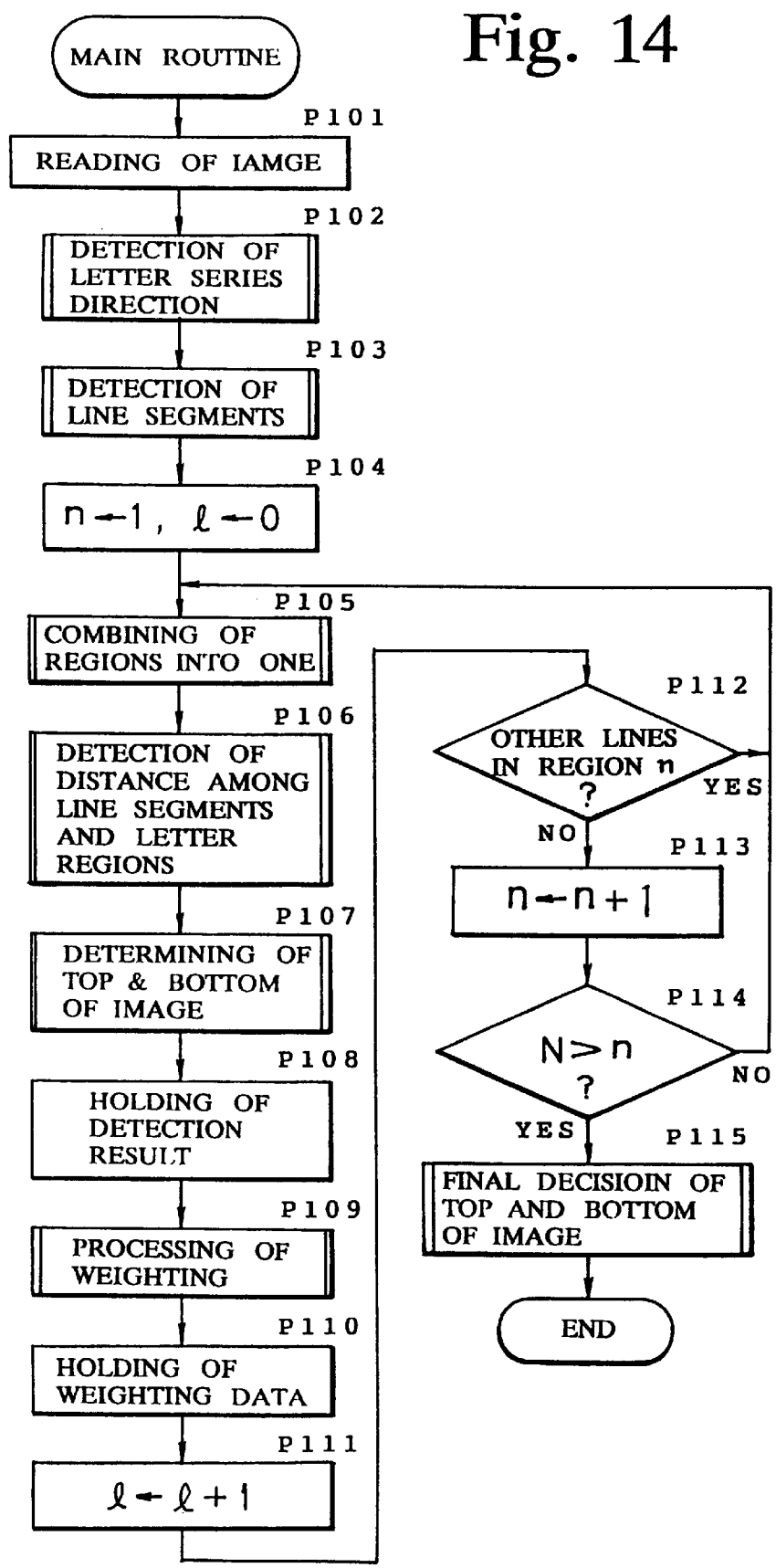

FIG. 14 is a flowchart of the main routine showing the total flow of image data processing executed by the CPU 313. Manuscript as shown by FIG. 12 is set on a document base and scanning is started whereby document image is read by the CCD line sensor 301. The obtained image data is stored in the frame memory 314 after subjecting it to the A/D conversion and shading correction (step P101).

Next, the letter series direction is detected from the image data (step P102), line segments (underline) apart from the letter series direction in a letter series region of which the letter series direction has been detected (step P103). Incidentally, in detecting line segments, they are detected by dividing the document image into a plurality of image regions. A detailed explanation will be given thereof later.

An initial value 1 is set to a counter n of divided region number and an initial value 0 is set to a line segment counter l counting a number of processed line segments (step P104). In detecting line segments, when line segments in one divided document region are present at the same addresses (that is, same position) of contiguous divided regions, these are determined to consist continuous line segments and two or more of regions where the line segment are detected are combined into one (step P105). The regions are combined for enhancing detection accuracy in detecting distances (interval) between line segments and the letter series regions which is successively executed. A detailed explanation will be given thereof later.

Distances (interval) among line segments and letter regions on top and bottom thereof are detected (step P106), top and bottom of document image is determined from the detected distances (interval) (step P107) and data of the result of determination is held (step P108). Also, weighting is performed on the result of determining top and bottom by information (region position information) indicating the position of an image region to which the detected line segment belongs in the document image (step P109) and the data is held (step P110). Accuracy of determining top and bottom of document image can be enhanced by weighting the result of determining top and bottom.

The processing with respect to one line segment has been finished by these steps and therefore, 1 is added to the line segment counter 1 (step P111), presence or absence of other line segments in the divided region is determined (step P112) and if there are other line segments, the processing of step P105 through step P112 is repeated. When there is no line segments in the determination of step P112, the counter n of the divided region, is incremented (step P113), the finishing of processing (N>n) with respect to all the divided regions N is determined (step P114) and the operation returns to step P105 when the processing has not been finished. When the processing has been finished, the operation conducts final decision of top and bottom of document image based on the result of determining top and bottom until that time (step 115) and the processing is finished.

Figure 15:
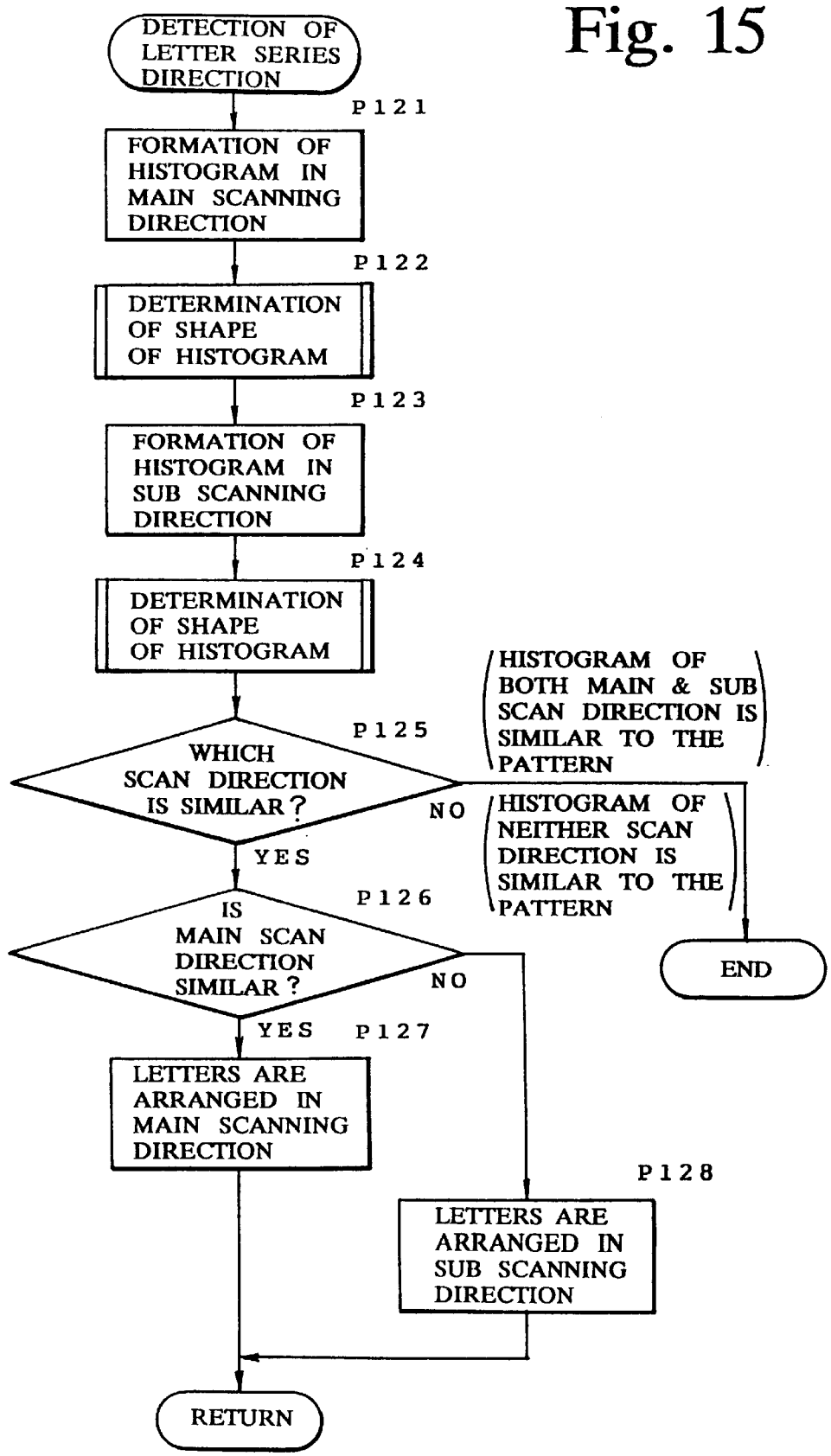

FIG. 15 is a flowchart of a subroutine of detecting the letter series direction which is indicated in the flowchart of FIG. 14 as step P102. First, histograms are formed by calculating cumulative values of image data in the main scanning direction (step P121), whether the shapes of the formed histograms are similar to the predetermined patterns is determined and the result of determination is temporarily stored (step P122).

Similarly, histograms are formed by calculating cumulative values of image data also with respect to the sub scanning direction (step P123) and whether the shapes are similar to the predetermined patterns is determined and the result of determination is temporarily stored (step P124).

The above-mentioned temporarily stored result of determination is investigated (step P125). Further, if the shapes of histograms in the main scanning direction or shapes of histograms in the sub scanning direction is similar to the predetermined pattern, the operation proceeds to step P126.

Also, whether shapes of histograms in the main scanning direction are similar to the predetermined patterns is determined and when the shapes in the main scanning direction are similar to the predetermined patterns, letters are determined to be arranged in the main scanning direction (step P127), or when the main scanning direction is not similar to the predetermined pattern in the determination of step P126 letters are determined to be arranged in the sub scanning direction (step P128) and the operation returns to main routine.

When the determination of step P125 is negative, there are a case where both of the shapes of histograms in the main scanning direction and the shapes of histograms in the sub scanning direction are similar to the predetermined pattern and a case where both of them are not similar to the predetermined pattern. In these cases, the arrangement direction of letters cannot be identified and therefore, they are processed as those of photographic image or other images and identification of top and bottom of document is not performed.

Figure 16:
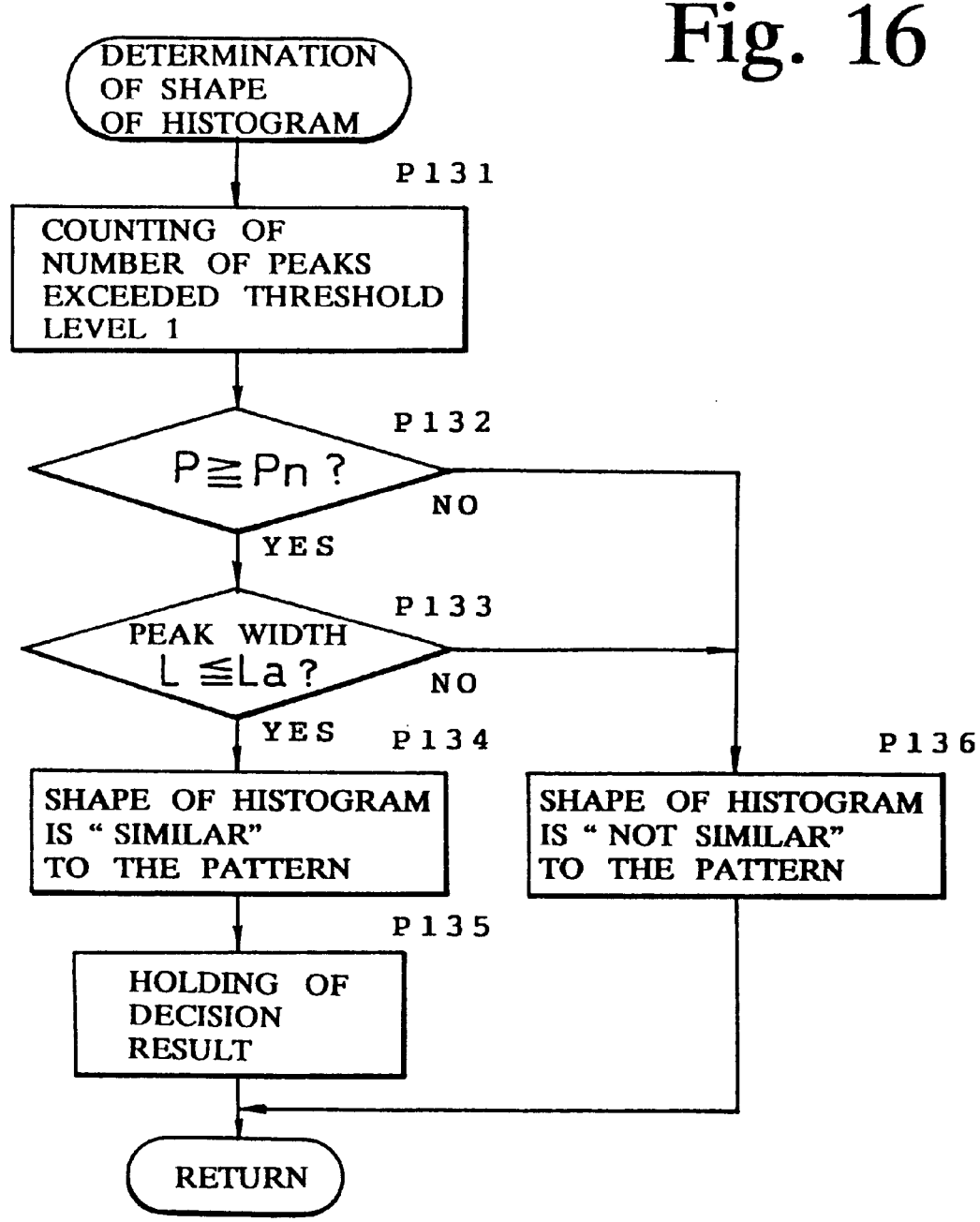

FIG. 16 is a flowchart of a subroutine of determining whether the shapes of histogram indicated in the flowchart of FIG. 15 as steps P122 and P124 are similar to the predetermined pattern in which the determination processing in the main scanning direction and that in the sub scanning direction are the same except that values of parameters Pn and La are different.

Figure 17:
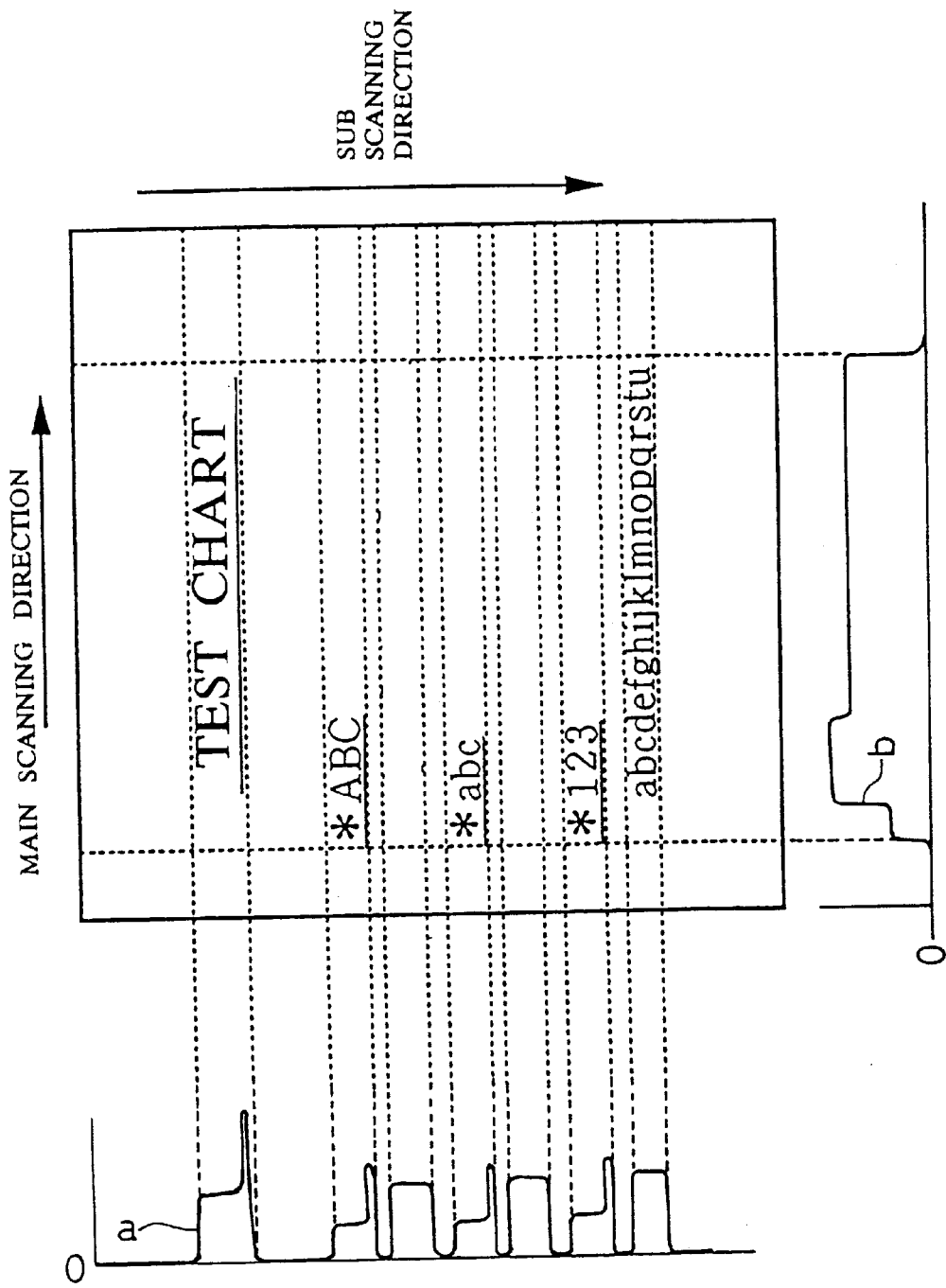
Figure 18A:
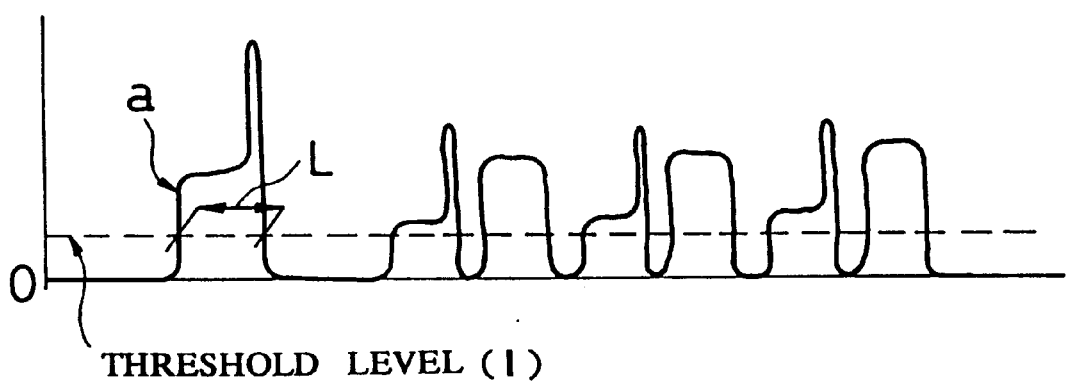
FIGS. 18(a) and 18(b) are diagrams for explaining relationship between histograms and a threshold level (1)
Figure 18B:
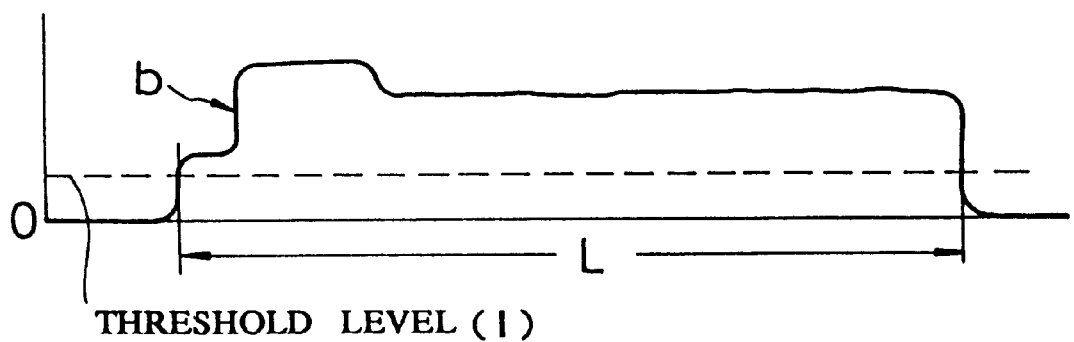

First, it is assumed that a histogram a in the main scanning direction and a histogram b in the sub scanning direction are provided as shown in FIG. 17 by accumulating image data in the main scanning direction and image data in the sub scanning direction of document image. FIGS. 18(a) and 18(b) are diagrams in which a predetermined threshold level (1) is described in the histogram a in the main scanning direction and the histogram b in the sub scanning direction of FIG. 17.

In the flowchart of FIG. 16, it is counted a number P of peaks at which the histograms in the main scanning direction (sub scanning direction) exceed the predetermined threshold level (1) (step P131). Here, the threshold levels (1) signifies a level for determining the letter series direction.

Whether the number P of peaks exceeds a predetermined number Pn (for example, 2) is determined (step P132) and when it exceeds the predetermined number, whether the width L of the peak is equal to or less than a predetermined width La is further determined (step P133). When the number P of peaks exceeds the predetermined number Pn and the width L of the peak is equal to or less than the predetermined width La, whether the shapes of histograms are similar to the predetermined pattern or not is determined (step P134), the result of determination is held in a memory (step P135) and the operation returns to the main routine.

When the number P of peaks does not exceed the predetermined number Pn as the result of determination in step P132 and when the width L of the peaks is more than the predetermined width La as the result of determination in step P133, it is determined that the shapes of histograms are not similar to the predetermined pattern (step P136) and the operation returns to the main routine.

Figure 19:
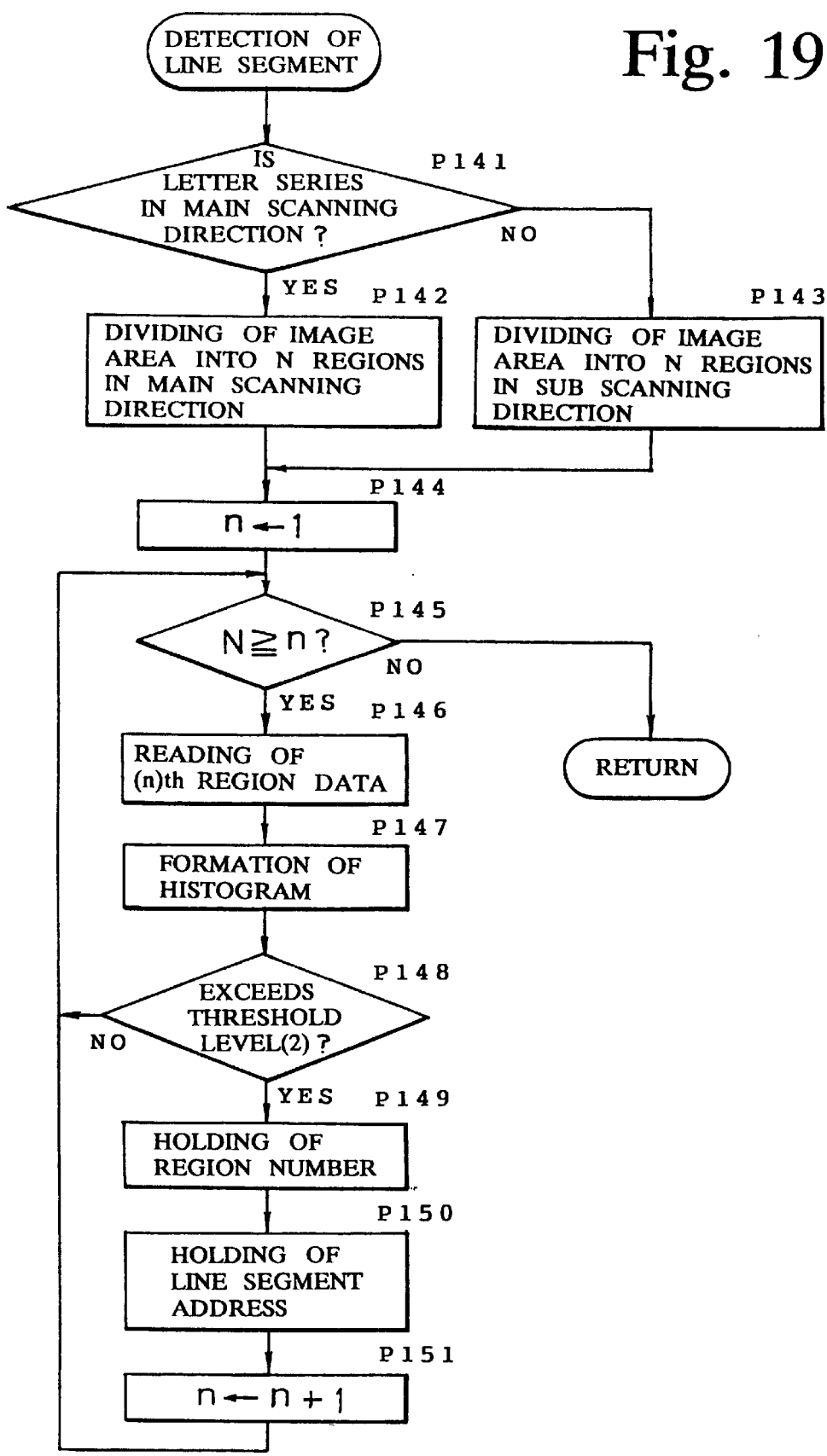
Figure 20:
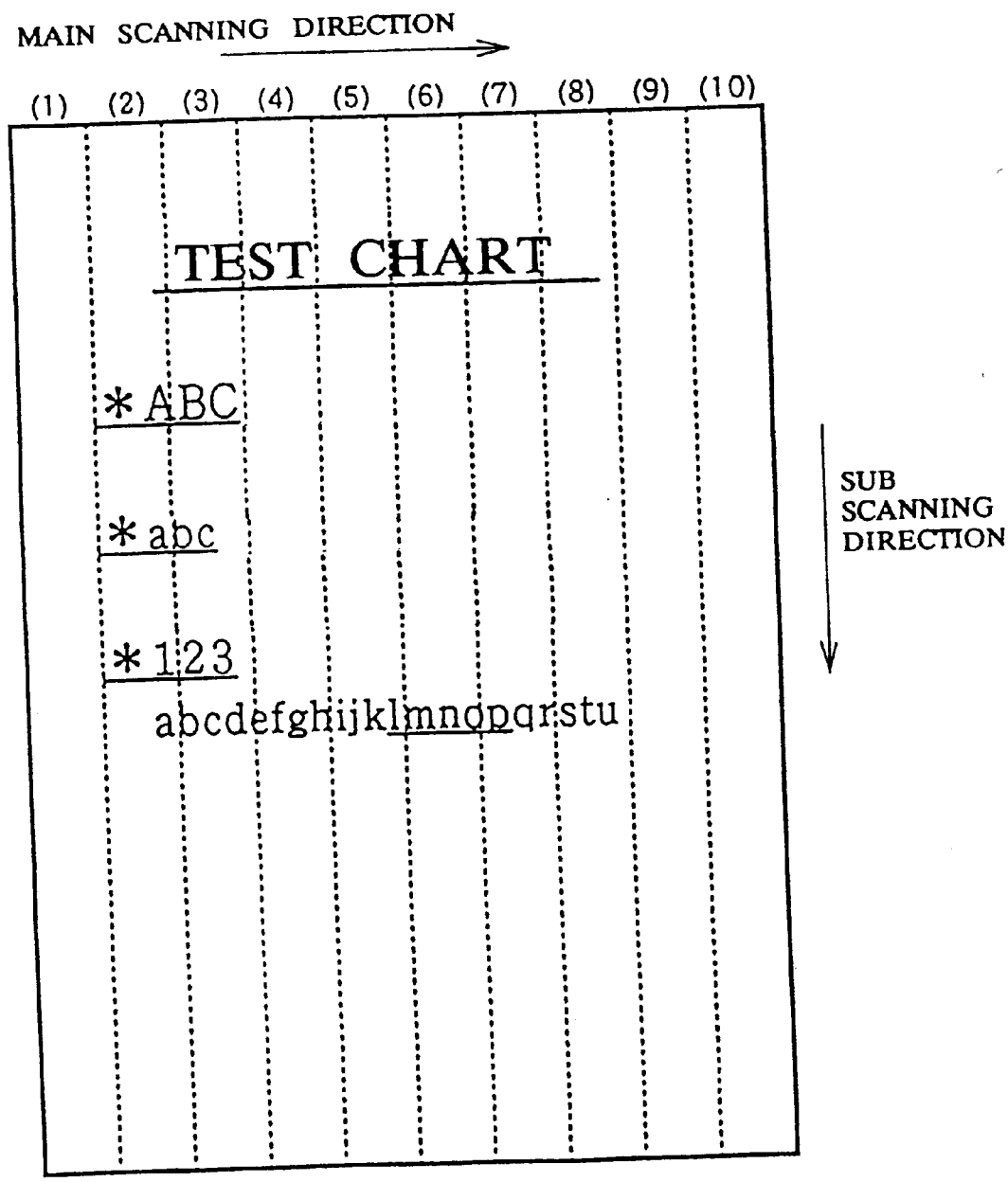

FIG. 19 is a flow chart of a subroutine for detecting line segments which is indicated in the flow chart of FIG. 14 as step P103. First, whether the letter series direction in the document image is in the main scanning direction or the sub scanning direction in reference to the result of detecting the letter series in the document image (step P102 in flow chart of FIG. 14) is determined (step P141), the document image is divided into regions of N in the main scanning direction if it is in the main scanning direction and the document image is divided into regions of N in the sub scanning direction if it is in the sub scanning direction and a number n of region is set (steps P142, P143). For example, when the letter series direction is the main scanning direction, the document image is divided into 10 regions in the main scanning direction as illustrated in FIG. 20.

Figures 21A, 21B:
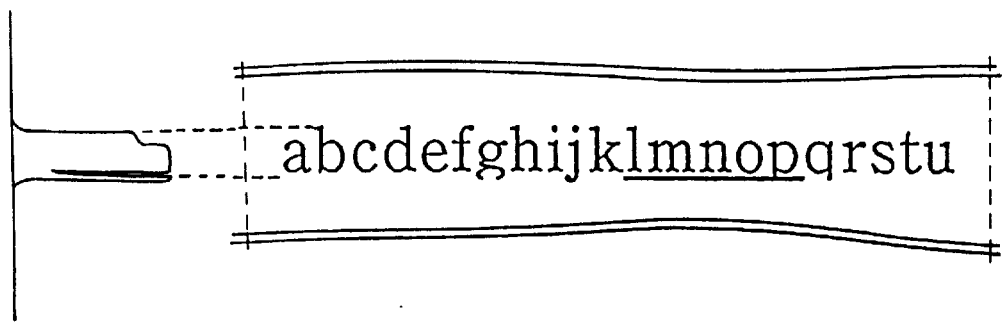
FIGS. 21(a), 21(b), 21(c) and 21(d) are diagrams for explaining detection of line segment in case where document image is not divided and in case where it is divided.
Figures 21C, 21D:
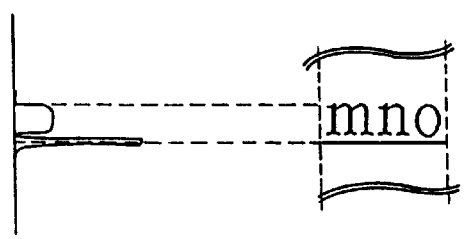

Here, the document image is divided into a plurality of regions to enhance detection accuracy of line segments in the document image. That is, as shown in FIG. 21(a) where the document image is not divided, as is illustrated in a formed histogram of FIG. 21(b) there is almost no difference between a peak value of a histogram of the letter series region and a peak value of a histogram of a line segment, making difficult detection of the line segment. By contrast, when the document image is divided as shown in FIG. 21(c), as is illustrated in FIG. 21(d) of a histogram formed by a divided region, the difference between a peak value of a histogram of the letter series region and a peak value of a histogram of a line segment becomes clear, facilitating detection of line segments. Incidentally, a number of dividing of image region is arbitrarily set in accordance with size of document image, size of letter, etc.

An initial value 1 is set to a counter of region number (step P144) and whether the content of the counter of region number is smaller than a number n of division of region, that is, whether the processing has been finished with respect to all the region is determined (step P145). When the processing has been finished for all the regions the operation returns to the main routine. When N≧n, that is, the processing has not been finished, n-th region data is read (step P146) and a histogram is formed by accumulating image data in the letter series direction (step P147).

Whether there are histograms exceeding a predetermined threshold level (2) is determined (step P148). Here, the threshold level (2) indicates a level of detecting line segments. When there is one exceeding the level (2), the region number and the address of the line segment are held (steps P149, P150) the region number n is incremented (step P151), the operation returns to step P145 and the processing is repeated for all the regions. When the histogram does not exceed the threshold level (2) in the determination of step P148, the operation returns to step P145.

Figure 22:
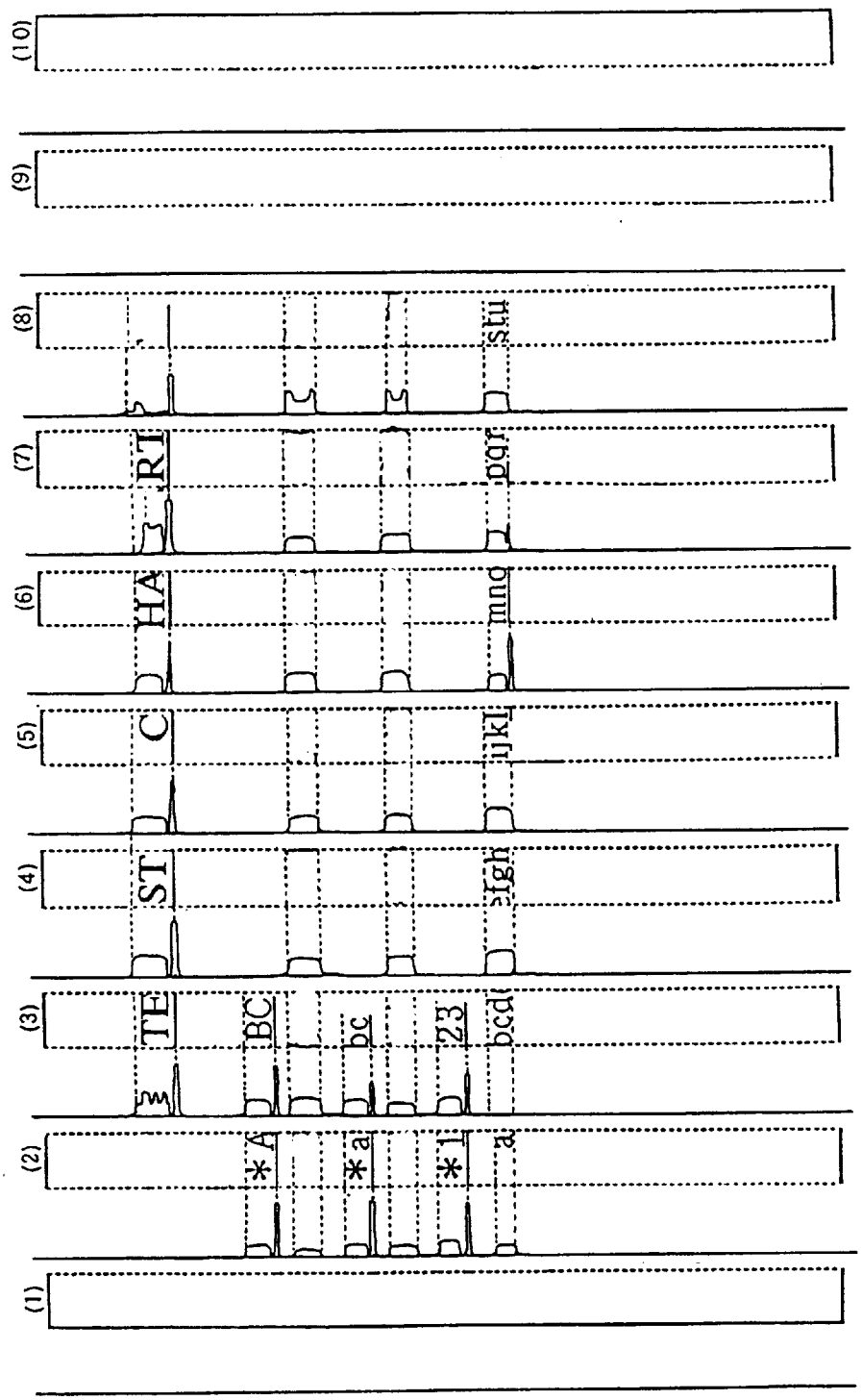
Figure 23:
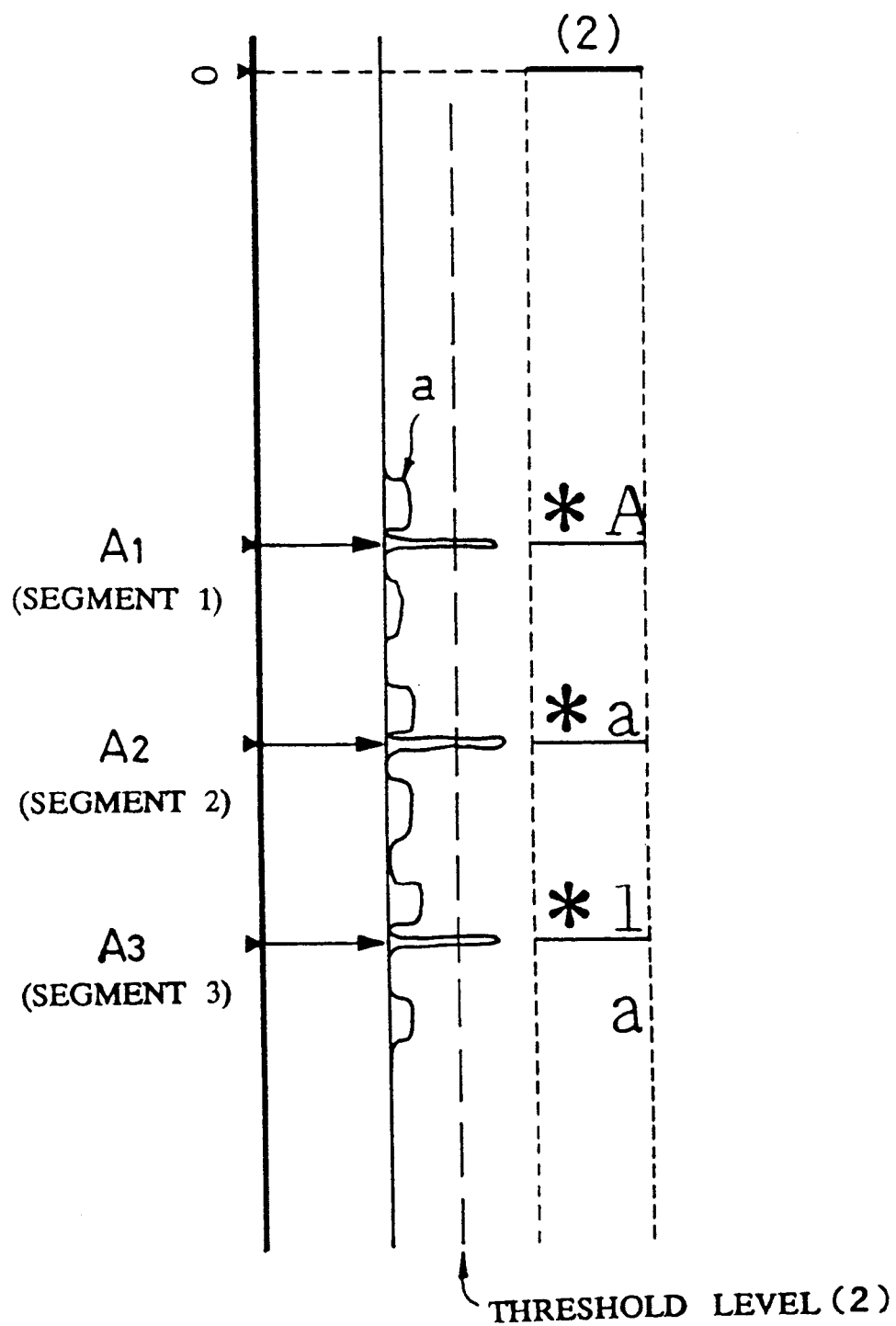

FIG. 22 illustrates histograms a formed for every divided region of document image that is shown in FIG. 20 and FIG. 23 illustrates histograms a at region number 2 by magnifying them. In FIG. 23 line segments 1, 2 and 3 exceeding the threshold level (2) are detected and the addresses of these line segments are designated by A1, A2 and A3.

While the processing for the respective divided region has been finished by the above procedure, there is a case where a line segment detected in one region is continuous to a contiguous region and in this case combination of regions is performed to enhance detection accuracy of line segments.

Figure 24:
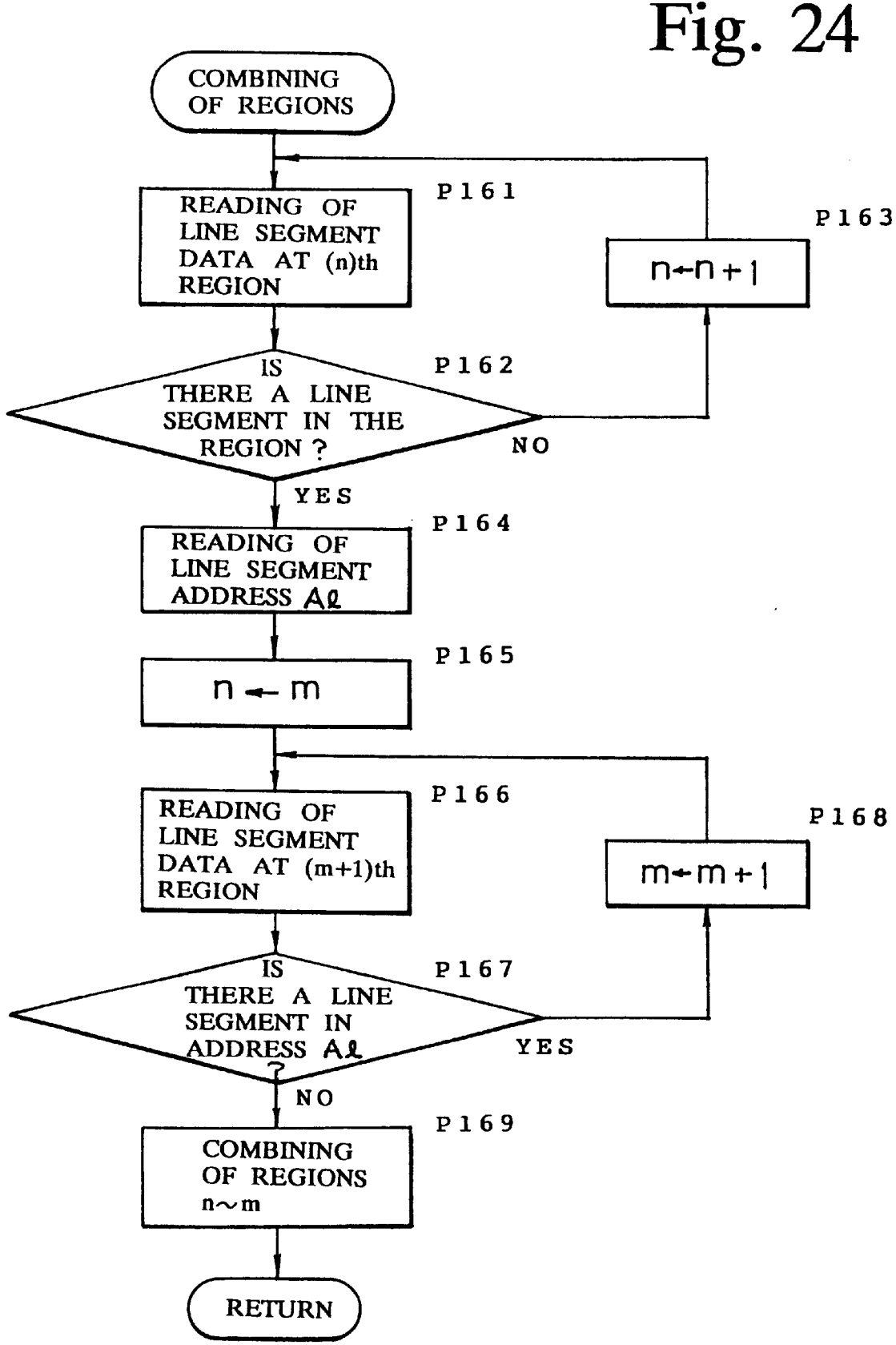

FIG. 24 is a subroutine of combining of regions which is shown in the flow chart of FIG. 14 as step P105. First, line segment data at n-th region is read (step P161), whether there is a line segment in the region is determined (step P162), when there is no line segment the region number n is incremented (step P163) and the operation returns to step P161. When there is a line segment in the region the address A1 of the line segment is read (step P164).

The region number n is replaced by m (step P165), line segment data of a contiguous (m+1)-th region is read (step P166) and whether there is a line segment in the address A1 is determined (step P167). When there is a line segment in the address A1, the region number m is incremented to investigate presence or absence of a line segment in a further contiguous region (step P168) and the operation returns to step P166. When there is no line segment in the address A1 in the determination of step P167, the regions n through m which are determined to have line segments by the determination of these steps are combined (step P169) and the operation returns to the main routine.

Figure 25:
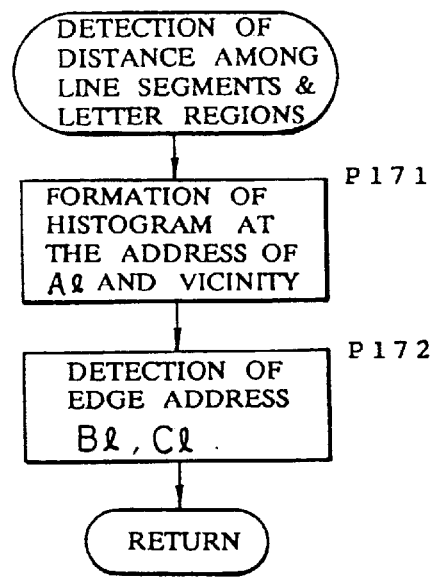
Figure 26:
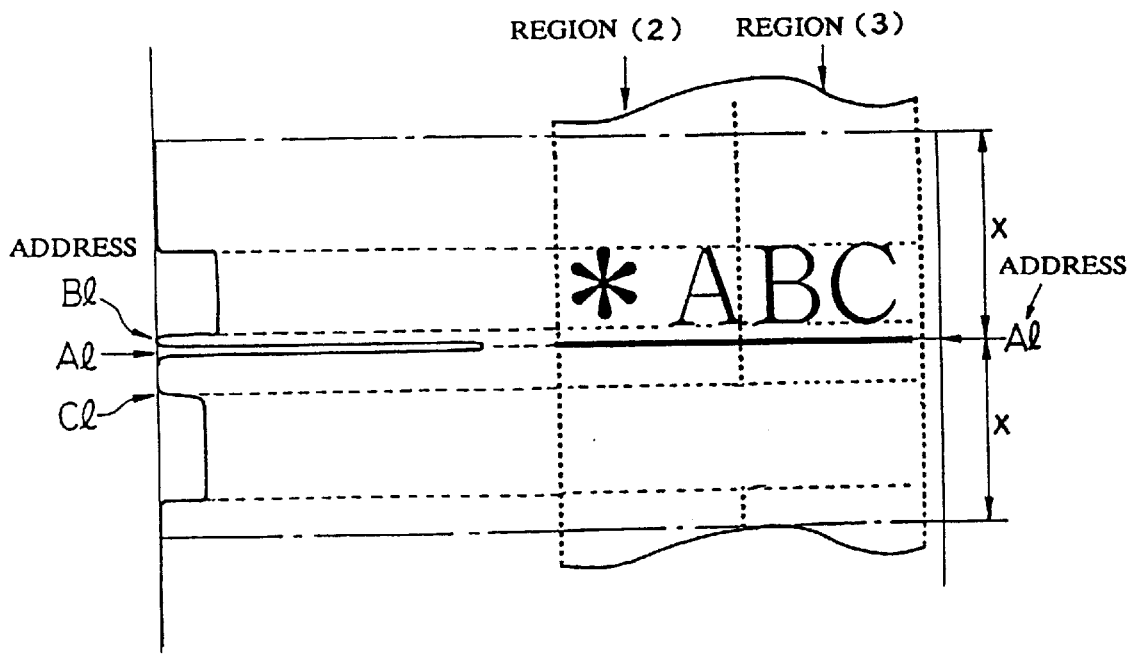

FIG. 25 is a flow chart of a subroutine of detecting distances among line segments and letter series region which is indicated in the flow chart of FIG. 14 as step P106. Here, an explanation will be given thereof with a document image where a region (2) and a region (3) are combined since there is a line segment at the address of A1 of the second region (2) and the third region (3) as illustrated in FIG. 26.

First, histograms are formed by accumulating image data at the address A1 having the line segment and the vicinity (step P171). Next, addresses B1 and C1 of a rising edge and a falling edge of the histograms of letter series before and after the address A1, are detected (step P172) and the operation returns to the main routine. The distances among the line segments and the letter series regions can be known by the detected addresses B1 and C1.

Figure 27:
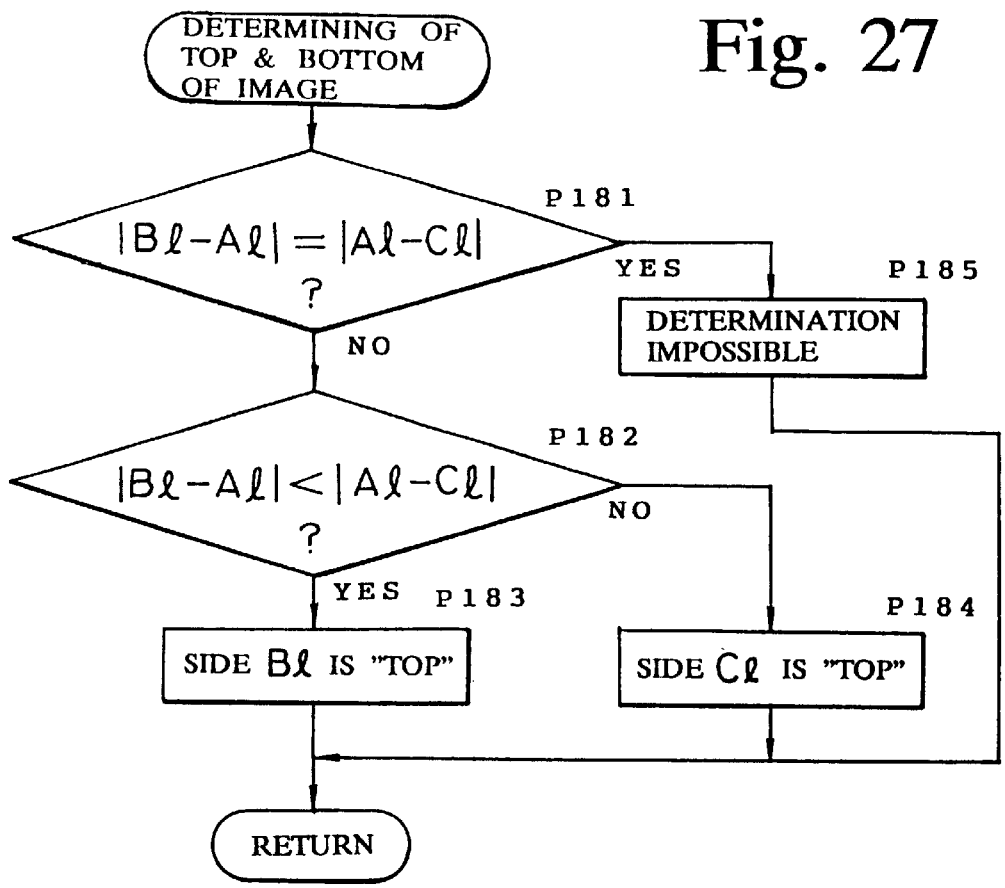

FIG. 27 is a flow chart of a subroutine of determining top and bottom of document image which is indicated in the flow chart of FIG. 14 as step P107. Here, an explanation will be given thereof with a document image where the region (2) and the region (3) are combined as example since there is the line segment at the address A1 of the second region (2) and the third region (3) as illustrated in FIG. 26.

First, determination is given to whether the distance between the upper side letter series region and the line segment of the document image, that is, an absolute value of a difference |B1–A1| between the address B1 of the falling edge of the histogram for the letter series at the forward position of the line segment and the line segment address A1, is equal to an absolute value of a difference |A1–C1| between the line segment address A1 and the address C1 of the rising edge of the histogram for the letter series at the rearward position of the line segment (step P181). When the absolute values of the differences are equal, it signifies that the line segment is in the same distance from the top and bottom letter series and accordingly, it is determined that the determination of top and bottom of the document image is impossible (step P185) and the operation returns to the main routine.

When the absolute values of the differences are not equal in the determination of step P181, determination is given to whether the distance between the upper side letter series region and the segment, that is, the absolute value of the difference |B1–A1| between the address B1 of the falling edge of the histogram for the letter series at the forward position of the line segment and the line segment address A1, is smaller than the distance between the lower side letter series region and the segment, that is, the absolute value of the difference |A1–C1| between the line segment address A1 and the address C1 of the rising edge of the histogram for the letter series at the rearward position of the line segment (step P182).

When |B1–A1|<|A1–C1| as a result of the above determination, it signifies that the line segment is more proximate to the upper side letter series as shown in FIG. 26 and accordingly, it is determined that the side of the address B1 of the falling edge of the histogram for the upper side letter series is determined to be the top of the document image (step P183). Further, when |B1–A1|>|A1–C1|, it signifies that the line segment is more proximate to the lower side letter series and therefore, it is determined that the side of the address C1 of the rising edge of the histogram for the lower side of the letter series is determined to be the top of the document image (step P184).

When the determination of top and bottom of the document image has been finished based on the address information in the vicinity of the line segment, recognition information of top and bottom determined with respect to the line segment (address A1) is used for the final determination of top and bottom. In the weighting of recognition information of top and bottom concerning the line segment, weighting information is previously provided to respective regions of document image divided into a plurality of regions and the weighting information is utilized.

Figure 29:
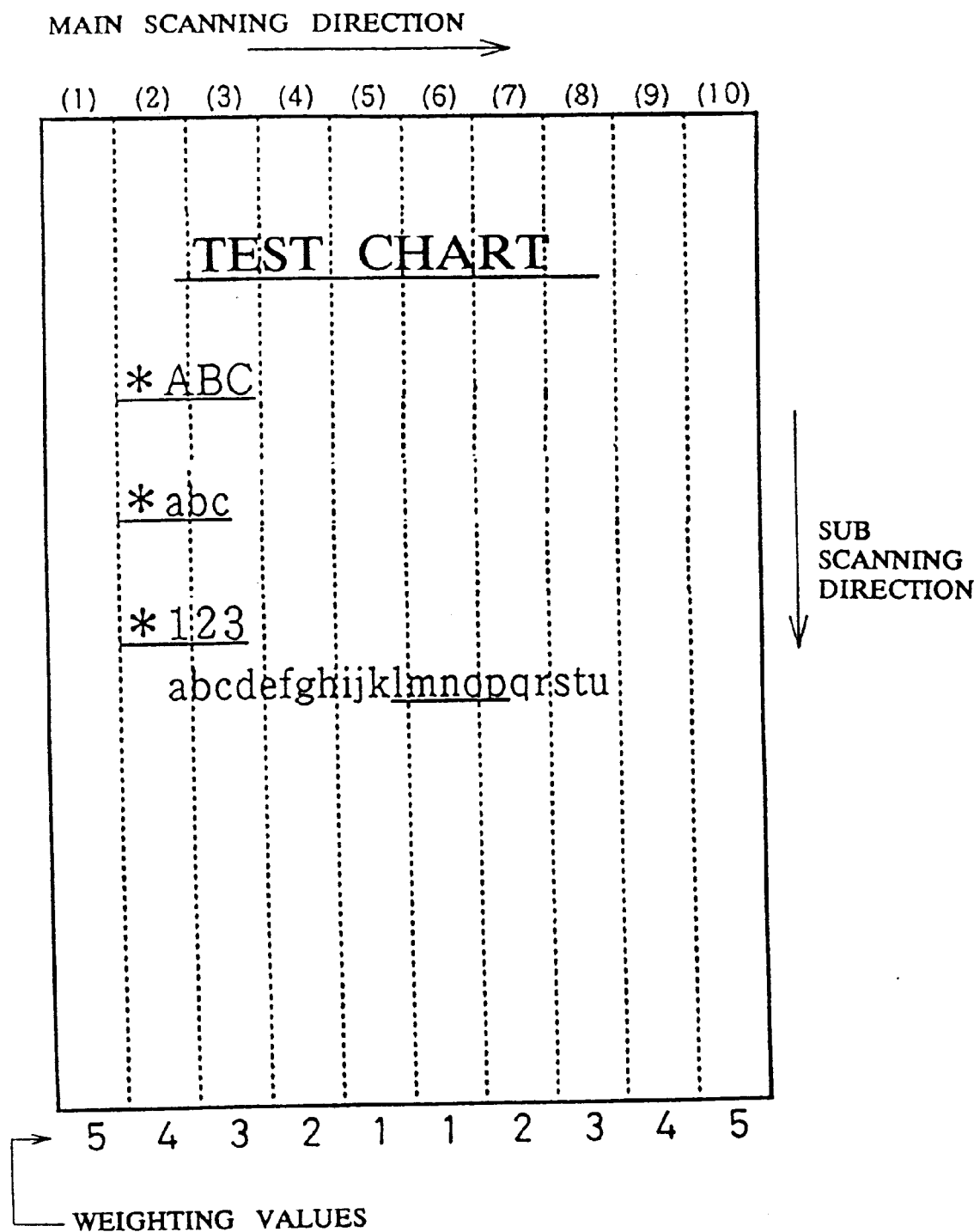
Figure 30:
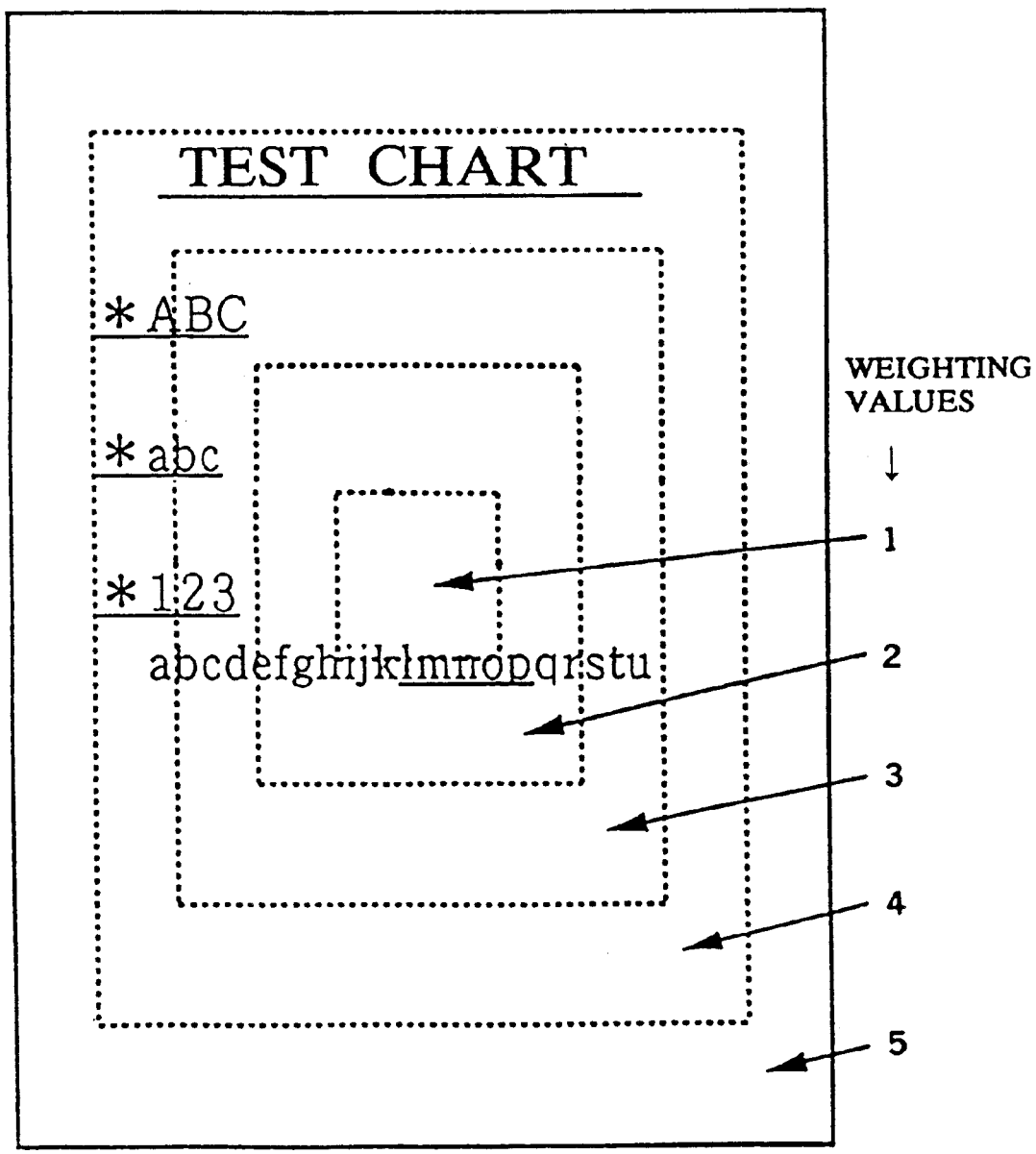

In this embodiment attention is paid to the fact that the underlines are often drawn at headings in sentences of document image, weighting information having low value is given to regions at central portions of document image and weighting information having high value is given to outer regions thereof as illustrated in FIG. 29. Otherwise, for example, as shown in FIG. 30, that having high value is given to surrounding regions of document image face and that having low value is given to central region. As illustrated in these cases pertinent weighting that is effective in recognizing top and bottom of document image can be conducted.

Figure 28:
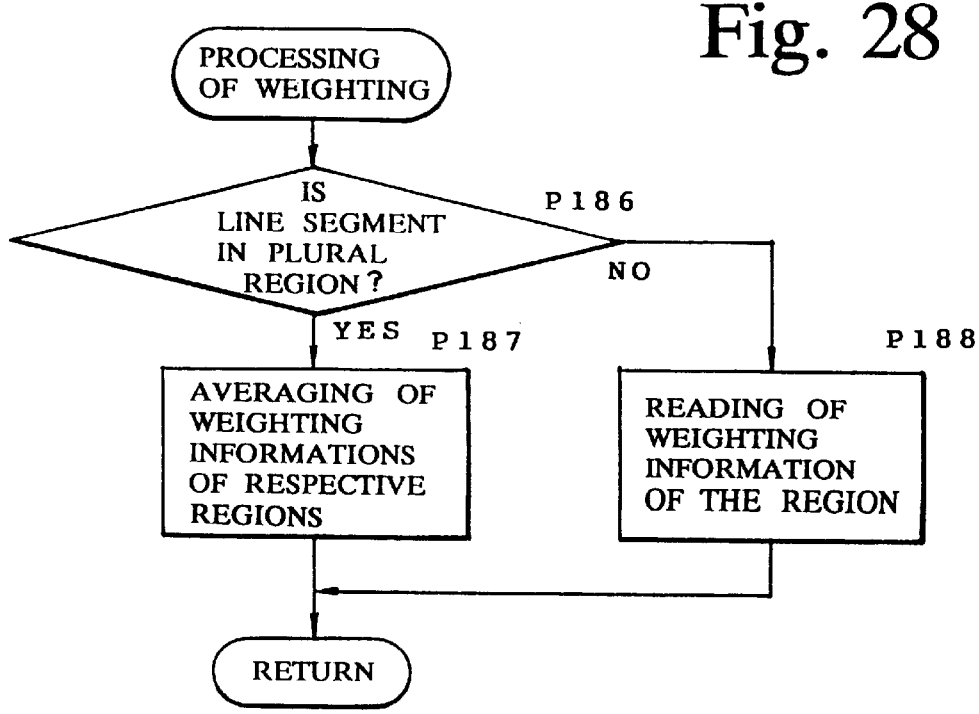

FIG. 28 is a flow chart of a subroutine of weighting which is indicated in the flow chart of FIG. 14 as step P109. First, whether a line segment of an object is a line segment spanning over a plurality of regions is determined (step P186) and if it is a line segment spanning over a plurality of regions, a value arithmetically averaging weighting information provided to respective regions is rendered a value of weighting (step P187). Further, if it is a line segment of a single region, weighting information provided to the region is rendered a value of weighting (step P188).

The recognition of top and bottom of document image and the determination of weighting value have been performed by the above processings and final determination of top and bottom of document image is performed from these informations.

Figure 31:
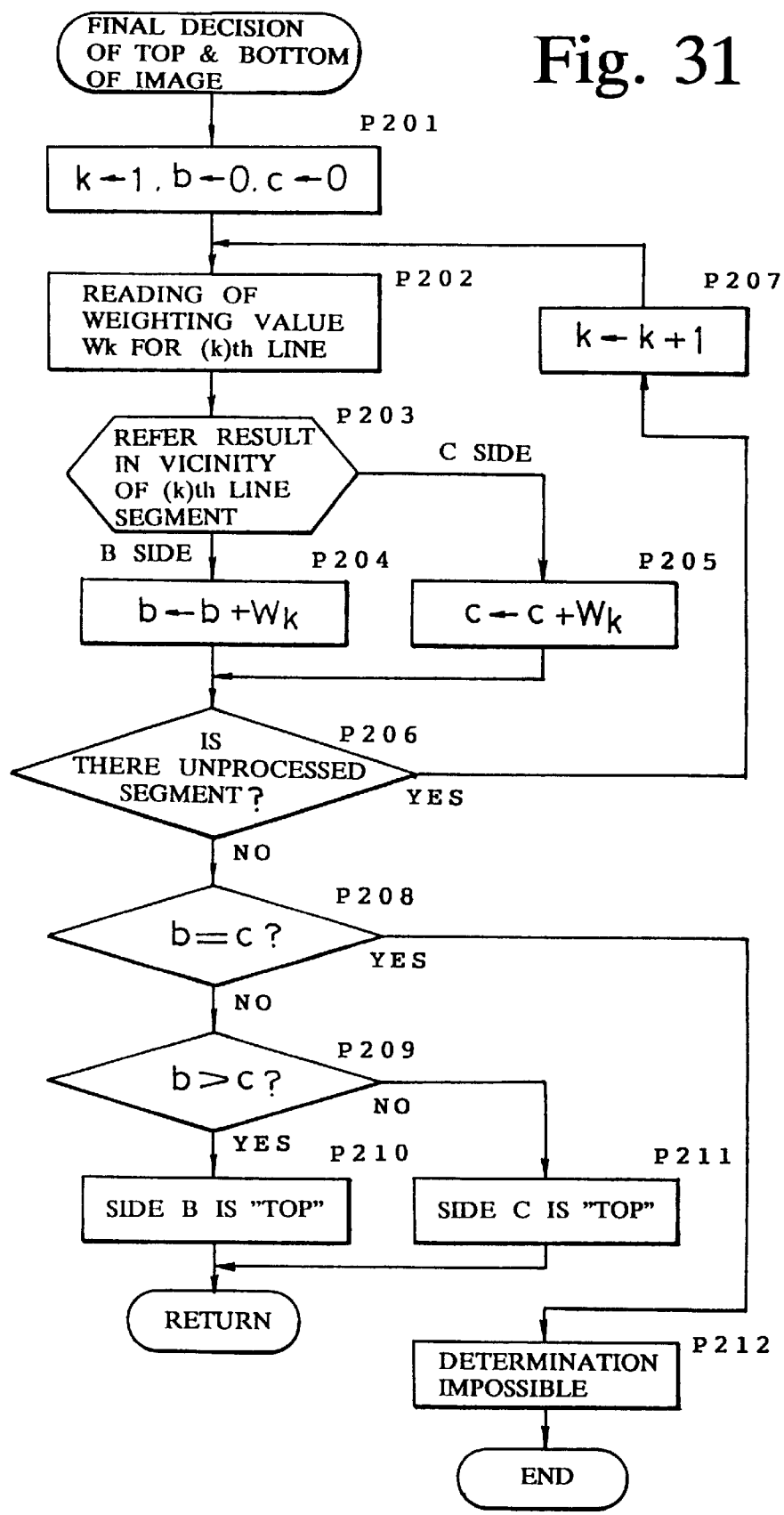

FIG. 31 is a flow chart of a subroutine of final decision of top and bottom of document image which is indicated in the flow chart of FIG. 14 as step P115. Here, an explanation will be given of an example shown in FIG. 32. The number of line segments is counted by the line segment counter l (refer to step P111 in flow chart of FIG. 14) and a total of 5 thereof is assumed.

First, initial values are set to counters k, b and c (step P201) and a weighting value Wk for k-th line segment is read (step P202). Further, a determination result of top and bottom in the vicinity of a k-th line segment is referred (step P203). When B side (explaining by FIG. 26, address Bl side of falling edge of histogram for upper side letter series) is the top, the weighting value Wk is added to the counter b (step P204), when C side (explaining by FIG. 26, address Cl side of rising edge of histogram for lower side letter series) is the top, the weighting value Wk is added to the counter c (step P205) and the operation returns to the main routine.

Presence or absence of a next unprocessed line segment is determined by the content of the counter k (step P206), if there is an unprocessed line segment counter k is incremented (step P207), the operation returns to step P202 and the steps are repeated until the processing with regard to all the line segments (5) is finished.

When the processing for all the segments is finished, the content of the counter b is compared with the content of the counter c (step P208) and if b≠c, that is, a sum value of weighting on the B side is not equal to a sum value of weighting on the C side, whether b>c is determined (step P209).

When b>c in the determination of step P209, that is, the sum value of weighting on the B side is larger, the B side is determined to be the top (step P210) whereas when b<c, that is, the sum value of weighting on the C side is larger, the C side is determined to be the top (step P211) and the operation returns to the main routine.

Also, if b=c in the determination of step P208, that is, the sum value of weighting on the B side is equal to the sum value of weighting on the C side, it is determined that the final determination of top and bottom of document image cannot be performed (step P212) and the processing is finished.

Figure 32:
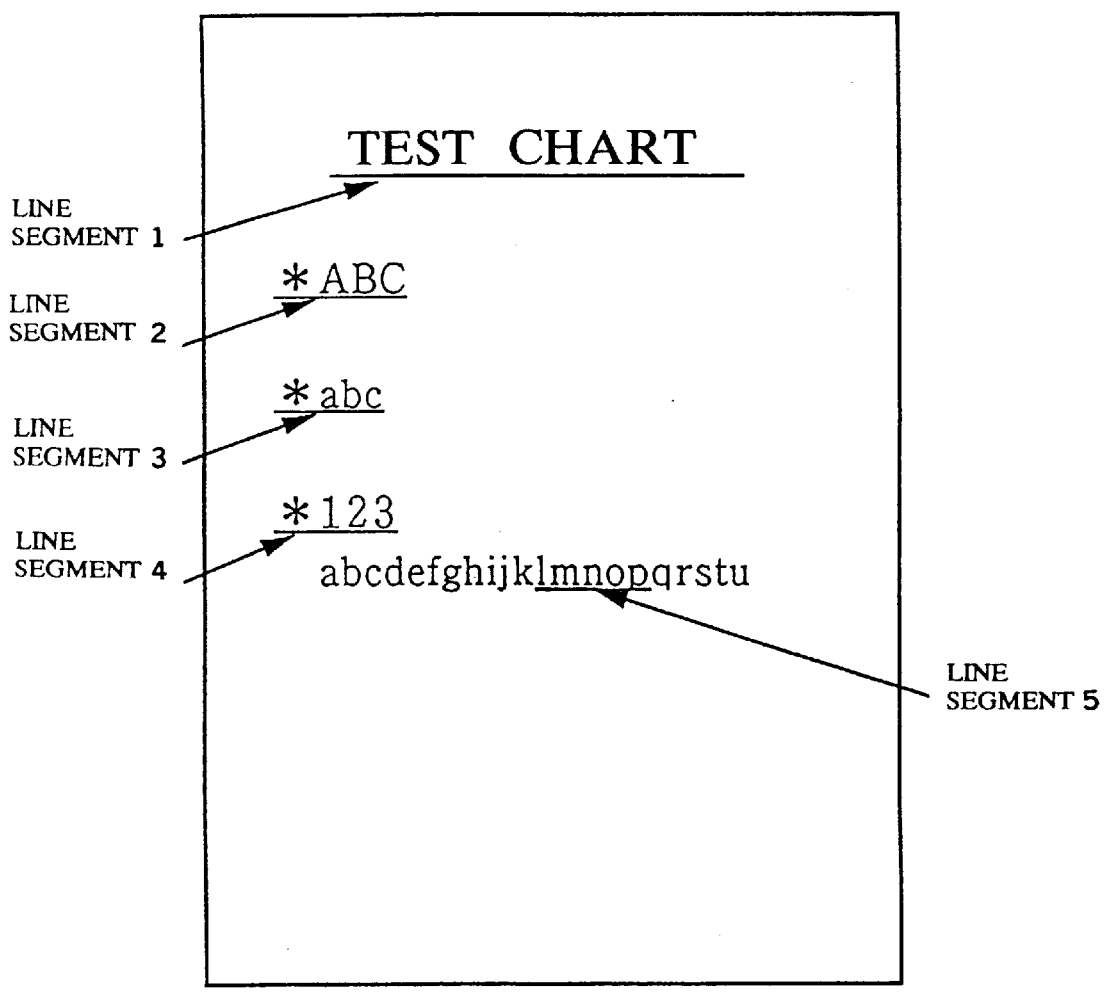

In the document image as illustrated in FIG. 32 all of the line segments (5) are determined such that the B side direction thereof is the top and accordingly, the B side is determined to be the top in the sum value of weighting.

As stated above, the determination of top and bottom of document image can be performed by distances among letter series regions and line segments of the document image. Therefore, in processing the plurality of sheets of document, the top and bottom of document image is determined based on a result of reading the first sheet of document and if document image in a direction reverse to the determined top and bottom is discovered, the document image may be outputted by rotating it. Or, the top and bottom of document image is previously determined and if document image in a direction reverse to the previously determined top and bottom is discovered, the document image may be outputted by rotating it.

Additionally, in an image forming apparatus having no function of rotating document image, alarm may be issued if document image in a direction reverse to determined top and bottom is discovered.

In the second embodiment explained as above, locations of letter series regions are detected by cumulative values of image signals in scanning directions corresponding to an image region of a single page of document stored in a storing means and locations of line segments displaced from the letter series regions in a vertical direction are detected and the top and bottom of the document image is determined by relationships among the detected locations of the letter series regions and the detected locations of the line segments. Accordingly, high image processing is not necessary as in the conventional method of determining top and bottom document image in which samples of letter images provided by scanning document are compared with separately prepared reference letters and the determination of top and bottom of document image can easily and accurately be performed with slight increase of cost.

Embodiment 3

In Embodiment 3, attention is paid to specific patterns (marks) indicated on document and top and bottom, and left and right of document image is recognized by forming a histogram of a cumulative value of a number of pattern the same as the specific pattern in the main scanning direction and a histogram of a cumulative value of a number thereof in the sub scanning direction within an image region for one page of document and based on characteristics of a distribution state of the histogram in the main scanning direction and a distribution state of the histogram in the sub scanning direction.

Figure 33:
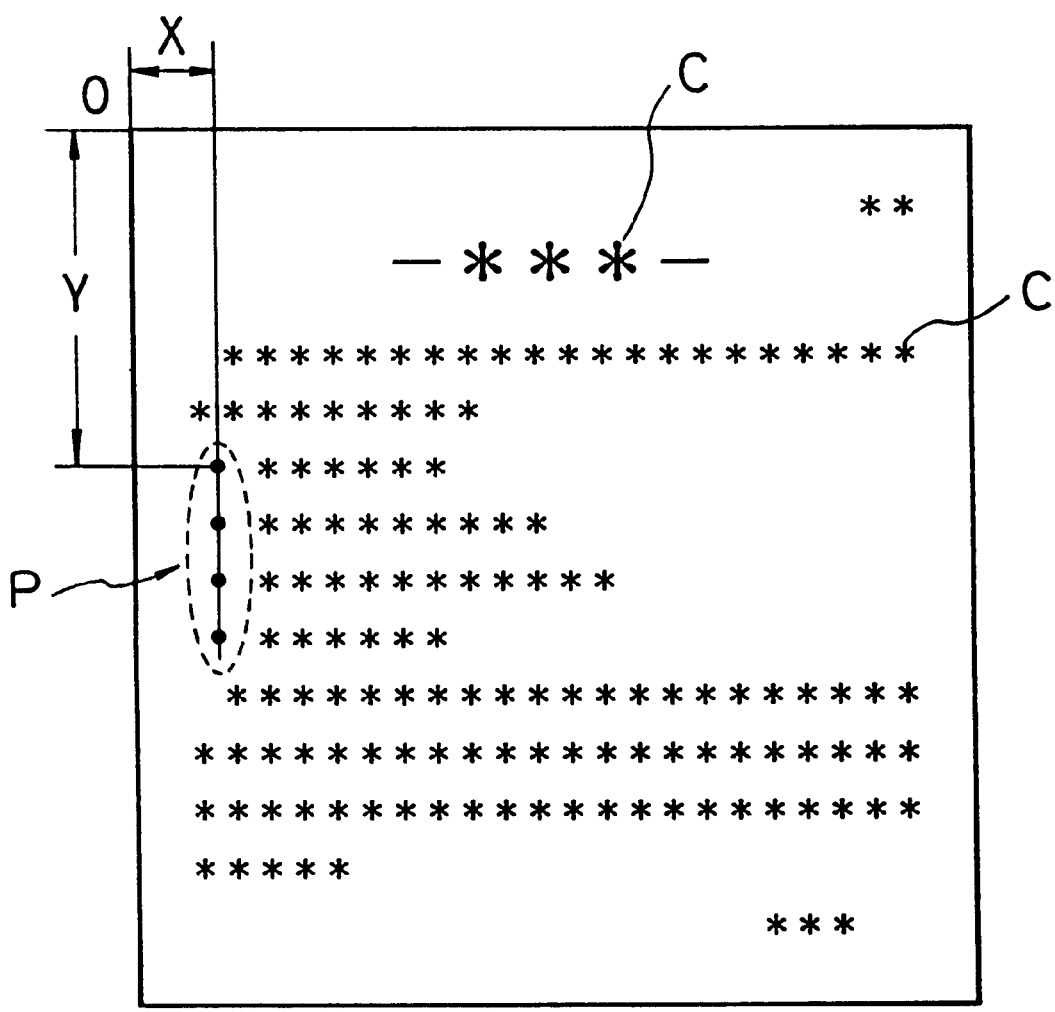

An explanation will be given of Embodiment 3 of the present invention as follows. First, an explanation will be given of a method of determining top and bottom or sideways arrangement of document image. FIG. 33 illustrates an example of document image in which a plurality of asterisks "*" designated by notation C represent general letters. Also, a plurality of black circles "●" designated by notation P on the document are signs occurring, for example, at the front of letter series with high frequency in letter series of the document image. In the following explanation, in the document image as illustrated in FIG. 33 the top side of the drawings is rendered the "top".

In Embodiment 3, the locations and the frequency of occurrence of the above-mentioned signs (hereinafter, specific patterns) occurring on the document with comparatively high frequency, are investigated and the top and bottom or sideway arrangement of the document image is determined from the result of investigation.

When an x-y coordinate system is set as shown in FIG. 33 with the left top of document sheet as the original point in FIG. 33, the position of a black circle "●" designated by notation P that is a specific pattern, can be represented by coordinate values (X, Y) in the coordinate system.

Figure 34A:
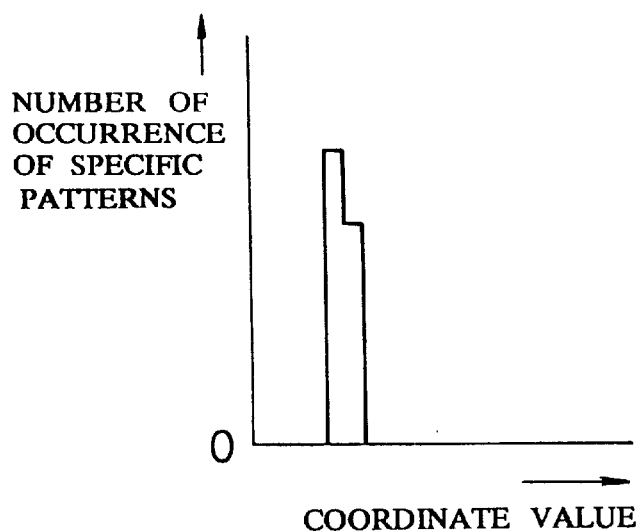
Figure 34B:
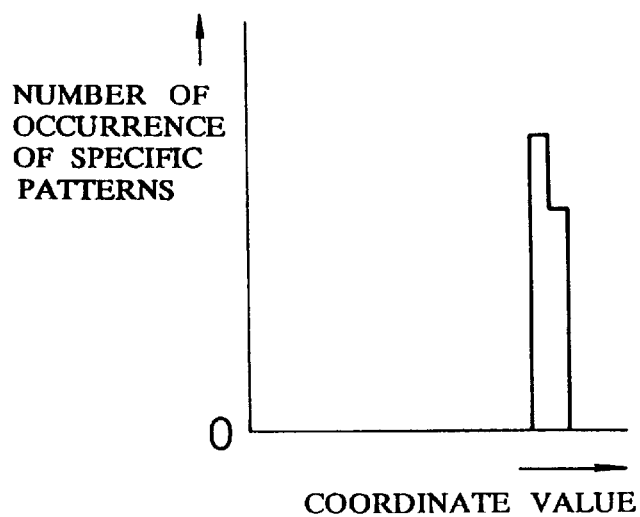
Figures 34C, 35:
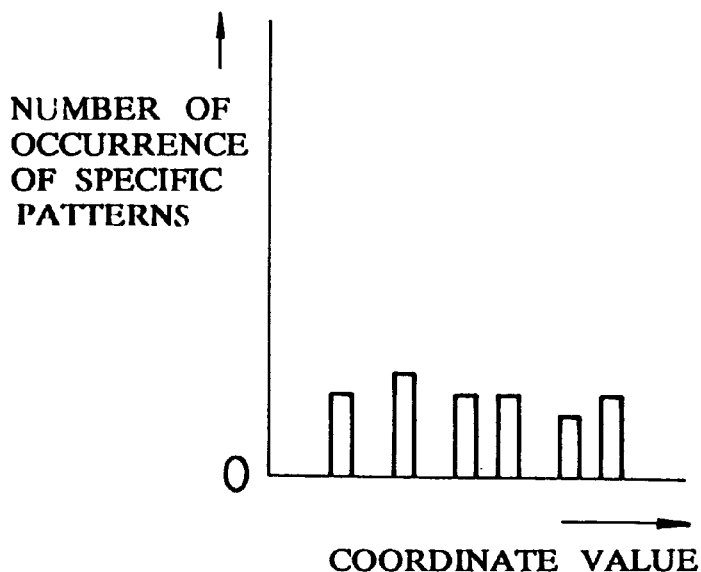

FIGS. 34(a), 34(b) and 34(c) illustrate cumulative values of numbers of occurrence of the coordinate locations of the specific pattern (black circle "●") in histograms. That is, FIG. 34(a) is a histogram of a number of occurrence with respect to the coordinate value in the x-axis direction of the specific pattern (black circle "●") of FIG. 33 and FIG. 34(c) is a histogram of a number of occurrence with respect to the coordinate value in the y-axis direction of the specific pattern (black circle "●") of FIG. 33.

As is apparent from these diagrams, at a location of the specific pattern of the image shown by FIG. 33, there is a peak at a location of the coordinate in the x-axis direction proximate to the original point in the histogram of the number of occurrence of the specific pattern in respect of the coordinate value in the x-axis direction as illustrated in FIG. 34(a). Further, the histogram of the number of occurrence of the specific pattern in respect of the coordinate value in the y-axis direction is distributed dispersingly in the y-axis direction as illustrated in FIG. 34(c).

Figure 36:
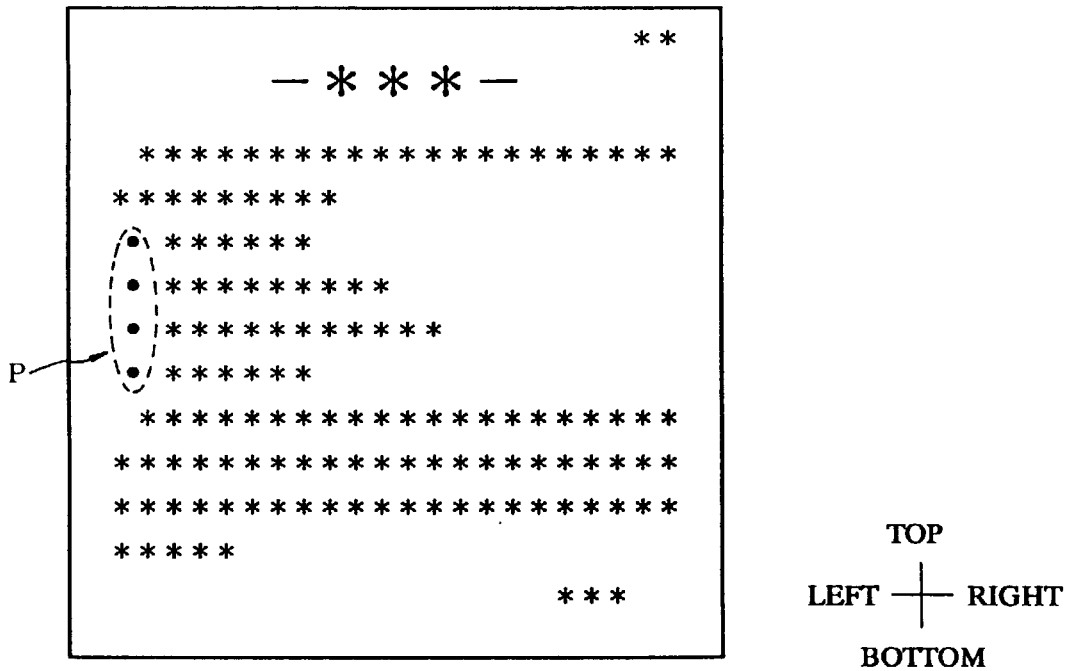

Accordingly, in the case where the x-y coordinate system is set with the top left corner of the document image as the original point, the histogram in respect of the coordinate value of the specific pattern in the x-axis direction on the document image shows a distribution shape as illustrated in FIG. 34(a) and the histogram in respect of the coordinate value in the y-axis direction shows a distribution shape as illustrated in FIG. 34(c), it can be determined that the document image is an image having the specific pattern P and the location illustrated in FIG. 33 and FIG. 36 and the top side (side on which the original point of the coordinate is set at the top left corner) is the "top".

Also, FIG. 34(b) is a histogram of a number of occurrence of the specific pattern (black circle "●") in respect of the coordinate value in the x-axis direction in the case where the document shown in FIG. 33 is placed such that the top and bottom thereof is reversed and the histogram has a shape displaced to the right side compared with that of FIG. 34(a) since the specific pattern is displaced to the right side of the document.

Figure 37:
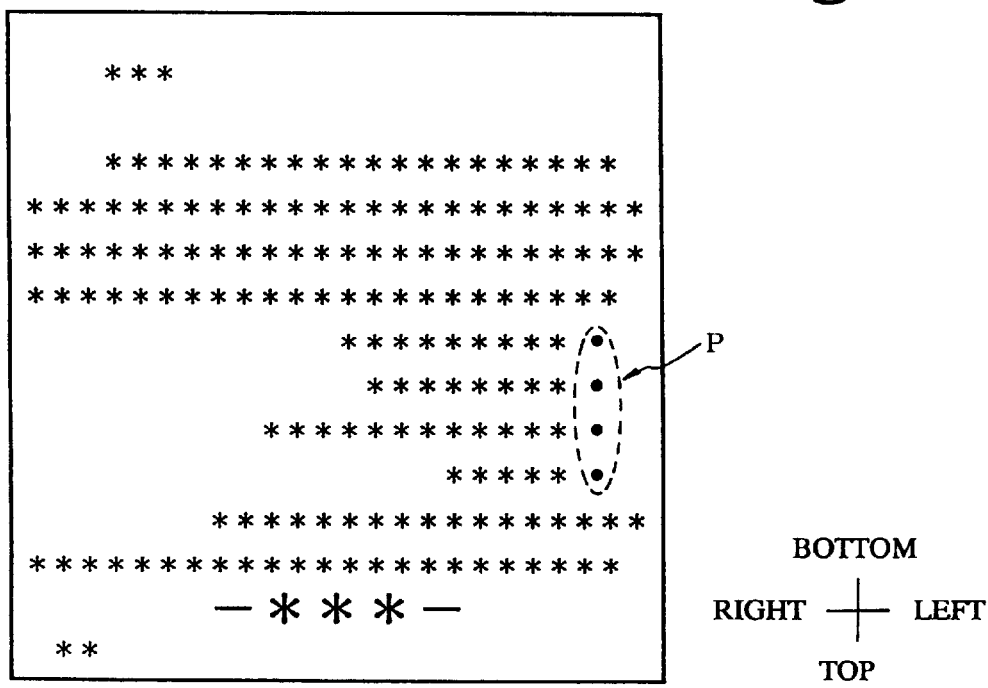

Therefore, in the case where the x-y coordinate system in which the top left corner of document image is rendered the original point is set to the document image, a histogram in respect of the coordinate value of a specific pattern in the x-axis direction on the document image indicates a distribution shape as illustrated in FIG. 34(b) and a histogram in respect of the coordinate value in the y-axis direction indicates a distribution shape as illustrated in FIG. 34(c), it is possible to determine the document image is an image having the specific pattern P at the location as illustrated in FIG. 37 and the bottom side is the "top".

FIG. 35 shows a determination table determining top and bottom, and rotational positions of 90° left and right from the distribution shapes of the histograms as illustrated in FIGS. 34(a), 34(b) and 34(c). FIG. 36 through FIG. 39 show respectively an image the same as the image illustrated in FIG. 33, an image formed by reversing the top and bottom of the image of FIG. 33 and image formed by rotating it by 90° left and an image formed by rotating it by 90° right. An explanation will be given of determination of top and bottom, rotational positions of 90° left and right of the image according to the distribution shapes of the histograms.

First, in the case where a distribution shape of the histogram of the specific pattern in respect of the coordinate value in the x-axis direction is as illustrated in FIG. 34(a) and a distribution shape of the histogram thereof in respect of the coordinate value in the y-axis direction is as illustrated in FIG. 34(c), the document image is at a position as illustrated in FIG. 36 and it can be determined that the top of FIG. 36 is the "top".

In the case where the distribution shape of the histogram in respect of the coordinate value in the x-axis direction is as illustrated in FIG. 34(b) and the distribution shape of the histogram in respect of the coordinate value in the y-axis direction is as illustrated in FIG. 34(c), the document image is at a position as illustrated in FIG. 37 and it is possible to determine that the bottom of FIG. 37 is the "top".

Figure 38:
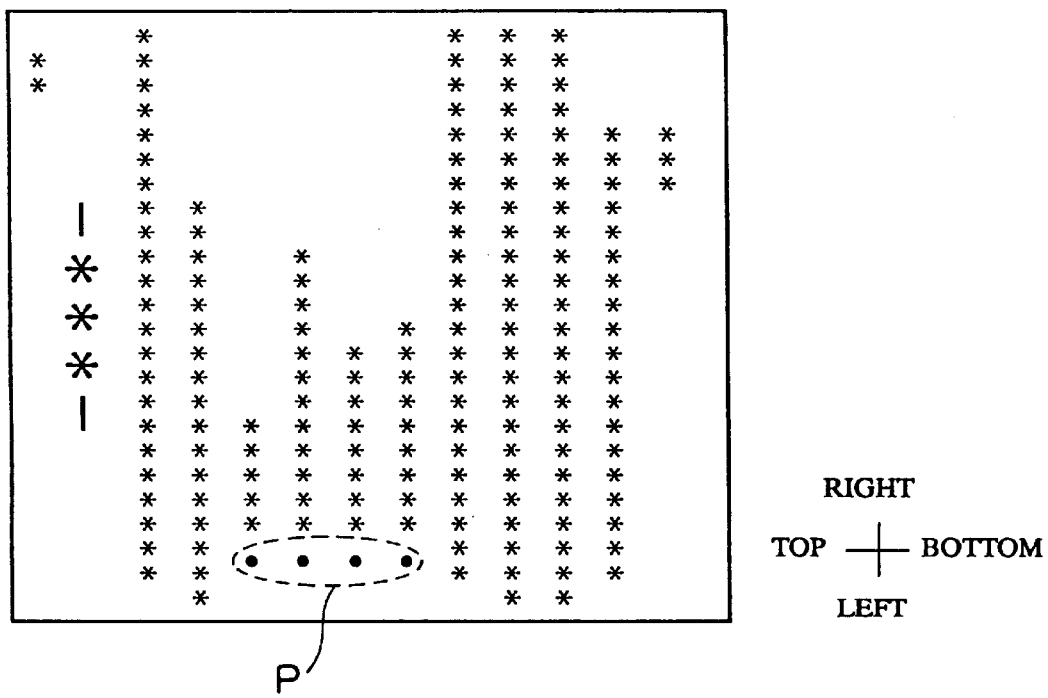

In the case where the distribution shape of the histogram in respect of the coordinate value in the x-axis direction is as illustrated in FIG. 34(c) and the distribution shape of the histogram in respect of the coordinate value in the y-axis direction is as illustrated in FIG. 34(b), the document image is at a position as illustrated in FIG. 38 and it is possible to determine that the left of FIG. 38 is the "top".

Figure 39:
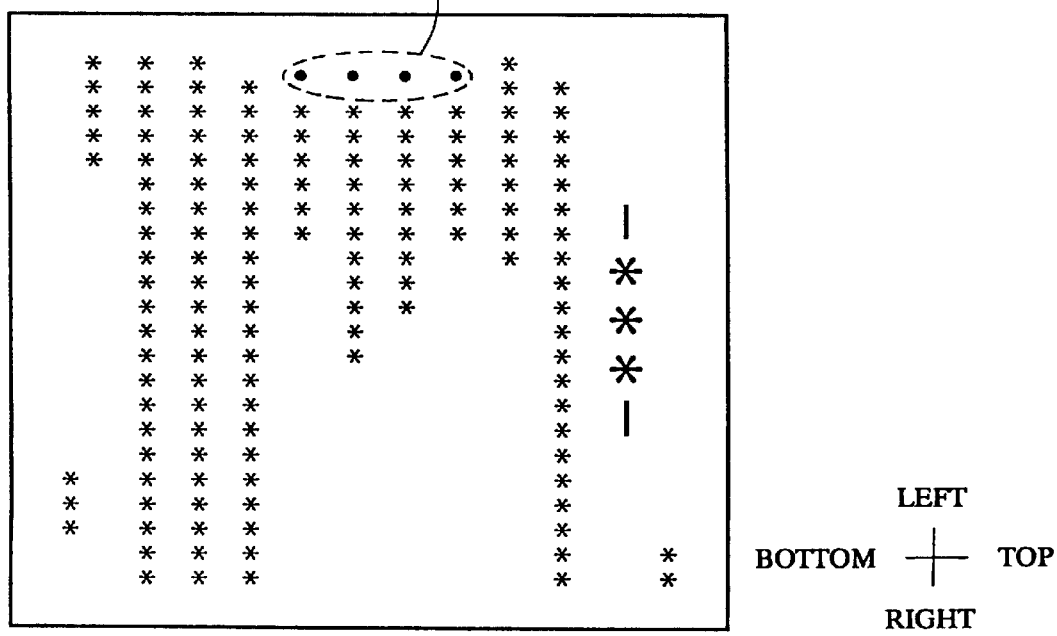

In the case where the distribution shape of the histogram in respect of the coordinate value in the x-axis direction is as illustrated in FIG. 34(c) and the distribution shape of the histogram in respect of the coordinate value in the y-axis direction is as illustrated in FIG. 34(a), the document image is at a position as illustrated in FIG. 39 and it is possible to determine that the right of FIG. 39 is the "top".

Figure 40:
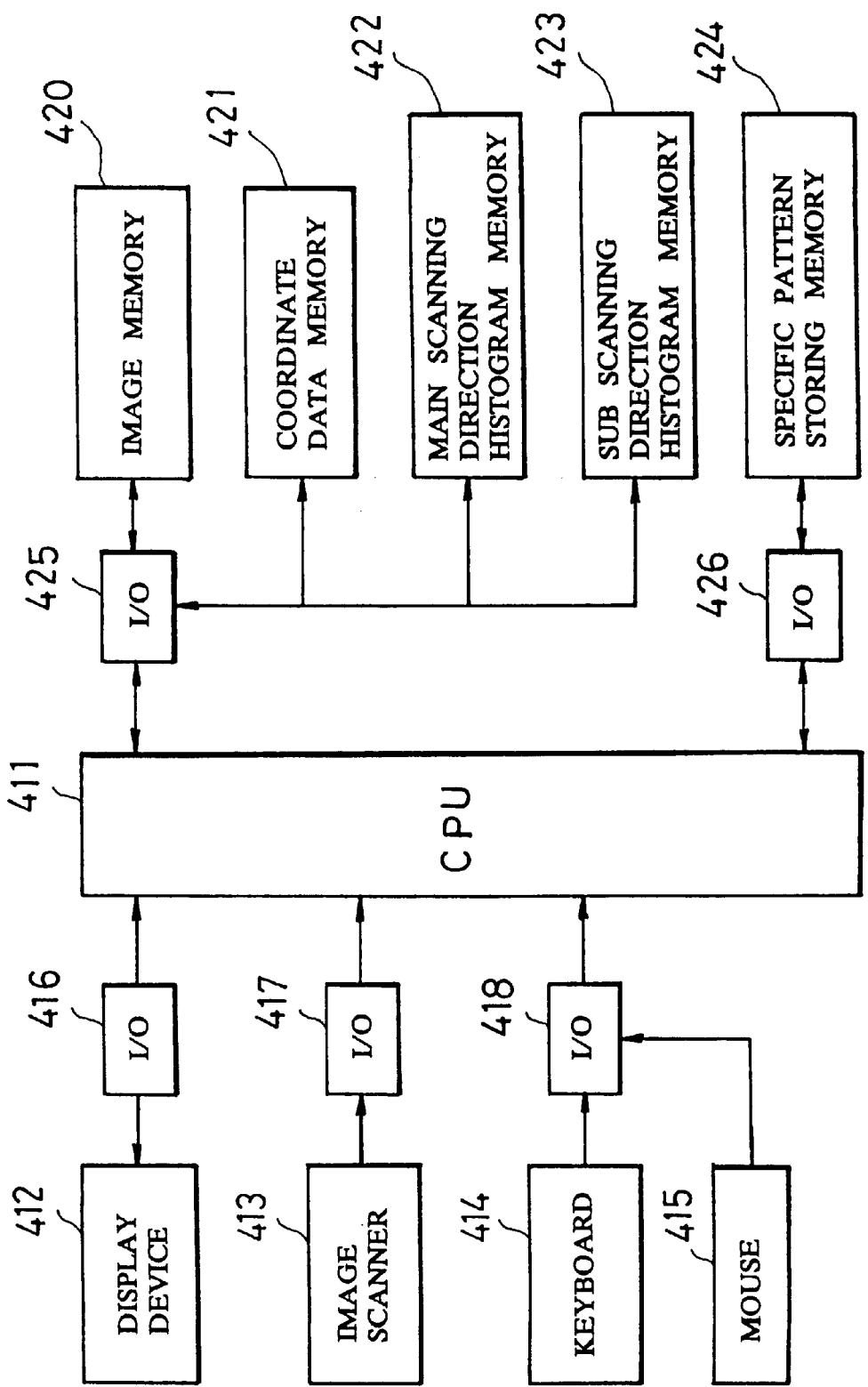

FIG. 40 is a block diagram of an image processing circuit of a digital copier that is suitable for applying the present invention. CPU 411 is a CPU controlling image processing, to input and output ports of which a display device 412, an image scanner 413 outputting image data by scanning document image, a keyboard 414, a mouse 415 etc. are connected respectively via input and output control devices 416, 417 and 418.

To the input and output ports of CPU 411 an image memory 420, a coordinate data memory 421, a main scanning direction histogram memory 422, a sub scanning direction histogram memory 423 etc. are connected via an input and output control devices 425 and further a specific pattern storing memory 424 is connected via an input and output control device 426.

An image reading mechanism, an image forming mechanism etc. of the digital copier suitable for applying the present invention are the same as those in well-known constitution and therefore, the explanation will be omitted.

Figure 41:
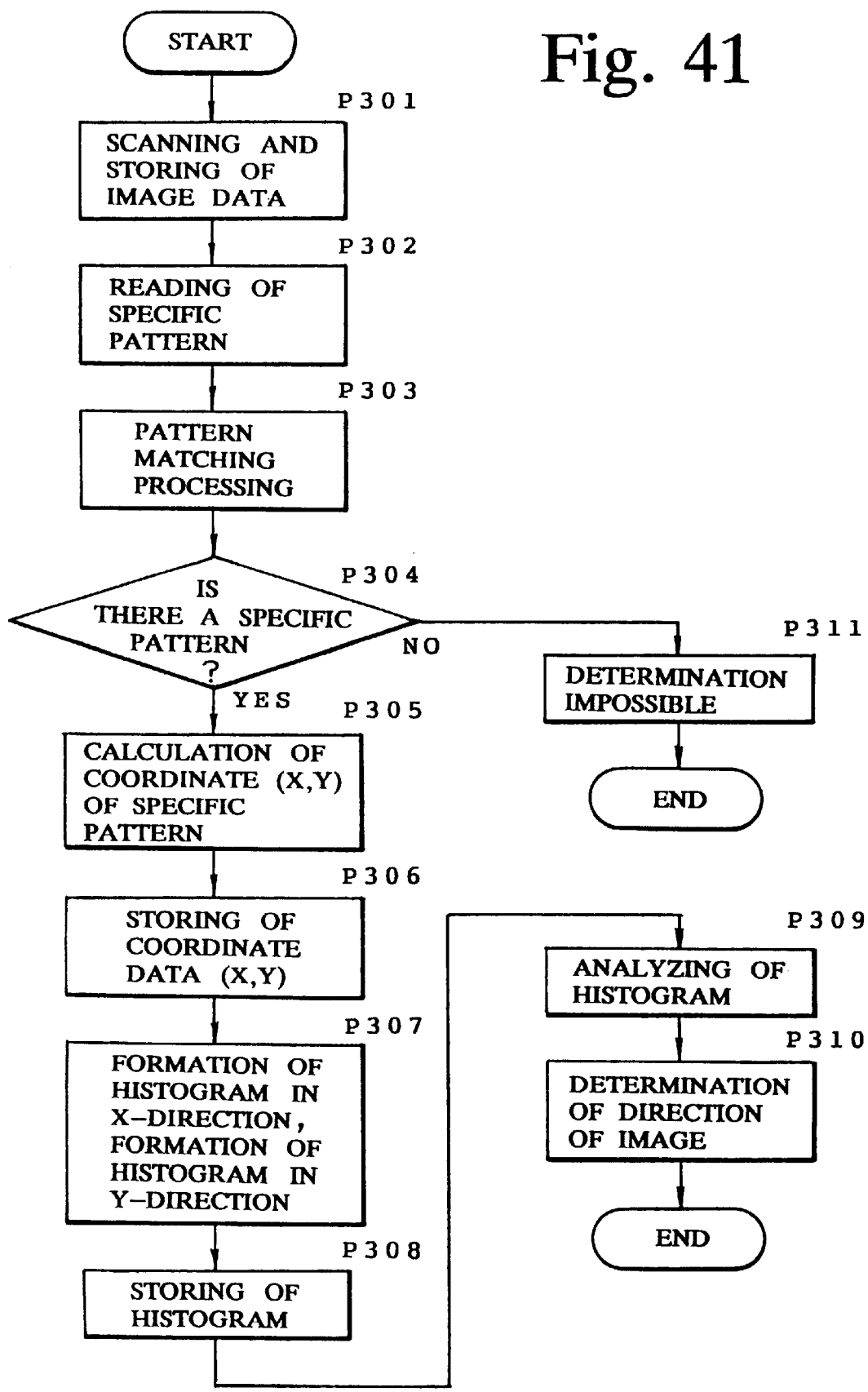

Next, an explanation will be given of processing of determining top and bottom, and left and right rotational position that is carried out by CPU 411 in accordance with a flow chart of FIG. 41.

First, a processing of determining a specific pattern (black circle "●" in the above-mentioned example) used in determining top and bottom, and left and right rotational position of image and storing it in the specific pattern storing memory 424, is carried out as a previous processing prior to determination processing of top and bottom, and left and right rotational position of image. This can be achieved by determining the specific pattern suitable for using in determination of top and bottom, and left and right rotational position of image by previously investigating document in details and thereafter extracting the image of the specific pattern that is the object by scanning the document by the image scanner 413 and storing it to the specific pattern storing memory 424.

Also, other than this the following procedure may be carried out. A specific pattern designating key and a display are installed on an operation panel (not shown), an operator has a letter/sign lookup table which has been previously installed in a memory (memory other than the specific pattern storing memory) displayed on the display by operating the specific pattern designating key and the operator extracts a desired specific pattern from the letter/sign lookup table and stores the extracted specific pattern in the specific pattern storing memory 424.

Next, the explanation proceeds to the processing of determining top and bottom, and left and right rotational position of image. First, document is scanned by the image scanner 413 and the document image data is stored in the image memory 420 (step P301) and the specific pattern is read from the specific pattern storing memory 424 (step P302). The document image data is read from the image memory 420 and whether the specific pattern is present or not is searched by the method of pattern matching (steps P303 and P304). In this case, when there are a plurality of the specific pattern, all of them are searched.

When the specific pattern is discovered, the coordinates (X, Y) at the central position of the discovered specific pattern is calculated on the x-y coordinate system with an onset point of scanning (a reference position of a document sheet, for example, top left corner) as the original point and is stored in the coordinate data memory 421 (steps P305 and P306). The determination of the coordinates of the central position of the specific pattern and storing it to the coordinate data memory 421 in accordance with steps P305 and P306, are carried out with respect to all the specific patterns discovered on the document image.

A histogram which is a cumulative value of a number of occurrence with respect to coordinate values of the specific patterns in the x-axis direction (main scanning direction, horizontal) and a histogram that is a cumulative value of a number of occurrence with respect to coordinate values thereof in the y-axis direction (sub scanning direction, vertical), are formed and the respective histograms are stored in the histogram memories 422 and 423 (steps P307 and P308).

Distribution shapes of histogram in the x-axis direction and the histograms in the y-axis direction are analyzed and the top and bottom, and the left and right rotational positions of the document image are determined based on the table as shown by FIG. 35 (steps P309 and P310) and the processing is finished.

When the specific patterns are not discovered in determination of steps P304, it is determined that such determination of the top and bottom, and the left and right rotational position of the document image is impossible (step P311) and the processing is finished.

Although in the above-mentioned embodiment a single kind of pattern is used as the specific pattern, a plurality of patterns can simultaneously be used. In the case of simultaneously using a plurality of specific patterns, more accurate determination result can be provided by using a determination result based on patterns showing more significant distribution shapes of histograms. Also, a plurality of determination results based on distribution shapes of histograms having a plurality of patterns may be subjected to final determination by majority rule.

The black circle "●" has been shown as the specific pattern in the above-explained embodiment because the matching processing matching with the same pattern contained in document image region can easily be carried out regardless of the direction of the document image, since if the specific pattern is a circular pattern no characteristic or differentiation is found in either of the main scanning direction and the sub scanning direction, whereby the pattern matching processing can be performed simply and swiftly without performing complicated image processing such as rotation of the specific patterns.

In this respect any pattern can be used as a specific pattern other than the black circle "●", if it is a pattern having no characteristic in either of the main scanning direction and the sub scanning direction and the frequency of use is comparatively high other than general letters such as white circle "○", double circle "◎" etc.

Although the example in which top and bottom, and left and right rotational position of document image is determined on the premise that the document is written from left to right and the specific patterns (black circle "●" in the above-mentioned example) are present at the front of letter series, as shown in the above-explained embodiment, in the case where specific patterns are present at the front of letter series in document written in vertical lines, a determination can be performed based on distribution shapes of histograms for specific patterns that are specific to the document written in vertical lines and formed by a method similar to that in the above-mentioned embodiment, can be formed and top and bottom, and left and right rotational position of document image can be determined by a method similar to that in the above-mentioned embodiment.

Although the explanation has been given to the above-mentioned embodiment with respect to the case in which the specific patterns are present at the front of letter series, the specific pattern may not be present at the front of letter series. For example, top and bottom, and left and right rotational position of document image can firmly be determined by utilizing binding hole mark "○" printed on document paper, etc.

In the case where document image is paginated as in printed document and for example, hyphens "-" are recorded before and after a numeral n as "-n-" at a record position of page, it is general that the pagination of this form is provided at the lower side of document and accordingly, top and bottom, and left and right rotational position of document image can firmly be determined by utilizing "-" or "-(vacancy)-" as a specific pattern.

However, in the case of this specific pattern there are characteristics in the main scanning direction and in the sub scanning direction and therefore, the pattern matching processing is more complicated than in the case of circular pattern.

As explained above, in Embodiment 3, whether patterns the same as a previously set specific pattern are included in image region for one page of document is determined and in the case where they are included, top and bottom and rotational position of document image is determined based on characteristics of a distribution state in the main scanning direction and a distribution state in the sub scanning direction of the pattern the same as the specific pattern in image region. Therefore, top and bottom and rotational position of document image can be determined swiftly and easily with slight increase of cost with no need of high degree image processing of reading letters and comparing them with reference letters as in the conventional means for determining top and bottom and rotational position of document image.

Embodiment 4

In Embodiment 4, specific patterns that are used for determining top and bottom, and left and right of image are extracted from document as a previous processing. Next, presence or absence of the specific patterns are searched on document image obtained by scanning document by an image scanner. When there is a specific pattern, coordinate positions (X, Y) of the central position of the specific pattern are calculated on a x-y coordinate system with an onset point of scanning as the original point and an image region in the x-axis direction and an image region in the y-axis direction including the specific pattern are designated by a predetermined width. In the designated image region in the x-axis direction and the designated image region in the y-axis direction having a predetermined width, distribution states of image data or image regions in one of which the x-axis coordinate value is decreasing from the central position of the specific pattern, in one of which it is increasing, in one of which the y-axis coordinate value is decreasing therefrom and in one of which it is increasing, are calculated and a direction having the least image data is detected by which top and bottom of image is recognized.

Figure 42:
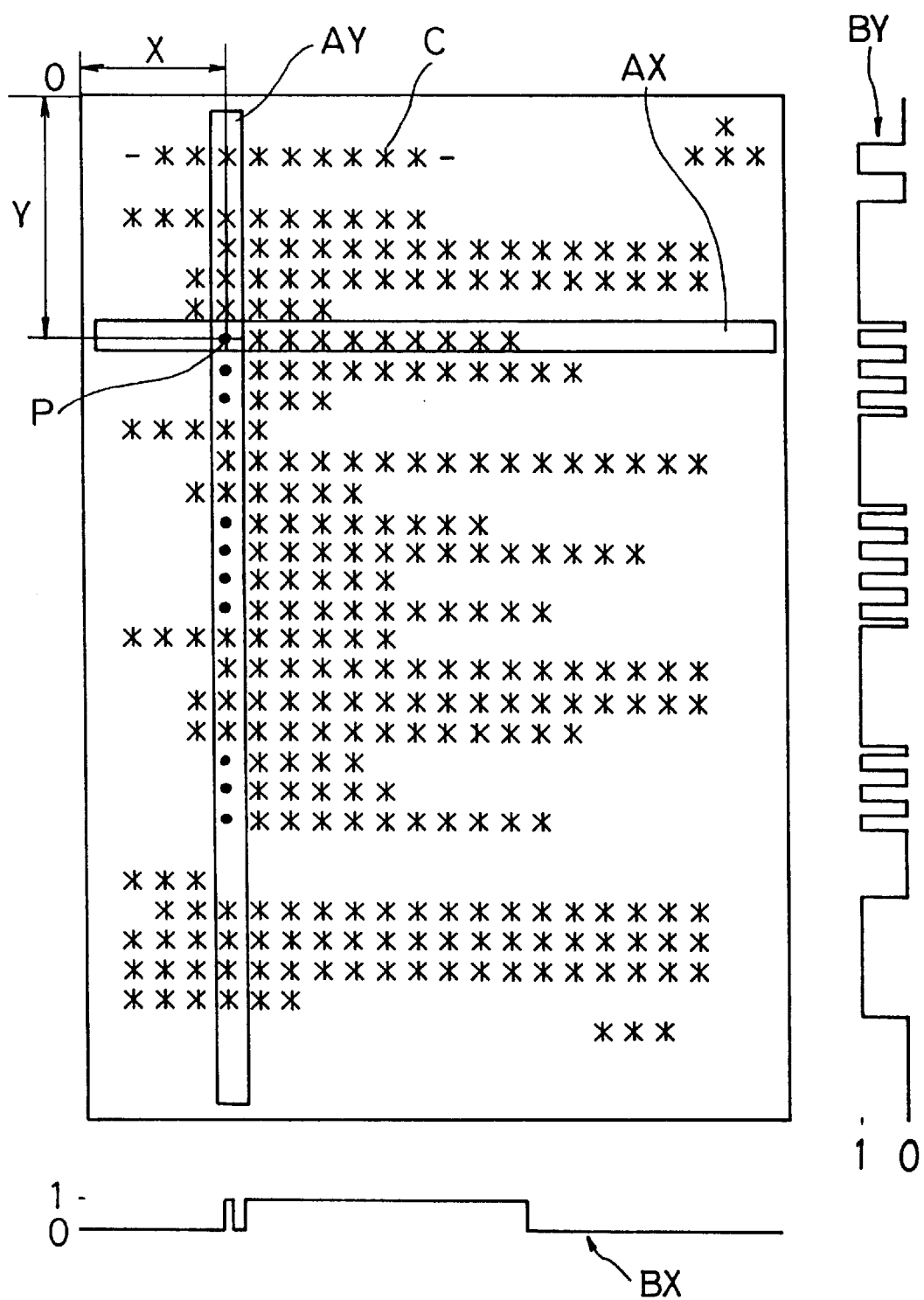
FIG. 42 through FIG. 50 are drawings of a fourth embodiment of the present invention.

An explanation will be given of Embodiment 4 as follows. First, an explanation will be given of a method of determining top and bottom or left and right of document image. FIG. 42 illustrates an example of the image obtained by scanning a document written from left to right where a plurality of asterisks "*" designated by notation C represent general letters. Also, a plurality of black circles "●" designated by notation P on the image is a sign occurring at the front of letter series with comparatively high frequency. In the following explanation, in the image illustrated in FIG. 42 the upper side of the drawing designates the "top".

In this embodiment signs (black circle "●" in the above-mentioned example and hereinafter, called as specific pattern) occurring with comparative high frequency on the image are extracted and distribution states of image data in the image regions having a predetermined width and including the specific patterns are investigated and top and bottom, left and right of the image is determined from the result of investigation.

When a x-y coordinate system is set as shown in FIG. 42 with left top of image as the original point, the location of black circle "●" designated by a sign P that is the specific pattern can be represented by the coordinate values (X, Y) in the coordinate system.

Further, an image region AX in the x-axis direction having a predetermined width and an image region AY in the y-axis direction having a predetermined width, both passing through the central coordinate position (X, Y) of the specific pattern P, are determined. Next, distribution states of image data of the specific pattern P in a direction of increasing the coordinate value in the x-axis direction from the coordinate position X and a direction of decreasing the coordinate value in the image region AX and distribution states of image data of the specific pattern P in a direction of increasing the coordinate value in the y-axis direction from the coordinate position Y and a direction of decreasing the coordinate value in the image region AY, are investigated and top and bottom or left and right of image is determined from the distribution states.

In FIG. 42, BX designates a signal showing a distribution state of image data in the x-axis direction in the image region AX and BY designates a signal showing a distribution state of image data in the y-axis direction in the image region AY.

Figure 43:
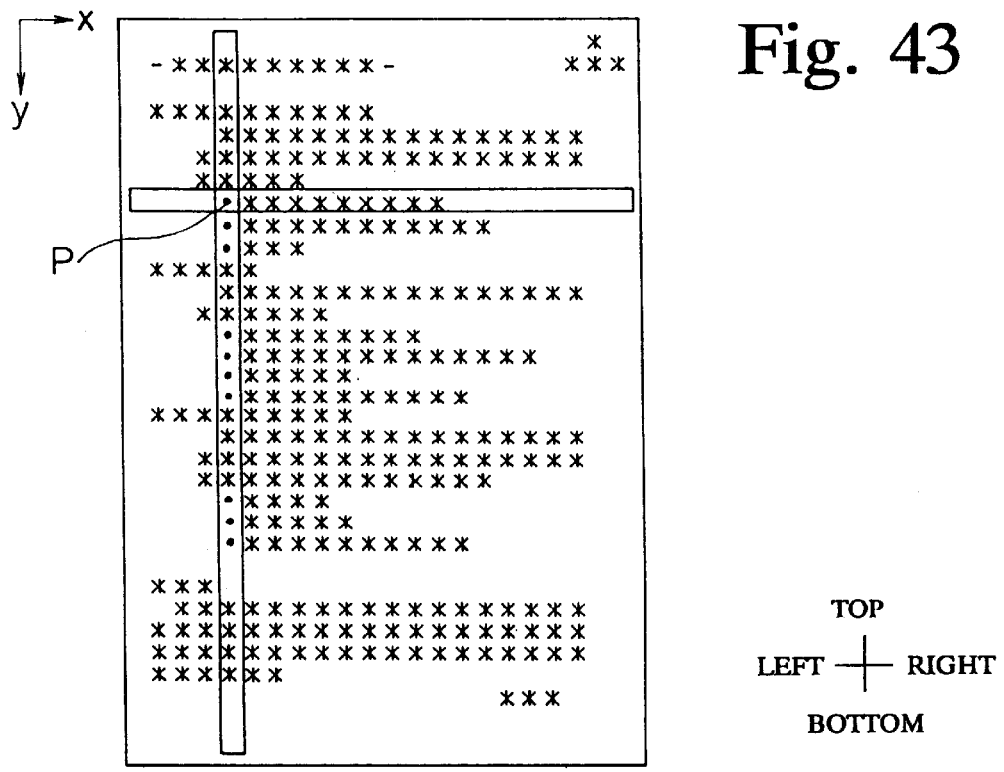

As a result of determining the distribution states of image data, as shown in FIG. 43 image data are distributed in both of the direction of increasing the coordinate value of the specific pattern P from the coordinate position Y and the direction of decreasing thereof, in respect of the x-axis direction, there is no image data in the direction of decreasing the coordinate value of the specific pattern P from the coordinate position X and image data are distributed in the direction of increasing the coordinate value. In this case the direction of decreasing the x-axis coordinate value (direction of absence of image data) is determined to be the "left"of image.

Figure 44:
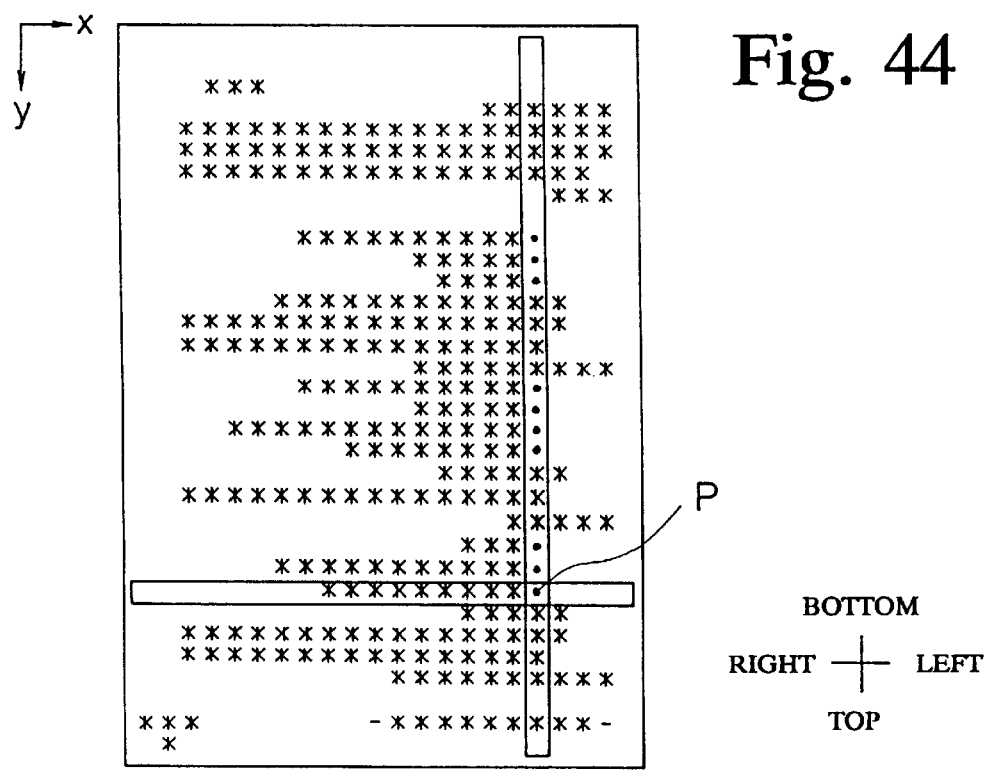

As a result of determination, as shown in FIG. 44 image data are distributed in both of the directions of increasing the coordinate value of the specific pattern P from the coordinate position Y and the direction of decreasing thereof with respect to the y-axis direction, with respect to the x-axis direction image data are absent in the direction of increasing the coordinate value of the specific pattern P from the coordinate position X and image data are distributed in the direction of decreasing the coordinate value. In this case the direction of increasing the x-axis coordinate value (direction of absence of image data) is determined to be the "left" of image.

Figure 45:
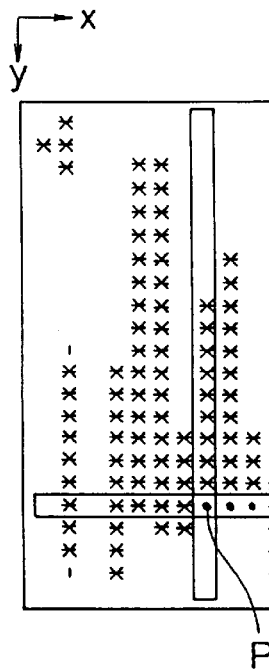

As a result of determination, as shown in FIG. 45 image data are distributed in both of the directions of increasing the coordinate value of the specific pattern P from the coordinate position X and the direction of decreasing thereof with respect to the x-axis direction, with respect to the y-axis direction image data are distributed in the direction of decreasing the coordinate value of the specific pattern P from the coordinate position Y and there is no image data in the direction of increasing the coordinate value. In this case, the direction of increasing the y-axis coordinate value (direction of absence of image data) is determined to be the "left" of image.

Figure 46:
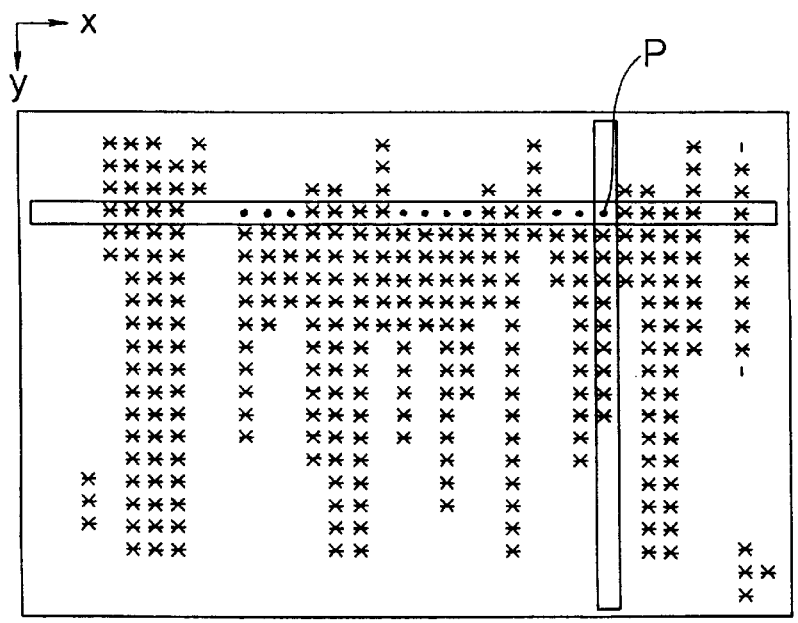

As a result of determination, as shown in FIG. 46 image data are distributed in both of the directions of increasing the coordinate value of the specific pattern P from the coordinate position X and the direction of decreasing thereof with respect to the x-axis direction, with respect to the y-axis direction image data are distributed in the direction of increasing the coordinate value of the specific pattern P from the coordinate position Y and there is no image data in the direction of decreasing the coordinate value. In this case, the direction of increasing the y-axis coordinate value (direction of absence of image data) is determined to be the "left" of image.

Figure 47:
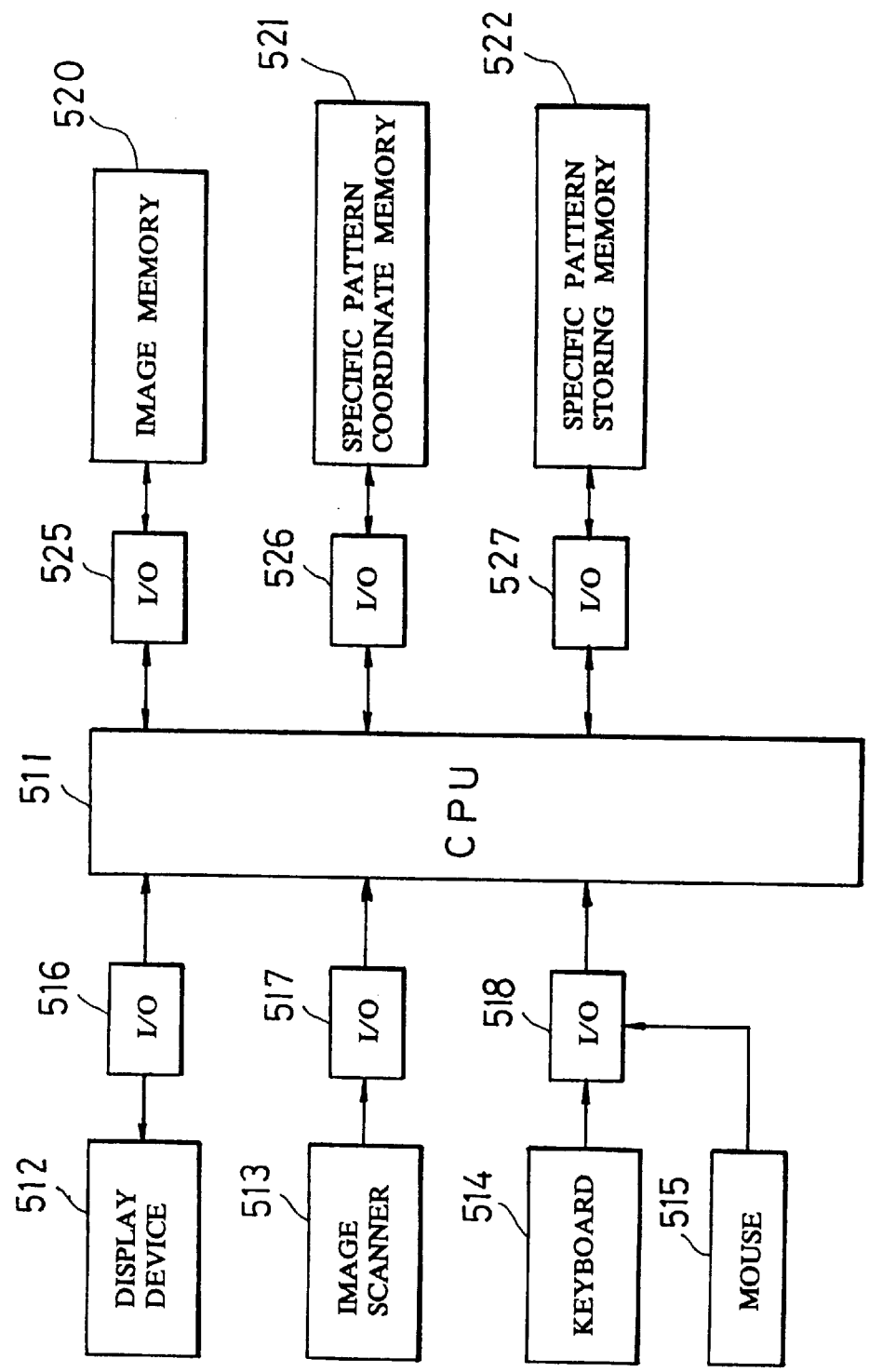

FIG. 47 is a block diagram of an image processing circuit of a digital copier that is suitable for applying the present invention. CPU 511 is a CPU controlling image processing, to input and output ports of which a display device 512, an image scanner 513 outputting image data by scanning document image, a key board 514, a mouse 515 etc. are connected respectively via input and output controlling devices 516, 517 and 518.

Also, to the input and output ports of CPU 511 an image memory 520, a specific pattern coordinate memory 521 storing coordinate position of the specific pattern P and a specific pattern storing memory 522 storing image of the specific pattern P are connected respectively via input and output controlling devices 525, 526 and 527.

An image reading mechanism, an image forming mechanism etc. that are suitable for applying the present invention are the same as those having a well-known constitution and therefore, the explanation will be omitted.

Next, an explanation will be given of processing of determining top and bottom and left and right of image executed in the CPU 511 in accordance with a flow chart of FIG. 48.

First, the processing of determining a specific pattern (black circle "●" in the above-mentioned example) used in determining top and bottom, and left and right of image and storing it to the specific pattern storing memory 522 is performed as a previous processing prior to determining top and bottom, and left and right of image. This can be achieved by determining a specific pattern suitable for using in determination of top and bottom, and left and right position of image by previously investigating document in detail, extracting image of a specific pattern that is an object by scanning the document by the image scanner 513 and storing it to the specific pattern storing memory 522.

Also, other than this the following procedure may be carried out. A specific pattern designating key and a display are installed on an operation panel (not shown), an operator has a letter/sign lookup table which has been previously installed in a memory (memory other than the specific pattern storing memory) displayed on the display by operating the specific pattern designating key and the operator extracts a desired specific pattern from the letter/sign lookup table and stores the extracted specific pattern in the specific pattern storing memory 424.

Next, the explanation proceeds to determination of top and bottom, and left and right of image. First, document is scanned by the image scanner and image data is stored in the image memory 520 (step P401) and the specific pattern is read from the specific pattern storing memory 522 (step P402). The image data is read from the image memory 520 and whether there is the specific pattern is investigated by the method of pattern matching (steps P403 and P404). In this case, when there are a plurality of the specific pattern all of them are investigated.

When the specific pattern is discovered, the coordinates (X, Y) of the central position of the discovered specific pattern are calculated on the x-y coordinate system with an onset point of scanning (reference position of document sheet, for example, top left corner) as the original point and stored in the specific pattern coordinate memory 521 (steps P405 and P406). The determination of coordinate values of the central position of the specific pattern and storing it to the specific pattern coordinate memory 521 in accordance with steps P405 and P406 are carried out with respect to all the specific patterns discovered on the image.

A distribution of image data in the image region AX having a predetermined width in the x-axis direction passing through the central coordinate location (X, Y) of the specific pattern and a distribution of image data in the image region AY having a predetermined width in the y-axis direction, are calculated (step P407). The detail of the processing will be explained by a flow chart of FIG. 49.

The distribution image of the image data in the image region AX and the distribution state of image data in the image region AY are investigated and top and bottom, and left and right of image is determined (step P408). The detail of the processing will be explained by a flow chart of FIG. 50.

Whether priority is given to processing speed is determined based on information inputted separately from a keyboard etc. (step P409) and the processing is finished in the case of giving priority to the processing speed. Further, in the case of giving priority to accuracy without giving priority to processing speed, the processing is performed with respect to all the specific patterns, and therefore, termination of the processing for all the specific patterns P is determined (step P410) and the operation returns to step P404 when the processing is not finished. Also, when all the processing has been finished with respect to all the specific patterns, the processing is finished.

When the specific pattern is not discovered in the determination of step P404, a display explaining that the direction of image cannot be determined is conducted (step P411) and the processing is finished.

Figure 48:
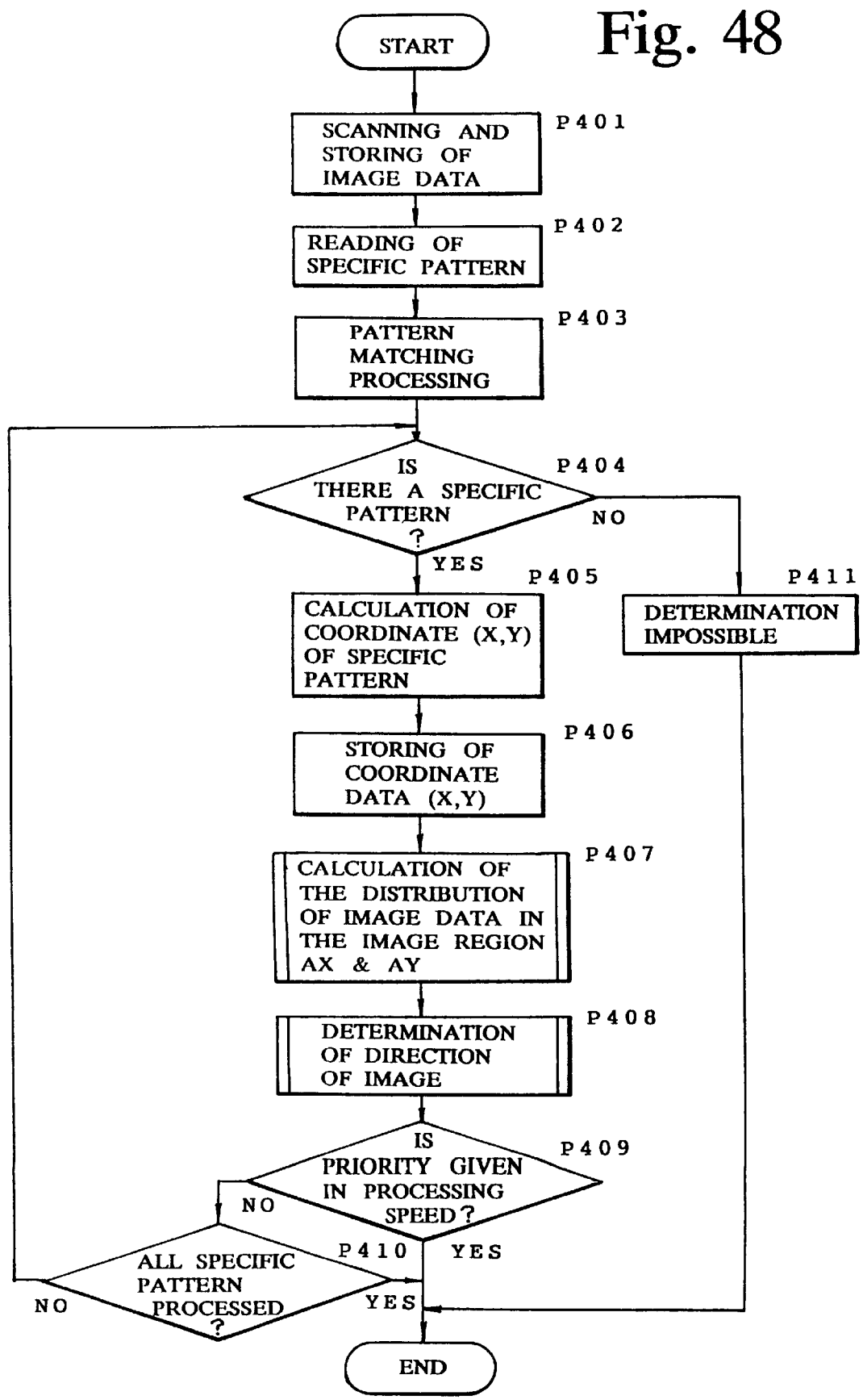
Figure 49:
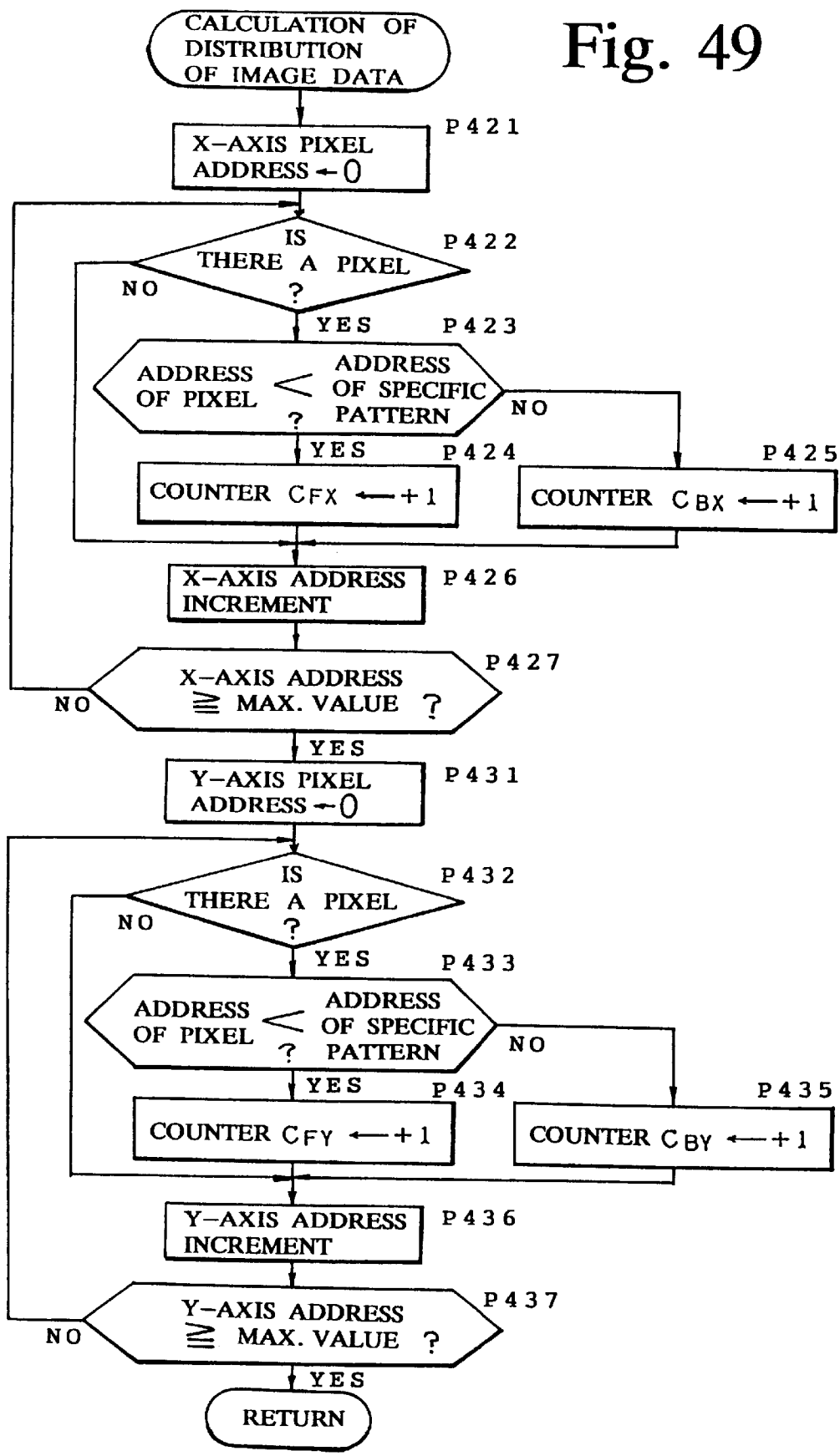

FIG. 49 is a flow chart which is indicated in the flow chart of FIG. 48 as step P407, showing details of processing of counting distributions of image data in a direction of increasing a coordinate value of the specific pattern in the image region AX having a predetermined width in the x-axis direction passing through the central coordinate position (X, Y) of the specific pattern and in a direction of decreasing thereof from the central coordinate position, and in a direction of increasing a coordinate value of the specific pattern in the image region AY having a predetermined width in the y-axis direction and in a direction of decreasing thereof from the central coordinate position.

First, null is set as an initial value of a pixel address (coordinate value) in the x-axis direction for processing the image data in the x-axis direction (step P421) and the presence or absence of a pixel at the address is determined (step P422). If a pixel is present, whether the location (address) in the x-axis direction of the pixel is in a direction of decreasing the coordinate value from the central coordinate location (address) X of the specific pattern P is determined (step P423). When it is in the direction of decreasing, 1 is added to a counter $C_{FX}$ and when it is in the direction of increasing, 1 is added to a counter $C_{BX}$ (steps P424 and P425).

The pixel address in the x-axis direction is incremented (step P426), whether the pixel address is smaller than the maximum value of the pixel address (maximum value of image region in x-axis direction) is determined (step P427) and if it is smaller, the operation returns to the step P422 to continue further the processing. Further, if the pixel address reaches the maximum value of the pixel address, the processing of the image data in the x-axis direction is finished and the operation proceeds to processing of the image data in the y-axis direction.

Null is set as an initial value of a pixel address (coordinate value) in the y-axis direction (step P431) and the presence or absence of a pixel at the address is determined (step P432). When a pixel is present, whether the location (address) in the y-axis direction of the pixel is in direction of decreasing the coordinate value from the central coordinate location Y (address) of the specific pattern P is determined (step P433). When it is in the direction of decreasing, 1 is added to a counter $C_{FY}$ and when it is in the direction of increasing, 1 is added to a counter $C_{BY}$ (steps P434 and P435).

The pixel address in the y-axis direction is incremented (step P436), whether the pixel address is smaller than the maximum value of the pixel address (maximum value of image region in y-axis direction) is determined (step P437) and if it is smaller, the operation returns to step P432 to continue further the processing. When the pixel address reaches the maximum value of the pixel address, the processing of the image data in the y-axis direction has been finished and accordingly, the routine is finished.

Figure 50:
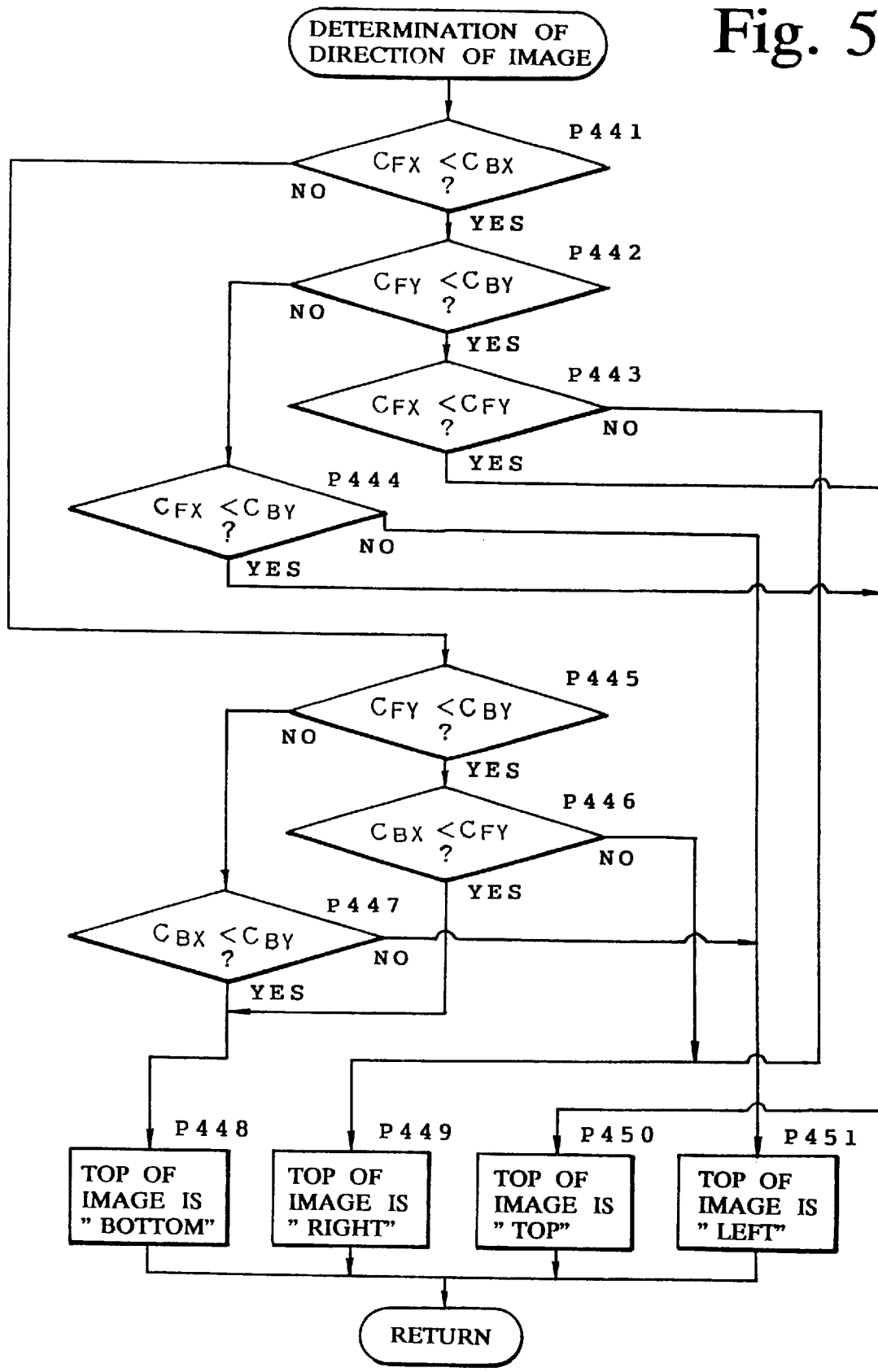

FIG. 50 is a flow chart which is indicated in the flow chart of FIG. 48 as step P408, showing the details of processing of determining the direction (top and bottom and left and right) of image based on the distribution state of the image data in the region AX and the distribution state of the image data in the region AY. This processing determines an image region in the x-axis direction or y-axis direction showing the least count value among the counters $C_{FX}$, $C_{BX}$, $C_{FY}$ and $C_{BY}$ counting the numbers of pixels in the image regions in the x-axis direction and y-axis direction which are counted by the previous processing (processing by the flow chart of FIG. 49), as the "left" of the image region and the position rotated therefrom to the right by 90° as the "top".

First, the count values of counter $C_{FX}$ is compared with the counter $C_{BX}$ (step P441). If the count values of counters are in the relationship $C_{FX} < C_{BX}$ as the result of comparison, the count values of the counter $C_{FY}$ and the counter $C_{BY}$ are compared (step P442) and in the case of $C_{FY} < C_{BY}$ the count values of the counter $C_{FY}$ and the counter $C_{FY}$ are further compared (step P443). If $C_{FX}<C_{FY}$, the count value of the counter $C_{FX}$ is the least by which the image can be determined to be at the image position as shown in FIG. 43 and accordingly, the top of the image is determined to be the "top" (step P450).

If it is not established by the determination of step P443 that $C_{FX}<C_{FY}$, the count value of the counter $C_{FY}$ is the least by which the image can be determined to be at the image position as shown in FIG. 46 and accordingly, the right of the image is determined to be the "top" (step P449).

If it is not established by the determination of step P442 that $C_{FY}<C_{BY}$, the count values of the counter $C_{FX}$ and the counter $C_{BY}$ are further compared (step P444). If $C_{FX}<C_{BY}$ the count value of the counter $C_{FX}$ is the least by which the image can be determined to be at the image position as shown in FIG. 43 and accordingly, the top of the image is determined to be the "top" (step P450).

If it is not established by the determination of step P444 that $C_{FX}<C_{BY}$, the count value of the counter $C_{BY}$ is the least by which the image can be determined to be at the image position as shown in FIG. 45 and accordingly, the left of the image is determined to be the "top" (step P451).

If it is not established by the determination of step P441 that $C_{FX}<C_{BX}$, the count values of the counter $C_{FY}$ and the counter $C_{BY}$ are compared (step P445). If $C_{FY}<C_{BY}$, the count values of the counter $C_{BX}$ and the counter $C_{FY}$ are further compared (step P446). If $C_{BX}<C_{FY}$, the count value of the counter $C_{BX}$ is the least by which the image can be determined to be at the image position as shown in FIG. 44 and accordingly, the bottom of the image is determined to be the "top" (step P448).

If it is not established by the determination of step P446 that $C_{BX}<C_{FY}$, the count value of the counter $C_{FY}$ is the least by which the image can be determined to be at the image position as shown in FIG. 46 and accordingly, the right of the image is determined to be the "top" (step P449).

If it is not established by the determination of step P445 that $C_{FY}<C_{BY}$, the count values of the counter $C_{BX}$ and the counter $C_{BY}$ are compared (step P447). If $C_{BX}<C_{BY}$, the count value of the counter $C_{BX}$ is the least by which the image can be determined to be at the image position shown in FIG. 44 and accordingly, the bottom of the image is determined to be the "top" (step P448).

If it is not established by the determination of step P447 that $C_{BX}<C_{BY}$, the count value of the counter $C_{BY}$ is the least by which the image can be determined to be at the image position as shown in FIG. 45 and accordingly, the left of the image is determined to be the "top" (step P451).

As explained above, according to the present invention, on an image having read document written from left to right as shown in FIG. 42, the image region AX in the x-axis direction having a predetermined width and including the specific pattern and the image region AY in the y-axis direction having a predetermined width, are set and the direction in which the image data are not distributed among the four directions of the direction of increasing the x-axis coordinate value and the direction of decreasing thereof, and the direction of decreasing the y-axis coordinate value and the direction of increasing thereof in these image regions, is determined to be the left direction of the image. When a plurality of the specific patterns are extracted in the image, either of the following two processing methods is adopted by which the direction of the image is determined.

First, if priority is given to process speed in determining the direction of the image, the direction of the image is determined by using one specific pattern (for example, a specific pattern extracted firstly).

Further, when priority is given to accuracy in determining the direction of the image, with respect to the plurality of specific patterns which have been detected in the whole image regions, the distributions of the image data are calculated by setting image regions in the x-axis direction and the y-axis direction having predetermined widths and passing through the central locations with respect to the specific patterns, information showing the direction of the image is outputted with regard to the respectives and the result is once stored in a memory and the direction of the image is determined based on information showing the directions of the obtained plurality of images, for example, by the majority rule etc.

Although the pattern matching method is adopted in the above-mentioned processing to determine the central position of the specific pattern, it is also possible to calculate an edge (for example, circular arc) of a read specific pattern and a central location (for example, center of arc) can be calculated from the edge. Although one kind of pattern is used as the specific pattern in the above-mentioned embodiment, a plurality of patterns can simultaneously be used.

Also, although an example in which the top and bottom, and the left and right position of the image is determined on the premise that the document is written from left to right and a specific pattern (black circle "●" in the above-mentioned example) is provided at the front of letter series in the above-explained embodiment, even with document written in vertical lines, in the case where a specific pattern is present at the front of letter series, top and bottom, and left and right position of the image can be determined by a method similar to that in the above-mentioned embodiment. The position of the specific pattern differs in accordance with the direction of letter series as in writing from left to right, writing in vertical lines etc. and accordingly, a plurality of means for determining top and bottom, and left and right position in accordance therewith may be provided and switched.

As has been explained, according to the present invention, signs occurring with comparatively high frequency on image are extracted as specific patterns, distribution states of image data in image regions including the specific patterns are investigated and top and bottom and left and right of the image are determined from the result of investigation. Therefore, high degree image processing of comparing letters with read reference letters as in the conventional means for determining top and bottom and rotational position of document image is not necessary and determination of top and bottom and rotational position of document image can be performed swiftly and easily with slight increase of cost.

What is claimed is:

1. An image forming apparatus comprising:

an image data memory for storing pixel image data of a document;

detecting means for detecting a specific pattern included in the document;

investigating means for investigating the locations and the frequency of occurrence of the specific pattern detected by said detecting means;

determining means for determining a direction of the document based on a result of investigation by said investigating means; and controlling means for processing the pixel image data in accordance with a result of determination by the determining means.

2. An image forming apparatus according to claim 1, wherein the investigating means comprises a first histogram forming means for forming a first histogram indicating the distribution state of the specific pattern in a first direction and a second histogram forming means for forming a second histogram indicating the distribution state of the specific pattern in a second direction.

3. An image forming apparatus according to claim 1, further comprising a specific pattern memory for prestoring a specific pattern, and a specific pattern designating means for designating the specific pattern.

4. An image forming apparatus according to claim 1, wherein the determining means determines that the determination of the direction of the document cannot be performed when the specific pattern is not detected in the document.

5. An image forming apparatus according to claim 1, wherein the specific pattern is a pattern having no characteristics in either of a first direction and a second direction.

6. The method according to claim 1, wherein the step of investigating comprises forming a first histogram indicating the distribution state of the specific pattern in a first direction and forming a second histogram indicating the distribution state of the specific pattern in a second direction.

7. A method of processing pixel image data of a document, comprising:

storing the pixel image data of the document;

detecting a specific pattern included in the document;

investigating the locations and the frequency of occurrence of the detected specific pattern;

determining a direction of the document based on a result of investigation by said investigating step; and processing the pixel image data in accordance with a result of the determining step.

* * * * *